(12) United States Patent
Hedayat

(10) Patent No.: US 12,684,497 B2
(45) Date of Patent: *Jul. 14, 2026

(54) METHODS AND APPARATUS FOR OPERATION IN 6 GHz AND COEXISTENCE WITH INCUMBENTS

(71) Applicant: Charter Communications Operating, LLC, St. Louis, MO (US)

(72) Inventor: Ahmad Reza Hedayat, Carlsbad, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 133 days.

This patent is subject to a terminal disclaimer.

(21) Appl. No.: 18/629,923

(22) Filed: Apr. 8, 2024

(65) Prior Publication Data

US 2024/0259958 A1     Aug. 1, 2024

Related U.S. Application Data

(63) Continuation of application No. 17/397,288, filed on Aug. 9, 2021, now Pat. No. 11,956,736.

(51) Int. Cl.
| | |
|---|---|
| *H04W 52/34* | (2009.01) |
| *H04L 5/00* | (2006.01) |
| *H04W 52/36* | (2009.01) |
| *H04W 72/044* | (2023.01) |

(52) U.S. Cl.
CPC ........... *H04W 52/34* (2013.01); *H04L 5/0007* (2013.01); *H04L 5/0092* (2013.01); *H04W 52/367* (2013.01); *H04W 72/0473* (2013.01)

(58) Field of Classification Search
CPC ............... H04W 52/34; H04W 52/367; H04W 72/0473; H04L 5/0007; H04L 5/0092
See application file for complete search history.

(56) References Cited

U.S. PATENT DOCUMENTS

| | | | | |
|---|---|---|---|---|
| 2009/0141816 A1* | 6/2009 | Schenk | ............... | H04L 27/2614 |
| | | | | 375/295 |
| 2022/0369309 A1* | 11/2022 | Li | ..................... | H04W 72/0446 |

FOREIGN PATENT DOCUMENTS

| | | | | | |
|---|---|---|---|---|---|
| EP | 2866497 A1 | * | 4/2015 | .......... | H04W 36/302 |
| WO | WO-2017124846 A1 | * | 7/2017 | ........ | H04W 52/0209 |

* cited by examiner

*Primary Examiner* — John J Lee
(74) *Attorney, Agent, or Firm* — Straub & Straub; Michael P. Straub; Stephen T. Straub

(57)     ABSTRACT

An access point (AP) communicates to one or more stations (STAs) information indicating a set of channels and/or resource units (RUs), corresponding to a wideband basis service set (BSS) for an authorized unlicensed radio local area network (RLAN) using 6 GHz spectrum, which are subject to a lower power spectral density (PSD) level than other portions of the BSS frequency range or are not to be used for transmission. In some, but not necessarily all, embodiments, the AP and the STAs do not encode data on the identified channels or RUs, but do encode data on other channels and/or other RUs, which are not subject to the lower PDS constraint.

20 Claims, 30 Drawing Sheets

FIGURE 5

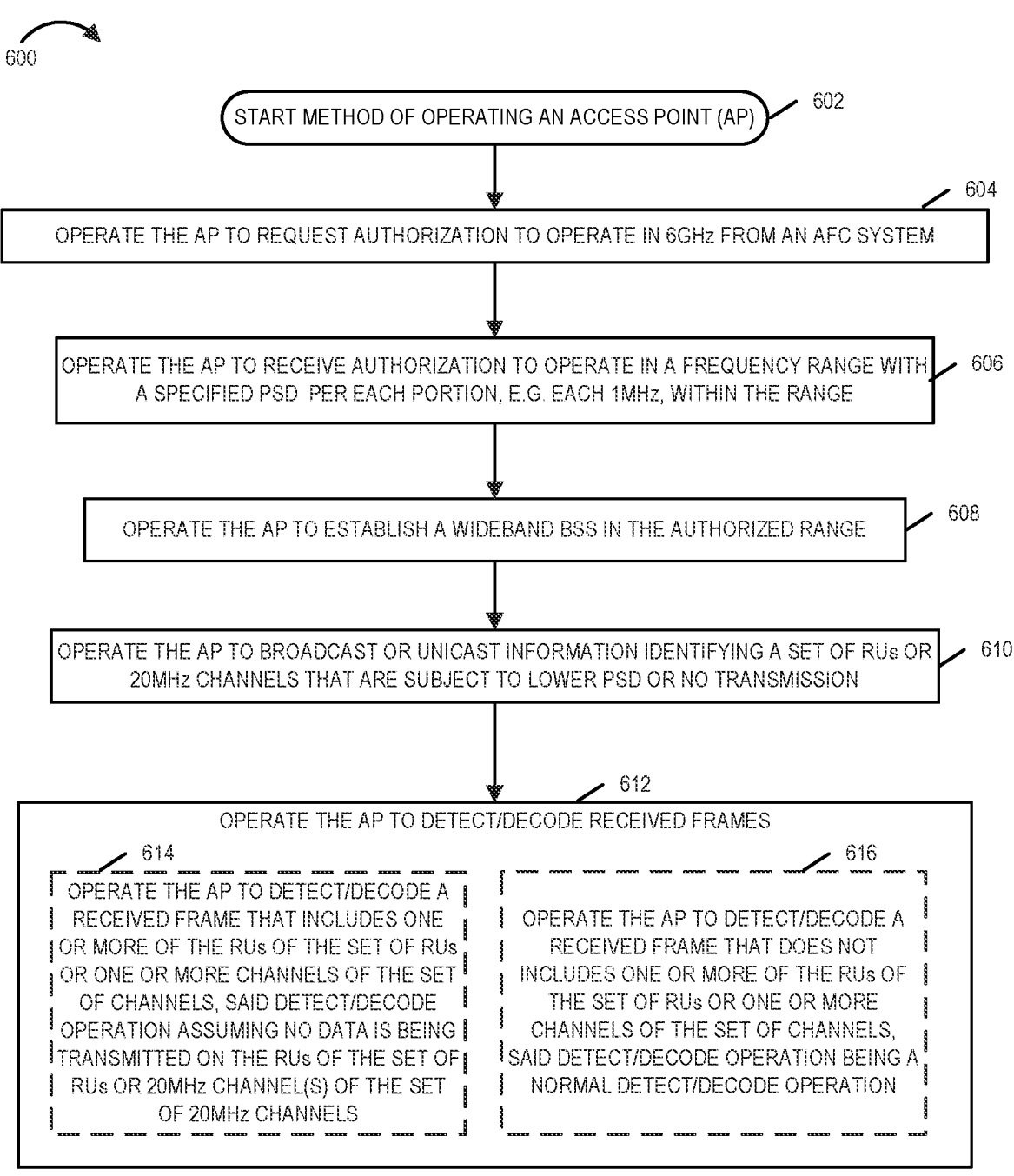

600

START METHOD OF OPERATING AN ACCESS POINT (AP) — 602

OPERATE THE AP TO REQUEST AUTHORIZATION TO OPERATE IN 6GHz FROM AN AFC SYSTEM — 604

OPERATE THE AP TO RECEIVE AUTHORIZATION TO OPERATE IN A FREQUENCY RANGE WITH A SPECIFIED PSD PER EACH PORTION, E.G. EACH 1MHz, WITHIN THE RANGE — 606

OPERATE THE AP TO ESTABLISH A WIDEBAND BSS IN THE AUTHORIZED RANGE — 608

OPERATE THE AP TO BROADCAST OR UNICAST INFORMATION IDENTIFYING A SET OF RUs OR 20MHz CHANNELS THAT ARE SUBJECT TO LOWER PSD OR NO TRANSMISSION — 610

OPERATE THE AP TO DETECT/DECODE RECEIVED FRAMES — 612

614
OPERATE THE AP TO DETECT/DECODE A RECEIVED FRAME THAT INCLUDES ONE OR MORE OF THE RUs OF THE SET OF RUs OR ONE OR MORE CHANNELS OF THE SET OF CHANNELS, SAID DETECT/DECODE OPERATION ASSUMING NO DATA IS BEING TRANSMITTED ON THE RUs OF THE SET OF RUs OR 20MHz CHANNEL(S) OF THE SET OF 20MHz CHANNELS

616
OPERATE THE AP TO DETECT/DECODE A RECEIVED FRAME THAT DOES NOT INCLUDES ONE OR MORE OF THE RUs OF THE SET OF RUs OR ONE OR MORE CHANNELS OF THE SET OF CHANNELS, SAID DETECT/DECODE OPERATION BEING A NORMAL DETECT/DECODE OPERATION

FIGURE 6

700
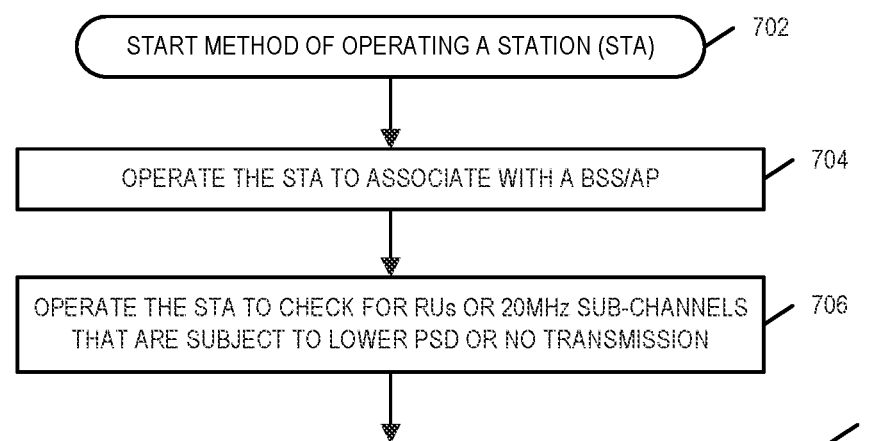
OPERATE THE STA TO RECEIVE INFORMATION IDENTIFYING RUs OR 20MHz SUB-CHANNELS THAT ARE SUBJECT TO LOWER PSD OR NO TRANSMISSION (E.G., THE INFO IS COMMUNICATED IN BROADCAST BEACON FRAMES OR UNICASTED TO THE STA IN PROBE RESPONSE, ASSOCIATION RESPONSE, ETC.) 708
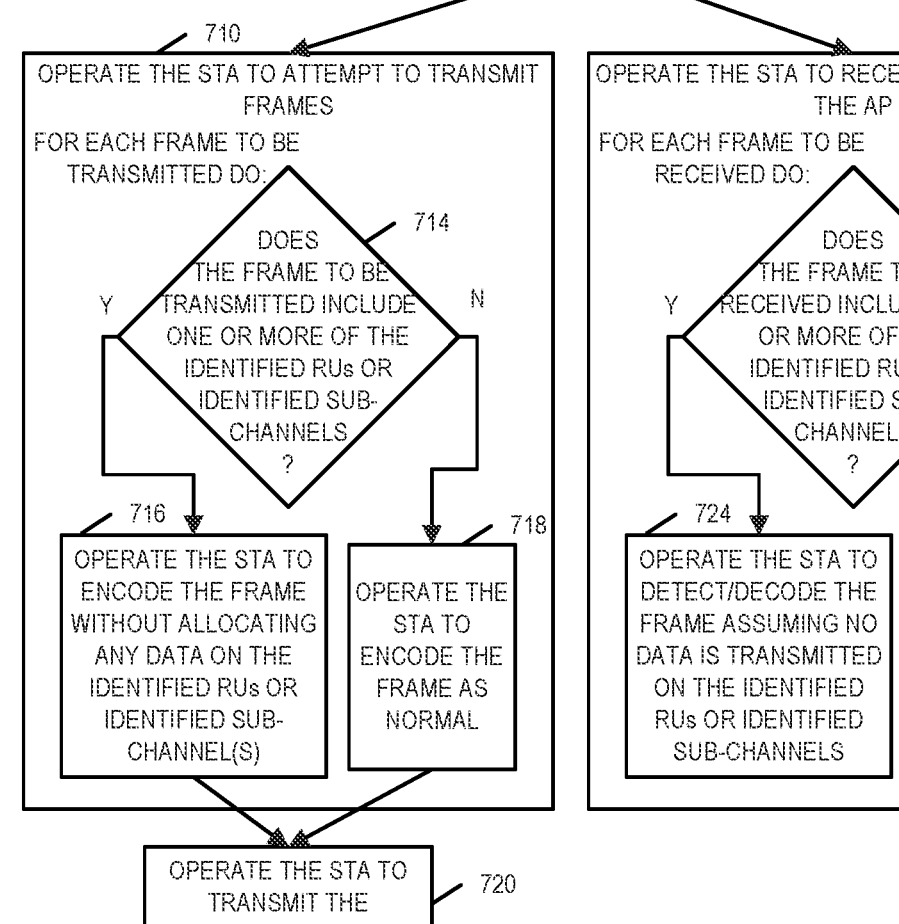
FIGURE 7

| FIGURE 12A |
| FIGURE 12B |
| FIGURE 12C |

OPERATE THE STA TO INITIATE UL —1364

OPERATE THE STA TO ONLY INITIATE AN UL WITH FRAME BANDWIDTH THAT DOES NOT INCLUDE ANY OF THE QUIET RUs —1368

OPERATE THE STA TO REFRAIN FROM INITIATING AN UL WITH FRAME BANDWIDTH THAT INCLUDES ANY OF THE QUIET RUs —1370

OPERATE THE STA TO RECEIVE A TRIGGER FRAME ADDRESSED TO THE STA —1372

OPERATE THE STA TO DETECT A DL FRAME THAT INCLUDES ONE OR MORE QUIET RUs —1380

OPERATE THE STA TO IGNORE THE DETECTED DOWNLINK FRAME —1382

OPERATE THE STA TO PROCESS THE REMAINDER OF THE RUs IN THE DETECTED DL FRAME (PROCESS NON-QUIET RUs IN THE DETECTED DL FRAME) —1384

OPERATE THE STA TO DETERMINE WHAT ACTION TO TAKE IN RESPONSE TO THE RECEIVED TRIGGER FRAME BASED ON WHETHER THE RECEIVED TRIGGER FRAME ASSIGNED AN RU THAT THE RECEIVED INFORMATION INDICATES IS A QUIET RU —1373

DOES THE TRIGGER FRAME INDICATE AN ASSIGNED RU WHICH IS ANY OF THE QUIET RUs —1374

Y

N

OPERATE THE STA TO NOT RESPOND TO THE TRIGGER FRAME —1376

OPERATE THE STA TO OPTIONALLY RESPOND TO THE TRIGGER FRAME —1378

FIGURE 13D

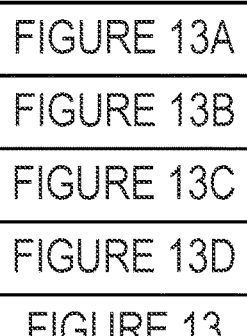

Figure 17B:
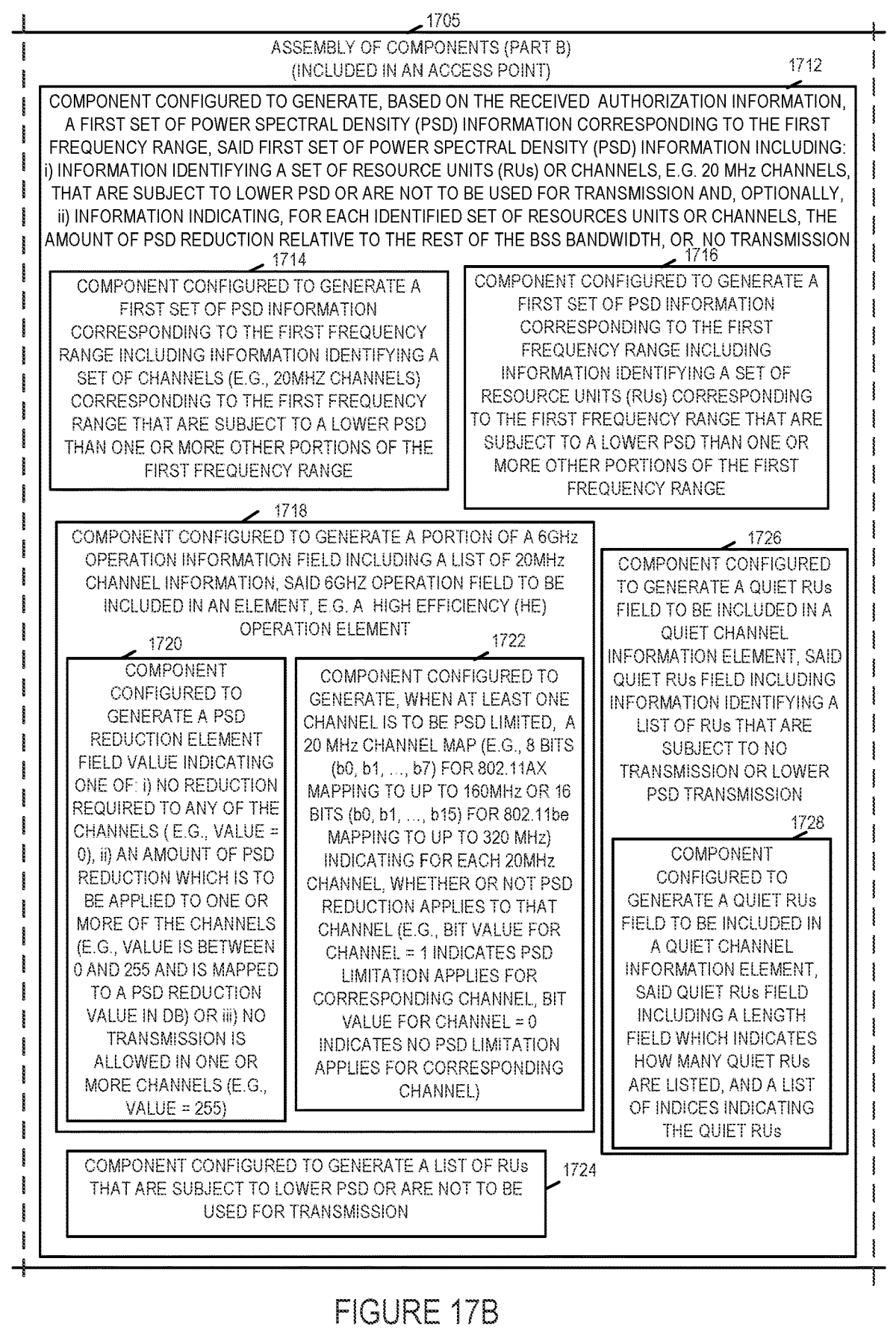

ASSEMBLY OF COMPONENTS (PART B)
(INCLUDED IN AN ACCESS POINT)

1712

COMPONENT CONFIGURED TO GENERATE, BASED ON THE RECEIVED AUTHORIZATION INFORMATION, A FIRST SET OF POWER SPECTRAL DENSITY (PSD) INFORMATION CORRESPONDING TO THE FIRST FREQUENCY RANGE, SAID FIRST SET OF POWER SPECTRAL DENSITY (PSD) INFORMATION INCLUDING: i) INFORMATION IDENTIFYING A SET OF RESOURCE UNITS (RUs) OR CHANNELS, E.G. 20 MHz CHANNELS, THAT ARE SUBJECT TO LOWER PSD OR ARE NOT TO BE USED FOR TRANSMISSION AND, OPTIONALLY, ii) INFORMATION INDICATING, FOR EACH IDENTIFIED SET OF RESOURCES UNITS OR CHANNELS, THE AMOUNT OF PSD REDUCTION RELATIVE TO THE REST OF THE BSS BANDWIDTH, OR NO TRANSMISSION

1714

COMPONENT CONFIGURED TO GENERATE A FIRST SET OF PSD INFORMATION CORRESPONDING TO THE FIRST FREQUENCY RANGE INCLUDING INFORMATION IDENTIFYING A SET OF CHANNELS (E.G., 20MHZ CHANNELS) CORRESPONDING TO THE FIRST FREQUENCY RANGE THAT ARE SUBJECT TO A LOWER PSD THAN ONE OR MORE OTHER PORTIONS OF THE FIRST FREQUENCY RANGE

1716

COMPONENT CONFIGURED TO GENERATE A FIRST SET OF PSD INFORMATION CORRESPONDING TO THE FIRST FREQUENCY RANGE INCLUDING INFORMATION IDENTIFYING A SET OF RESOURCE UNITS (RUs) CORRESPONDING TO THE FIRST FREQUENCY RANGE THAT ARE SUBJECT TO A LOWER PSD THAN ONE OR MORE OTHER PORTIONS OF THE FIRST FREQUENCY RANGE

1718

COMPONENT CONFIGURED TO GENERATE A PORTION OF A 6GHz OPERATION INFORMATION FIELD INCLUDING A LIST OF 20MHz CHANNEL INFORMATION, SAID 6GHZ OPERATION FIELD TO BE INCLUDED IN AN ELEMENT, E.G. A HIGH EFFICIENCY (HE) OPERATION ELEMENT

1726

COMPONENT CONFIGURED TO GENERATE A QUIET RUs FIELD TO BE INCLUDED IN A QUIET CHANNEL INFORMATION ELEMENT, SAID QUIET RUs FIELD INCLUDING INFORMATION IDENTIFYING A LIST OF RUs THAT ARE SUBJECT TO NO TRANSMISSION OR LOWER PSD TRANSMISSION

1720

COMPONENT CONFIGURED TO GENERATE A PSD REDUCTION ELEMENT FIELD VALUE INDICATING ONE OF: i) NO REDUCTION REQUIRED TO ANY OF THE CHANNELS ( E.G., VALUE = 0), ii) AN AMOUNT OF PSD REDUCTION WHICH IS TO BE APPLIED TO ONE OR MORE OF THE CHANNELS (E.G., VALUE IS BETWEEN 0 AND 255 AND IS MAPPED TO A PSD REDUCTION VALUE IN DB) OR iii) NO TRANSMISSION IS ALLOWED IN ONE OR MORE CHANNELS (E.G., VALUE = 255)

1722

COMPONENT CONFIGURED TO GENERATE, WHEN AT LEAST ONE CHANNEL IS TO BE PSD LIMITED, A 20 MHz CHANNEL MAP (E.G., 8 BITS (b0, b1, ..., b7) FOR 802.11AX MAPPING TO UP TO 160MHz OR 16 BITS (b0, b1, ..., b15) FOR 802.11be MAPPING TO UP TO 320 MHz) INDICATING FOR EACH 20MHz CHANNEL, WHETHER OR NOT PSD REDUCTION APPLIES TO THAT CHANNEL (E.G., BIT VALUE FOR CHANNEL = 1 INDICATES PSD LIMITATION APPLIES FOR CORRESPONDING CHANNEL, BIT VALUE FOR CHANNEL = 0 INDICATES NO PSD LIMITATION APPLIES FOR CORRESPONDING CHANNEL)

1728

COMPONENT CONFIGURED TO GENERATE A QUIET RUs FIELD TO BE INCLUDED IN A QUIET CHANNEL INFORMATION ELEMENT, SAID QUIET RUs FIELD INCLUDING A LENGTH FIELD WHICH INDICATES HOW MANY QUIET RUs ARE LISTED, AND A LIST OF INDICES INDICATING THE QUIET RUs

COMPONENT CONFIGURED TO GENERATE A LIST OF RUs THAT ARE SUBJECT TO LOWER PSD OR ARE NOT TO BE USED FOR TRANSMISSION

Figure 17C:
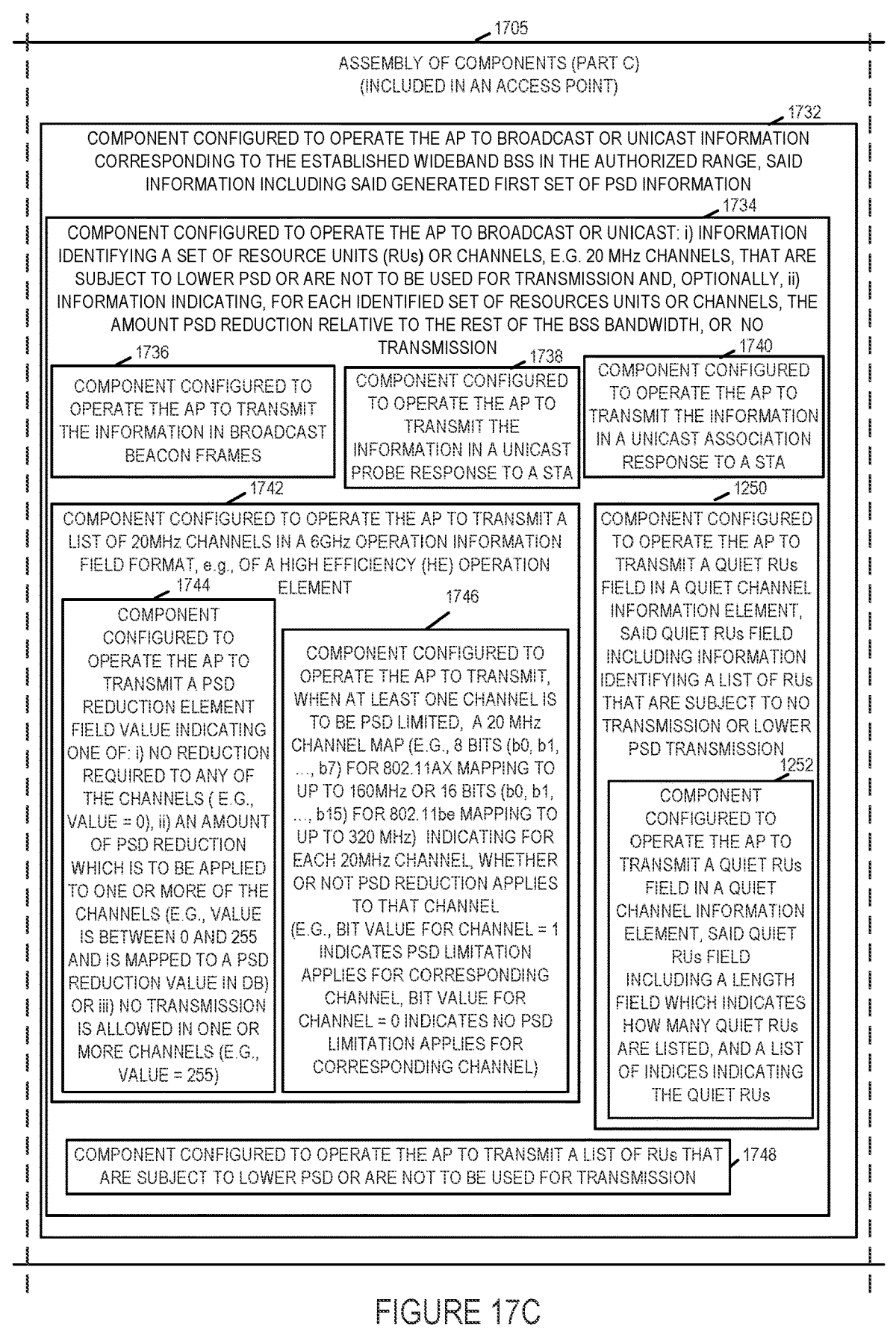

ASSEMBLY OF COMPONENTS (PART C)
(INCLUDED IN AN ACCESS POINT)

1732

COMPONENT CONFIGURED TO OPERATE THE AP TO BROADCAST OR UNICAST INFORMATION CORRESPONDING TO THE ESTABLISHED WIDEBAND BSS IN THE AUTHORIZED RANGE, SAID INFORMATION INCLUDING SAID GENERATED FIRST SET OF PSD INFORMATION

1734

COMPONENT CONFIGURED TO OPERATE THE AP TO BROADCAST OR UNICAST: i) INFORMATION IDENTIFYING A SET OF RESOURCE UNITS (RUs) OR CHANNELS, E.G. 20 MHz CHANNELS, THAT ARE SUBJECT TO LOWER PSD OR ARE NOT TO BE USED FOR TRANSMISSION AND, OPTIONALLY, ii) INFORMATION INDICATING, FOR EACH IDENTIFIED SET OF RESOURCES UNITS OR CHANNELS, THE AMOUNT PSD REDUCTION RELATIVE TO THE REST OF THE BSS BANDWIDTH, OR NO TRANSMISSION

1736

COMPONENT CONFIGURED TO OPERATE THE AP TO TRANSMIT THE INFORMATION IN BROADCAST BEACON FRAMES

1738

COMPONENT CONFIGURED TO OPERATE THE AP TO TRANSMIT THE INFORMATION IN A UNICAST PROBE RESPONSE TO A STA

1740

COMPONENT CONFIGURED TO OPERATE THE AP TO TRANSMIT THE INFORMATION IN A UNICAST ASSOCIATION RESPONSE TO A STA

1742

COMPONENT CONFIGURED TO OPERATE THE AP TO TRANSMIT A LIST OF 20MHz CHANNELS IN A 6GHz OPERATION INFORMATION FIELD FORMAT, e.g., OF A HIGH EFFICIENCY (HE) OPERATION ELEMENT

1744

COMPONENT CONFIGURED TO OPERATE THE AP TO TRANSMIT A PSD REDUCTION ELEMENT FIELD VALUE INDICATING ONE OF: i) NO REDUCTION REQUIRED TO ANY OF THE CHANNELS ( E.G., VALUE = 0), ii) AN AMOUNT OF PSD REDUCTION WHICH IS TO BE APPLIED TO ONE OR MORE OF THE CHANNELS (E.G., VALUE IS BETWEEN 0 AND 255 AND IS MAPPED TO A PSD REDUCTION VALUE IN DB) OR iii) NO TRANSMISSION IS ALLOWED IN ONE OR MORE CHANNELS (E.G., VALUE = 255)

1746

COMPONENT CONFIGURED TO OPERATE THE AP TO TRANSMIT, WHEN AT LEAST ONE CHANNEL IS TO BE PSD LIMITED, A 20 MHz CHANNEL MAP (E.G., 8 BITS (b0, b1, ..., b7) FOR 802.11AX MAPPING TO UP TO 160MHz OR 16 BITS (b0, b1, ..., b15) FOR 802.11be MAPPING TO UP TO 320 MHz) INDICATING FOR EACH 20MHz CHANNEL, WHETHER OR NOT PSD REDUCTION APPLIES TO THAT CHANNEL (E.G., BIT VALUE FOR CHANNEL = 1 INDICATES PSD LIMITATION APPLIES FOR CORRESPONDING CHANNEL, BIT VALUE FOR CHANNEL = 0 INDICATES NO PSD LIMITATION APPLIES FOR CORRESPONDING CHANNEL)

1250

COMPONENT CONFIGURED TO OPERATE THE AP TO TRANSMIT A QUIET RUs FIELD IN A QUIET CHANNEL INFORMATION ELEMENT, SAID QUIET RUs FIELD INCLUDING INFORMATION IDENTIFYING A LIST OF RUs THAT ARE SUBJECT TO NO TRANSMISSION OR LOWER PSD TRANSMISSION

1252

COMPONENT CONFIGURED TO OPERATE THE AP TO TRANSMIT A QUIET RUs FIELD IN A QUIET CHANNEL INFORMATION ELEMENT, SAID QUIET RUs FIELD INCLUDING A LENGTH FIELD WHICH INDICATES HOW MANY QUIET RUs ARE LISTED, AND A LIST OF INDICES INDICATING THE QUIET RUs

1748

COMPONENT CONFIGURED TO OPERATE THE AP TO TRANSMIT A LIST OF RUs THAT ARE SUBJECT TO LOWER PSD OR ARE NOT TO BE USED FOR TRANSMISSION

ASSEMBLY OF COMPONENTS (PART D)
(INCLUDED IN AN ACCESS POINT)

COMPONENT CONFIGURED TO OPERATE THE AP TO RECEIVE, IN THE FIRST
FREQUENCY RANGE, A FRAME FROM ONE OR MORE STATIONS (STAs)   1756

1758

COMPONENT CONFIGURED TO PROCESS THE RECEIVED FRAME TO DETECT IF THE RECEIVED
FRAME INCLUDE ONE OR MORE RESOURCE UNITS (RUs) OR CHANNELS ON WHICH NO DATA
WAS TO BE TRANSMITTED, E.G., ON WHICH NO TRANSMISSION IS PERMITTED

COMPONENT CONFIGURED TO DETERMINE IF THE RECEIVED FRAME INCLUDES ONE
OR MORE OF THE RESOURCE UNITS OR CHANNELS ON WHICH NO DATA WAS TO BE
TRANSMITTED, E.G. ON WHICH NO TRANSMISSION IS PERMITTED, AND TO CONTROL
OPERATION AS A FUNCTION OF THE DETERMINATION   1760

COMPONENT CONFIGURED TO IDENTIFY CHANNELS AND/OR RESOURCE UNITS (RUs) IN
THE FRAME ON WHICH NO DATA WAS TO TRANSMITTED, IN RESPONSE TO A
DETERMINATION THAT THE RECEIVED FRAME INCLUDES ONE OR RESOURCE UNITS OR
CHANNELS ON WHICH NO DATA WAS TO BE TRANSMITTED, E.G., ON WHICH NO
TRANSMISSION IS PERMITTED   1762

1764

COMPONENT CONFIGURED TO DECODE THE
RECEIVED FRAME ASSUMING THAT NO DATA
WAS TRANSMITTED ON THE RUs OR
CHANNELS, ON WHICH THE AP PREVIOUSLY
INDICATED THAT NO DATA WAS TO BE
TRANSMITTED

1766

COMPONENT CONFIGURED TO DECODE THE
RECEIVED FRAME AS NORMAL IN RESPONSE TO A
DETERMINATION THAT THE RECEIVED FRAME DOES
NOT INCLUDE ANY OF THE RESOURCE UNITS OR
CHANNELS ON WHICH NO DATA WAS TO BE
TRANSMITTED

COMPONENT CONFIGURED TO DETERMINE IF THE AP HAS DATA TO TRANSMIT TO ONE OR MORE
STATIONS (STAs) AND TO CONTROL OPERATION AS A FUNCTION OF THE DETERMINATION

1767

1768

COMPONENT CONFIGURED TO OPERATE AP TO TRANSMIT DATA USING RUs AND/OR 20 MHZ SUB-
CHANNELS WITHOUT USING, E.G. AVOIDING, TRANSMISSION ON RUs AND/OR 20 MHZ SUB-CHANNELS
SUBJECT TO LOWER OR ZERO PSD CONSTRAINTS AS COMPARED TO OTHER RUs/ 20 MHZ SUB-
CHANNELS; IN SOME EMBODIMENTS AP TRANSMISSION OF DATA DOES NOT INCLUDE TRANSMISSION
OF LEGACY STF, LTF, L-SIG PREAMBLES AND/OR 11ax/11be SIG-A or SIG-B PREAMBLES IN THE 20 MHZ
SUB-CHANNELS THAT INCLUDE THE LIST OF RUs AND/OR 20MHz SUB-CHANNELS SUBJECT TO LOWER
OR ZERO PSD

FIGURE 17D

| FIGURE 17A | FIGURE 17B | FIGURE 17C | FIGURE 17D |

FIGURE 17

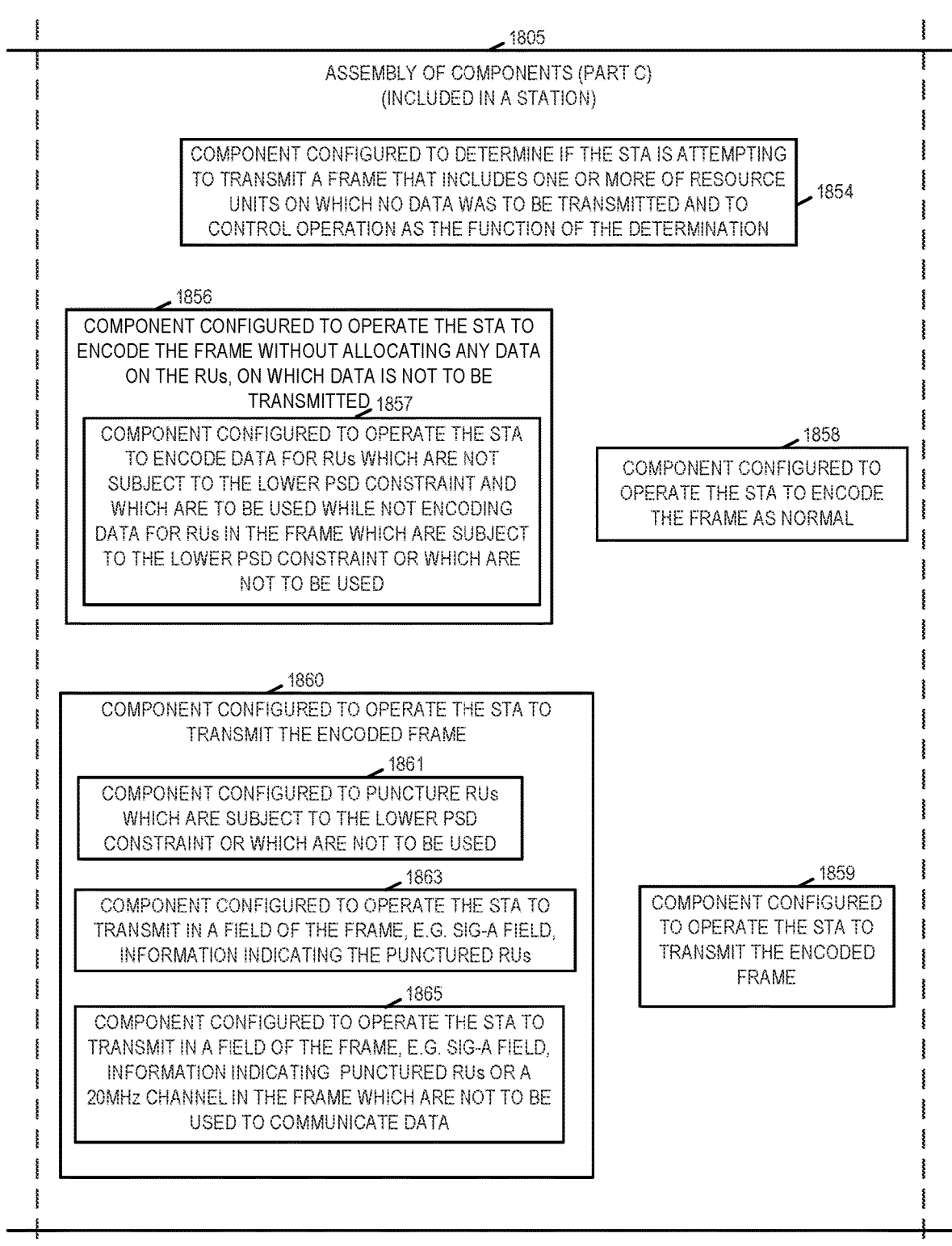

1805

ASSEMBLY OF COMPONENTS (PART C)
(INCLUDED IN A STATION)

COMPONENT CONFIGURED TO DETERMINE IF THE STA IS ATTEMPTING TO TRANSMIT A FRAME THAT INCLUDES ONE OR MORE OF RESOURCE UNITS ON WHICH NO DATA WAS TO BE TRANSMITTED AND TO CONTROL OPERATION AS THE FUNCTION OF THE DETERMINATION   1854

1856

COMPONENT CONFIGURED TO OPERATE THE STA TO ENCODE THE FRAME WITHOUT ALLOCATING ANY DATA ON THE RUs, ON WHICH DATA IS NOT TO BE TRANSMITTED 1857

COMPONENT CONFIGURED TO OPERATE THE STA TO ENCODE DATA FOR RUs WHICH ARE NOT SUBJECT TO THE LOWER PSD CONSTRAINT AND WHICH ARE TO BE USED WHILE NOT ENCODING DATA FOR RUs IN THE FRAME WHICH ARE SUBJECT TO THE LOWER PSD CONSTRAINT OR WHICH ARE NOT TO BE USED

1858

COMPONENT CONFIGURED TO OPERATE THE STA TO ENCODE THE FRAME AS NORMAL

1860

COMPONENT CONFIGURED TO OPERATE THE STA TO TRANSMIT THE ENCODED FRAME

1861

COMPONENT CONFIGURED TO PUNCTURE RUs WHICH ARE SUBJECT TO THE LOWER PSD CONSTRAINT OR WHICH ARE NOT TO BE USED

1863

COMPONENT CONFIGURED TO OPERATE THE STA TO TRANSMIT IN A FIELD OF THE FRAME, E.G. SIG-A FIELD, INFORMATION INDICATING THE PUNCTURED RUs

1859

COMPONENT CONFIGURED TO OPERATE THE STA TO TRANSMIT THE ENCODED FRAME

1865

COMPONENT CONFIGURED TO OPERATE THE STA TO TRANSMIT IN A FIELD OF THE FRAME, E.G. SIG-A FIELD, INFORMATION INDICATING PUNCTURED RUs OR A 20MHz CHANNEL IN THE FRAME WHICH ARE NOT TO BE USED TO COMMUNICATE DATA

FIGURE 18C

| FIGURE 18A | FIGURE 18B | FIGURE 18C | FIGURE 18D |

METHODS AND APPARATUS FOR OPERATION IN 6 GHz AND COEXISTENCE WITH INCUMBENTS

RELATED APPLICATIONS

The present application is a continuation of U.S. patent application Ser. No. 17/397,288 which was filed on Aug. 9, 2021 and published as U.S. Patent Application Publication No. US 2023-0043655 A1 on Dec. 15, 2022. The aforementioned application is hereby expressly incorporated by reference in its entirety.

FIELD

The present application relates to wireless communications and, more particularly, to methods and apparatus for implementing efficient wireless communications in unlicensed radio local area networks (RLANs) using 6 GHz spectrum in the presence of incumbent devices.

BACKGROUND

The Federal Communications Commission (FCC) has recently authorized unlicensed use of 6 GHZ spectrum under certain conditions. To protect incumbent users of the 6 GHz spectrum, an automatic frequency controller (AFC) system evaluates potential interference that may be caused by radio local area network (RLAN) devices, which want to operate in the 6 GHz spectrum. The AFC system evaluates and authorizes an RLAN device, e.g., a WiFi AP, to operate in a frequency range within the 6 GHz spectrum. The authorization may, and sometimes does, include power spectral density (PSD) limitation information which identifies a portion of the authorized frequency range which is subject to a lower PSD level (due to a detected incumbent device) than other portions of the authorized frequency range. Typically, the RLAN device would operate at the lowest specified PSD throughput its entire operational bandwidth to satisfy the AFC imposed PSD limitation. However, this approach does not make efficient use of the available resources, which have been indicated to be available by the AFC.

Based on the above description discussion it should be appreciated that there is a need for improved methods and/or apparatus to use PSD information. In particular there is a need for methods and/or apparatus that would allow an RLAN included the capability to use PSD information and/or manage both frequencies subject to lower PSD constraints and/or frequencies subject to normal PSD constraints, e.g., which can be used at a higher power level than those frequencies subject to the lower PSD constraints.

SUMMARY

Methods and apparatus directed to efficient use of available wireless communications resources are described. In at least some embodiments, an access point, seeking to operate as a RLAN device, receives authorization from an automated frequency controller (AFC) system for unlicensed operational use of a frequency range, e.g., a frequency range within 6 GHz spectrum. The authorization may, and sometimes does, include information identifying a portion of the authorized frequency range which is subject to a lower PSD constraint than other portions of the authorized frequency range, e.g., due to a detected incumbent receiver device operating in the 6 GHz frequency range in the vicinity of the RLAN device.

In various embodiments the access point establishes a wideband basis service set (BSS) for a RLAN based on the received information from the AFC system. The access point identifies, based on the received information from the AFC system, a set of channels, e.g., 20 MHz channels, and/or a set of resource units (RUs) which are to be subject to a lower PSD constraint or no transmission as compared to the rest of the BSS bandwidth. For example, a channel or RU in the BSS structure, which at least partially overlaps with the AFC system lower PSD frequency portion of the authorized frequency range is designated, by the AP, as a channel or RU subject to a lower PSD constraint or no transmission.

The access point generates and transmits broadcast signals, e.g., in beacon frames, and/or unicast signals, e.g., in probe response, association response, re-association response, to stations (STAs), which associate with the AP, to communicate the set of channels, e.g., 20 MHz channels, and/or the set of resource units (RUs) which are to be subject to a lower PSD constraint or no transmission (zero PSD). In one exemplary embodiment, the information is communicated in a PSD reduction field and a channel map field (e.g., a 20 MHz channel map field), of a 6 GHz Operation Information Element of an Operation Element (e.g. a High Efficiency (HE) Operation element). In another exemplary embodiment, the list of RUs is communicated in a Quiet RUs field of a Quiet Channel Information Element.

The AP and the STAs use the list of channels and/or RUs, subject to a reduced PSD level or no transmission allowed, when encoding frames, decoding frames, transmitting and receiving. In some embodiments, the list of channels and/or RUs, identifies resource units on which data is not to be encoded or transmitted.

In some embodiments, the access point and STA transmits data on the set of resource units which are not subject to the reduced PSD level or no transmission constraint and do not transmit data on the identified resource units which are subject to the reduced PSD level or no transmission constraint.

In some embodiments, the access point and/or STA control transmission PSD levels for different portions of the BSS band to be at different levels, e.g. a normal level, and a reduced level, based on whether or not the channel or RU is included in a list of channels or RUs subject to a lower PSD constraint.

In various embodiments, higher efficiency and higher data throughput is achieved by transmitting at the normal PSD level on the set of resource units which are not subject to the AFC reduced PSD level constraint (while not transmitting on the resource units subject to the AFC reduced PSD constraint due to incumbent user), than would have been achieved by transmitting at the AFC reduced PSD constraint level across the full BSS frequency range.

An exemplary method of operating an access point (AP), in accordance with some embodiments, comprises: receiving authorization to operate in a first frequency range including at least one portion subject to a lower spectral power density (PSD) than one or more other portions of the first frequency range; generating, based on the received authorization information, a first set of transmit power information corresponding to the first frequency range, said first set of transmit power information including information identifying one or more of: i) a set of resource units corresponding to the first frequency range that are subject to a lower transmit power than said one or more other portions of the first frequency range or ii) channels corresponding to the first frequency range that are subject to a lower transmit power than said one or more other portions of the first frequency range; and transmitting the first set of transmit power information.

A exemplary method of operating a station (STA), in accordance with some embodiments, comprises: receiving, at the station, information corresponding to a first frequency range being used by the station, said information identifying a set of resource units, e.g., by identifying specific resource units (RUs) or by identifying one or more channels, in the first frequency range that are subject to a lower power spectral density (PSD) constraint than other resource units or channels in the first frequency range or which are not to be used; and performing one or more of: i) transmitting data in a first frame which uses the first frequency range but which leaves at least some RUs, which are subject to the lower PSD constraint or which are not to be used, unused by the first frame or ii) decoding a received frame assuming that no data was transmitted on RUs which said information indicated are subject to the lower PSD constraint or are not to be used.

While various features discussed in the summary are used in some embodiments it should be appreciated that not all features are required or necessary for all embodiments and the mention of features in the summary should in no way be interpreted as implying that the feature is necessary or critical for all embodiments.

Numerous aspects, features, and variations on the above described methods and apparatus are discussed in the detailed description which follows.

BRIEF DESCRIPTION OF THE FIGURES

FIG. 5 shows the fields present in an exemplary information element in accordance with an exemplary embodiment.

FIG. 6 is a flowchart of an exemplary method of operating an access point (AP) in accordance with an exemplary embodiment.

FIG. 7 is a flowchart of an exemplary method of operating a station (STA) in accordance with an exemplary embodiment.

FIG. 12 comprises the combination of FIG. 12A, FIG. 12B and FIG. 12C.

FIG. 13D is a fourth part of a flowchart of an exemplary method of operating a station (STA) in accordance with an exemplary embodiment.

FIG. 13 comprises the combination of FIG. 13A, FIG. 13B, FIG. 13C and FIG. 13 D.

FIG. 17B is a second part of an assembly of components which may be included in an access point, e.g., a WiFi AP or a NRU gNB base station, supporting communications in 6 GHz band, in accordance with an exemplary embodiment.

FIG. 17C is a third part of an assembly of components which may be included in an access point, e.g., a WiFi AP or a NRU gNB base station, supporting communications in 6 GHz band, in accordance with an exemplary embodiment.

FIG. 17D is a fourth part of an assembly of components which may be included in an access point, e.g., a WiFi AP or a NRU gNB base station, supporting communications in 6 GHz band, in accordance with an exemplary embodiment.

FIG. 17 comprises the combination of FIG. 17A, FIG. 17B, FIG. 17C and FIG. 17D.

FIG. 18C is a third part of an assembly of components which may be included in a station (STA), e.g. a WiFi STA or a NRU user equipment (UE) device, supporting communications in 6 GHz band, in accordance with an exemplary embodiment.

DETAILED DESCRIPTION

Figure 1:
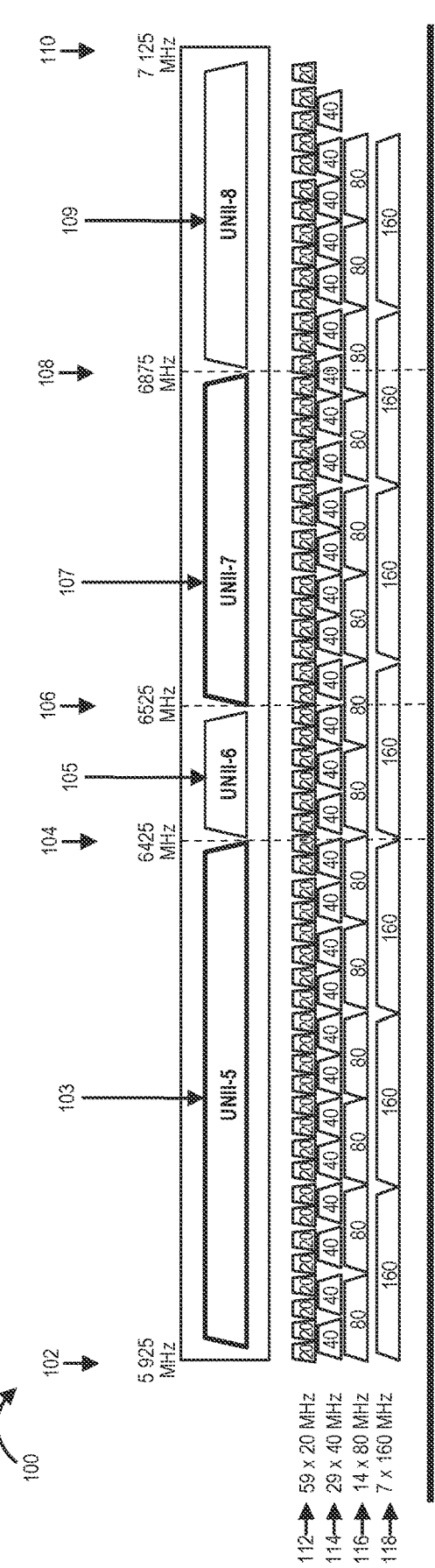
FIG. 1 is a drawing illustrating 6 GHz spectrum which the FCC has recently authorized for unlicensed use under certain conditions.

The Federal Communications Commission (FCC) has recently authorized unlicensed use of 6 GHZ spectrum under conditions (see "FCC 6 GHz Report and Order", April 2020). The 6 GHz spectrum is partitioned into several sections labelled Unlicensed National Information Infrastructure-5 (UNII-5), UNII-6, UNII-7 and UNII-8. FIG. 1 is a drawing 100 which illustrates 6 GHz spectrum and partitioning. UNII-5 103 extends from 5925 MHz to 6425 MHz; UNII-6 105 extends from 6425 MHz to 6525 MHz; UNII-7 107 extends from 6525 MHz to 6875 MHz; and UNII-8 109 extends from 6875 MHz to 7125 MHz. The 6 GHz spectrum can be, and sometime is partitioned to include 59 20 MHz channels, as indicated by row 112. Alternatively, the 6 GHz spectrum can be, and sometime is partitioned to include 29 40 MHz channels, as indicated by row 114. Alternatively, the 6 GHz spectrum can be, and sometime is partitioned to include 14 80 MHz channels, as indicated by row 116. Alternatively, the 6 GHz spectrum can be, and sometime is partitioned to include 7 160 MHz channels, as indicated by row 118.

The incumbent users/technologies in 6 GHz are: Fixed Satellite Services (FSS) and Fixed Microwave Services (FMS); Broadcast Auxiliary Service (BAS) and Cable Television Relay Service (CARS); and Unlicensed devices: Astronomy service observation (6650-6675 MHz) devices and low-power unlicensed ultra-wideband.

In order to protect incumbents, the FCC order has put limitations on power spectral density (PSD) of unlicensed devices.

In UNII-5 and UNII-7, higher-power unlicensed transmission is allowed. Unlicensed indoor/outdoor access points (APs) can operate if authorized by an Automatic Frequency Controller (AFC) system. If authorized, the transmission is allowed with PSD less than 23 dBm/MHz for Aps and 17 dBm/MHz for stations (STAs). This category of devices is called standard-power Radio Local Area Network (SP RLANs).

In UNII-5, UNII-6, UNII-7 and UNII-8, low power unlicensed transmission is allowed. Unlicensed low power indoor APs are operated. Operation is without Automatic Frequency Controller (AFC), i.e., no authorization is required as long as PSD is less than 5 dBm/5 MHz for APs and less than −1 dBm/MHz for STAs. For example, for a 20 MHz transmission, total power is capped at 18 dBm. This category of device is called low-power indoor (LP1).

Unlicensed devices are referred to as RLAN devices, e.g., WiFi APs/STAs, based on IEEE 802.11ax or 802.11 be specification, New Radio Unlicensed (NRU) gNBs/User Equipment (UE) devices, and Long Term Evolution (LTE) License Assisted Access (LAA) devices (for 5 GHz and potentially 6 GHz).

The role of an AFC system is to evaluate the level of interference that can be caused to a nearby incumbent receiver/link. The AFC system acquires location info, RX antenna pattern, etc. from incumbent links/receivers. An RLAN device that wants to operate in 6 GHz band, sends an inquiry to the AFC system with its location information, height, etc. The AFC system evaluates potential interference caused to each incumbent receiver (in the vicinity of the RLAN device) and evaluates in which portion(s) of the 6 GHz channel the RLAN device may operate and with what PSD level.

Figure 2:
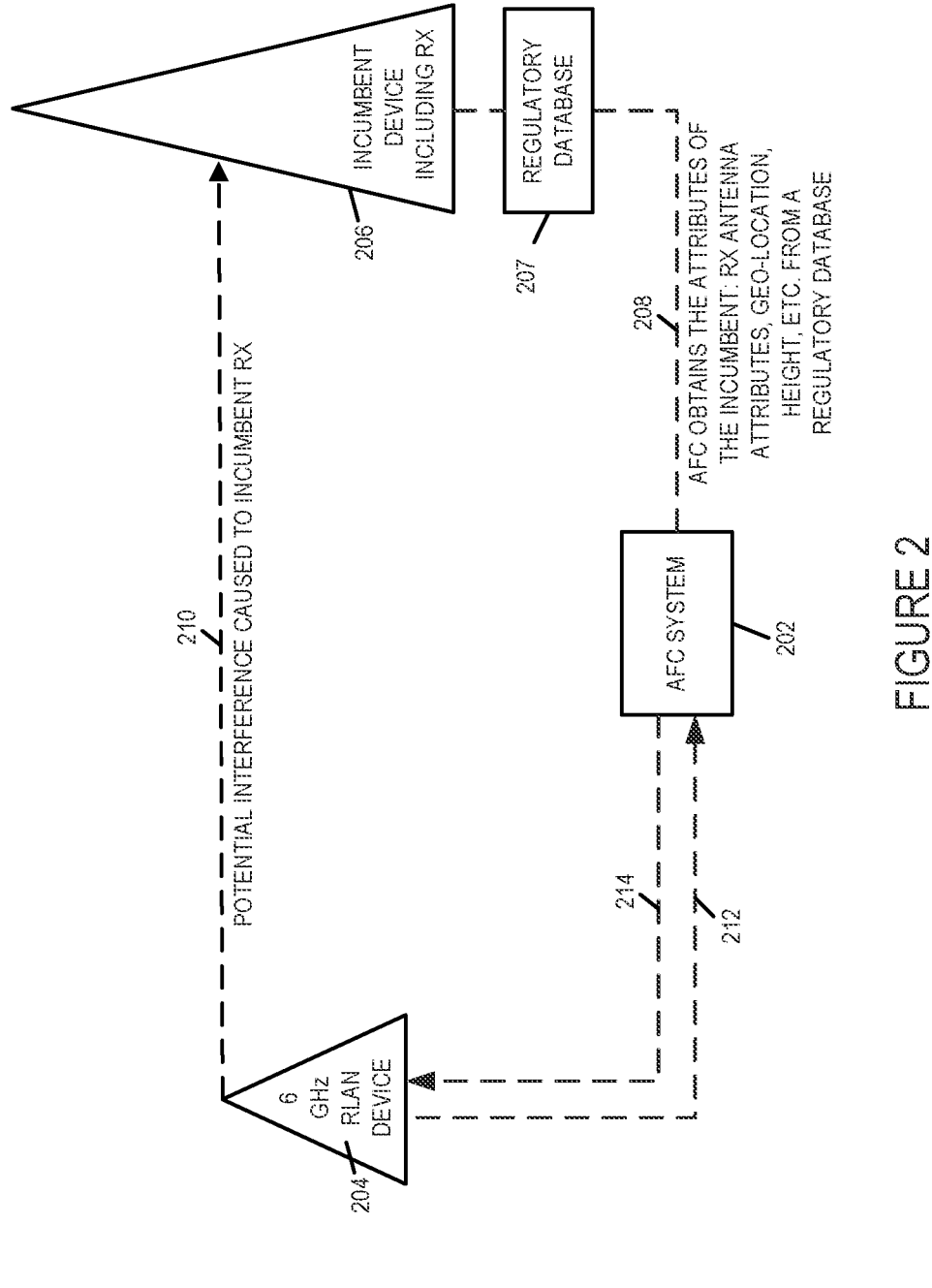
FIG. 2 is a drawing illustrating that an AFC system evaluates potential interference caused to each incumbent receiver in the vicinity of an RLAN device and evaluates in which portion of the 6 GHz channel the RLAN device may operate and determines power spectral density (PSD) level may be used.

FIG. 2 is a drawing 200 which illustrates an exemplary AFC system 202, an exemplary RLAN device 204, that wants to operate in the 6 GHz band, and an exemplary incumbent device 206 including a receiver (RX) operating in the 6 GHz band. The AFC 202 obtains, e.g., from regulatory database 207, the attributes 208 of the incumbent device 206 including, e.g., RX antenna attributes, geo-location, height etc. RLAN device 204, which wants to operate in the 6 GHz band sends inquiry 212 to the AFC system 202 with its location information, height, etc. The AFC system 202 evaluates the potential interference caused to each incumbent receiver (in the vicinity of the RLAN device 204), e.g., the receiver in incumbent device 206, and evaluates in which portion of the 6 GHz channel RLAN device 204 may operate and at what PSD level. Incumbent device 206 is one of the incumbent devices in the vicinity of RLAN device 204 and AFC system 202 determines the potential interference 210 caused by RLAN device 204 to the receiver of incumbent device 206. The AFC system 202 determines, based on the potential interference to incumbent receives, portion(s) of the 6 GHz band in which RLAN device 204 is allowed to operate and determines corresponding PSD level operation information for RLAN device 204. The AFC system 202 communicates the determined information to RLAN device 204 in a response message 214, which is in response to the inquiry 212.

IEEE 802.11ax has single-user Orthogonal Frequency Division Multiplexing (OFDM) signaling and it has multi-user Orthogonal Frequency Division Multiple Access (OFDMA) signaling (both for uplink (UL) and downlink (DL).

In OFDMA signaling, the bandwidth is partitioned to include multiple resource units. The RU naming indicates the number of tones per RU: RU26, RU52, RU106, RU242. RU26 indicates a RU of 26 tones, RU52 indicates a RU of 52 tones, RU 106 indicates a RU of 242 tones and RU 242 indicates a RU of 242 tones.

Figure 3:
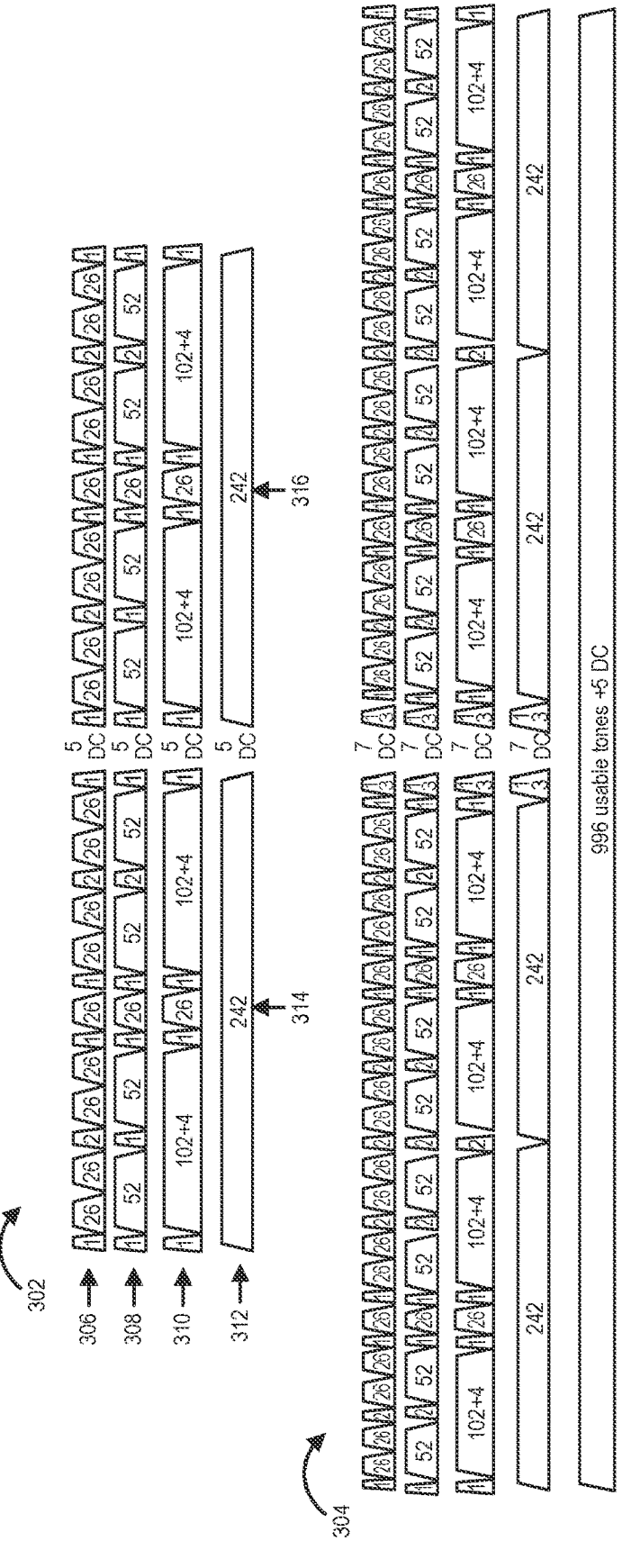
FIG. 3 includes a drawing which illustrates resource unit (RU) partitions for a 40 MHZ bandwidth and a drawing which illustrates resource unit (RU) partition for a 80 MHz bandwidth, in IEEE 802.11ax and IEEE 802.11be standard specifications.

Drawing 302 of FIG. 3 shows RU partitions for a 40 MHz bandwidth. Drawing 304 of FIG. 3 shows RU partitions for a 80 MHz bandwidth. Similar type of partitioning is used for 20 MHz bandwidth and 160 MHz bandwidth. The number of RUs in a BW varies.

For the BW=40 MHz example of drawing 302 there are 18 RU26s (as indicated in row 306) which are indexed in a pre-known order. Alternatively, the 40 MHz bandwidth may be indexed with 8 RU52s and two RU26S (as indicated in row 308) or with 4 RU106s and two RU26s (as indicated in row 310), or with two RU242s (as indicated in row 312). Note that RU242 (314, 316) equivalently identifies a 20 MHz sub-channel.

An incumbent link/device may operate on bandwidth that is narrower than the bandwidth of an unlicensed RLAN. If this happens the PSD limitation should be respected for the portion of the RLAN bandwidth that is occupied by the incumbent link/device.

Considering WiFi 6 GHz channelization, for BW<80 MHz partial overlap with an incumbent, e.g., a fixed service (FS) device such a FMS device, is likely, and for BW=160/320 MHz, it is likely to have full overlap.

Figure 4:
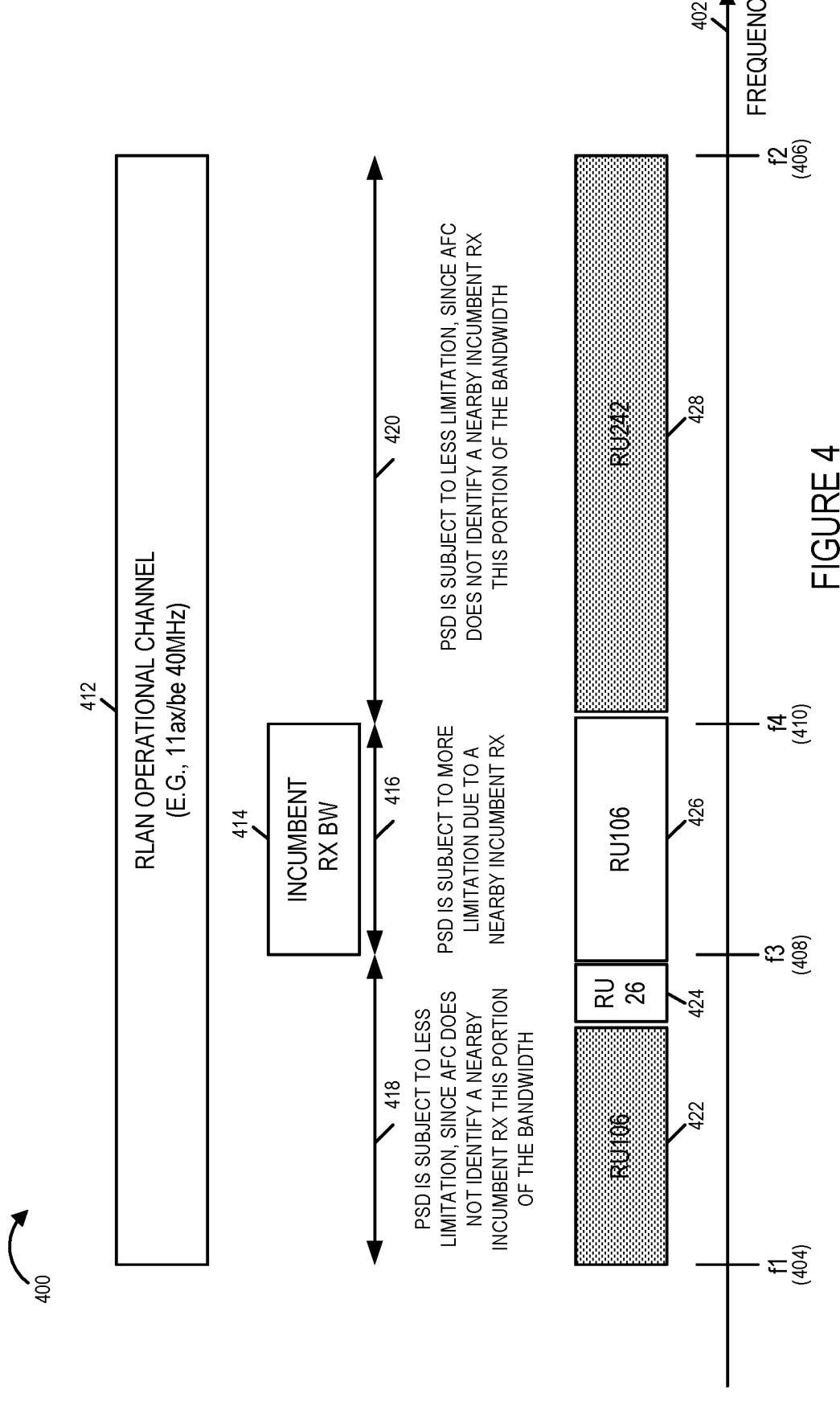
FIG. 4 illustrates an exemplary RLAN operational channel, e.g., assigned by a AFC system to an RLAN AP in response to a request for 6 GHz spectrum, exemplary incumbent RX BW, and an exemplary portions of the RLAN operational channel which are subjected to different PSD limitations.

FIG. 4 is a drawing 400 which illustrates an exemplary RLAN operational channel 412, e.g., an 802.11 ax/be 40 MHz channel, and exemplary incumbent RX bandwidth (BW) 414, and resource units (RU106 422, RU26 424, RU106 426, and RU242 428) corresponding to the RLAN channel 412. The exemplary RLAN operational frequency range (f1-f2) corresponding to the RLAN channel 412 may have been communicated to the RLAN, by an AFC system, along with AFC PSD limitation information.

The RLAN operation channel 412 corresponds to a frequency range from f1 404 to f2 406. The incumbent RX BW 414 corresponds to a frequency range from f3 408 to f4 410, which is indicated as frequency range 416. The RLAN operational channel 412 includes frequency range portion 418, frequency range portion 416 and frequency range portion 420. In frequency range portion 416, which corresponds to an incumbent RX, the PSD for an RLAN device is subject to more limitation due to a nearby incumbent RX than in frequency range portions 418 and 420.

Some of the RUs (RU106 422, RU 26 424 and RU242 428) corresponds to frequencies in the frequency range portions (418, 420) which are subject to less PSD restriction. However, a portion, e.g., a large portion, of RU106 426 corresponds to frequencies in frequency range portion 416 which is subject to more PSD restriction due to a nearby incumbent RX.

If the RLAN device operates with the lowest PSD throughout its operational BW (f1-f2), it would satisfy the AFC PSD limitation; however, it would lose the chance to transmit with higher power in the non-overlapped portion of the BW.

An exemplary radio local area network (RLAN), implemented in accordance with a feature of some exemplary embodiments of the present invention, has the capability to manage lower/normal PSD corresponding to different frequencies ranges. Various methods and apparatus, suitable for 802.11ax/be based operation in 6 GHz, are described in which an RLAN device can, and sometimes does, operate with highest possible power/PSD in the frequency portions that is authorized.

In some embodiments, after a 802.11ax/be based access point (AP) obtains authorization from an AFC, the AP announces the portion of the BW that is subject to a lower PSD. The AP may, and sometimes does, establish Primary 20 MHz (or Primary 40 MHz) channel of the BSS on the portion of the wider bandwidth that is not subject to a lower PSD. This is helpful for transmission efficiency of Control and Management frames that are mostly transmitted on the primary 20 MHz channel.

The portion of the operation bandwidth subject to a lower PSD may be, and sometimes is, identified by a list of 20 MHz channels, e.g., in a wideband BSS of 80/160/320 MHz depending on the bandwidth of the incumbent RX. One or multiple 20 MHz channels may be subject to low PSD.

Alternatively, the portion of the operation bandwidth subject to a lower PSD may be, and sometimes is, identified by a list of resource units (RUs). The AP identifies a list of RUs, e.g., a list of 26-tone and/or 52-tone and/or 106 tone RUs, that are subject to no transmission.

The list of restricted RUs may be, and sometimes is, announced in: Beacon frames, Probe Response, Association Response and/or other management frames. In announcing the list of restricted RUs, the AP identifies the established BSS as a BSS whose operation bandwidth has permanent punctured RUs in downlink and uplink transmissions. The STAs, that associate with this AP and want to transmit frames in the uplink have to puncture the identified RUs whenever the bandwidth of the frame encompasses one or more of the restricted RUs. If a STA is not capable of doing so, the STA has to transmit in a narrower bandwidth that does not encompass any restricted RUs.

Figure 5:
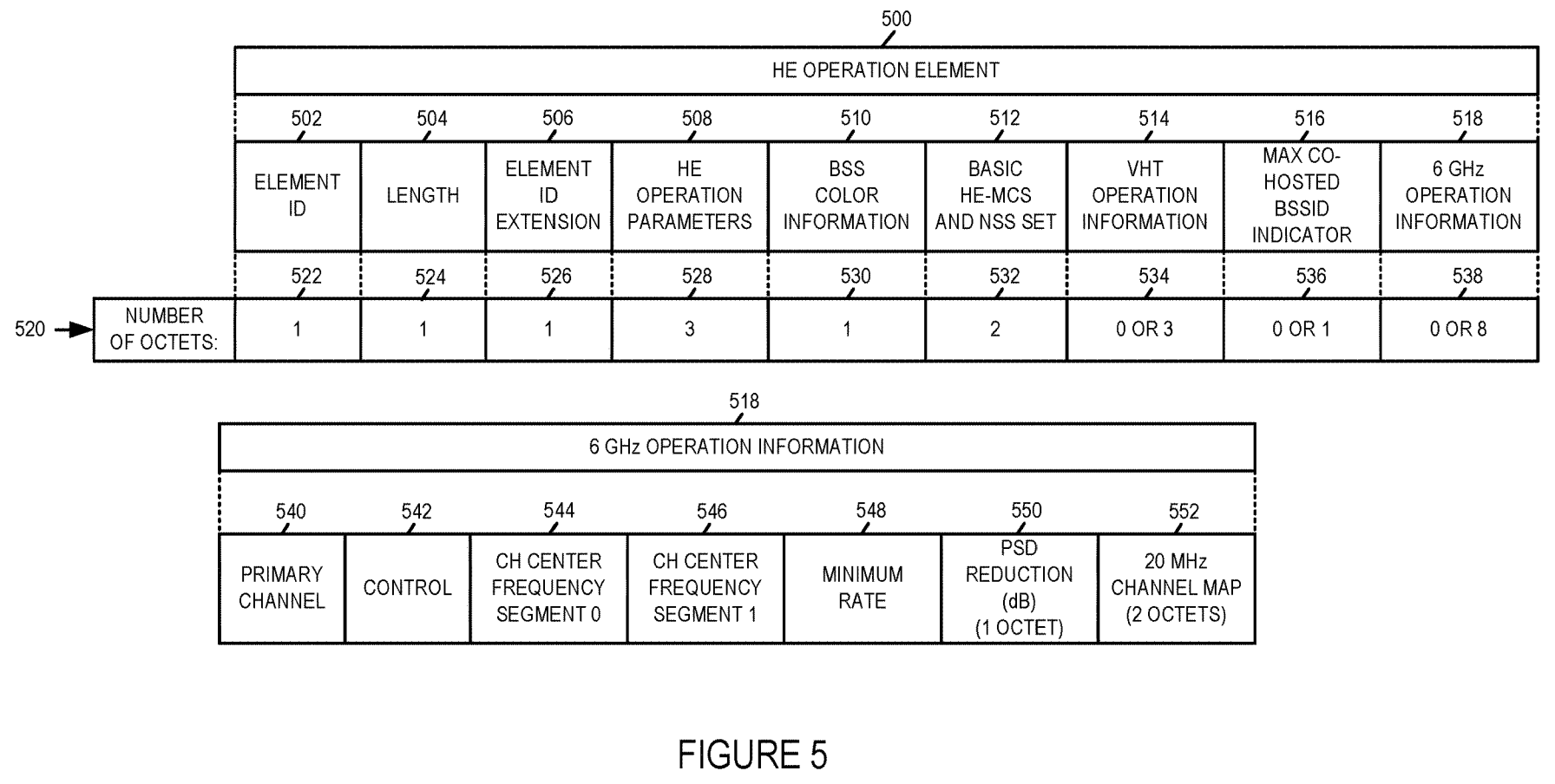

One way to indicate a list of 20 MHz channels (subject to a lower or zero PSD) is to include the list of 20 MHz channels in the "6 GHz Operation information field format" of "HE Operation element format" as shown in FIG. 5. In the current 802.11ax specification, there is an HE Operation element including a 6 GHz Operation Information field. However, in accordance with a feature of various embodiments of the present invention, an exemplary 6 GHz operation information field of an exemplary HE Operation element, in accordance with the present invention, includes new fields: i) a "PSD reduction (dB)" field and ii) a "20 MHz Channel map" field.

The field "PSD Reduction (dB)" is present to indicate the amount required to reduce the PSD compared to the rest of the BSS bandwidth. A TBD1 value, e.g., 255, indicates that no transmission is allowed in the specified 20 MHz channels. A TBD2 value, e.g., 0, indicates that no PSD reduction is required. Other values, e.g., values in between 0 and 255, are mapped to a PSD reduction value in db. In some embodiments, if the PSD Reduction field value is set to the TBD2 value, e.g. 0, indicating no PSD reduction, then the subsequent field, which is the "20 MHz Channel Map" field is not included, e.g. to reduce signaling overhead.

The field "20 MHz Channel Map", which is 0 or 2 octets has 16 bits (b0, b1, . . . , b15), where b0 maps to the primary channel, b1 maps to the secondary channel, etc. For 802.11ax, (b0, b2, . . . , b7) maps to max 160 MHz and for 802.11be (b0, b1, . . . , b15) maps to max 320 MHz. When a bit value in a particular position in the field is set to a value of one, that indicates that the reduction of PSD applies to the corresponding 20 MHz channel; otherwise, when the bit in the particular position in particular position in the field is set to zero, that indicates that no additional PSD reduction applies to the corresponding 20 MHz channel.

In some embodiments, the same structure of identifying one or more 20 MHz channels subject to lower PSD may be, and sometimes is, present in "6 GHZ Operation Information" for 802.11 ax/be, in other information elements, that would be broadcast in Beacon frames, or unicasted in Probe Response, Association Response, Re-association Response etc.

FIG. 5 is a drawing of an exemplary High Efficiency (HE) operation element 500 in accordance with an exemplary embodiment. HE operation element 500 includes an Element ID field 502, a Length field 504, an Element ID Extension field 506, BSS Color information field 510, BS HE-MCS and NSS set field 512, VHR operation information field 514, Max Co-Hosted BSSID indictor field 516, and 6 GHZ operation information field 518. Row 520 indicates the number of octets for each of the fields. The HE operation element 500 fields (502, 504, 506, 508, 510, 512, 514, 516, 518) include (1, 1, 1, 3, 1, 2, 0 or 3, 0 or 1, 0 or 8) octets, respectively, as indicated by blocks (522, 524, 526, 528, 530, 532, 534, 536, 538), respectively.

The 6 GHz Operation Information 518 includes a primary channel field 540, a control field 542, a CH center frequency segment 0 field 544, a CH center frequency segment 1 field 546, a minimum rate field 538, a PSD reduction (dB) field 550, which is 1 octet, and a 20 MHz channel map field, which is 2 octets.

STAs that are associated with this AP, when transmitting a frame to the AP, may, and sometimes doe, puncture the RUs or the 20 MHz channel that are subject to a lower PSD.

In some embodiments, when transmitting a frame, the STA identifies the punctured RUs or 20-MHz channel in a field in the SIG-A field of the frame. Alternatively, in some embodiments, the STA identifies this option during the association process. The AP then recognizes that the 20 MHz channel is always punctured by the STA, if the STA transmits on OFDM (or trigger-based OFDMA) frame whose bandwidth encompasses said 20 MHz channel. Otherwise, if the 20 MHz channel is not a portion of bandwidth of UL frame, no puncturing transmission is assumed.

Alternatively, the STA may use OFDMA signaling for UL transmission. The STA avoids transmission on the list of RUs with lower PSD. The STA may, and sometimes does, identify this mode of operation during its association with the AP. The AP then recognizes that the identified list of RUs is always punctured by the STA, if a STA transmits a OFDMA frame whose bandwidth encompasses the RUs from the list of low-PSD RUs. The AP receiving an OFDMA frame assumes the symbols on the list of RUs are absent. This assumption helps the channel decoder at the AP to appropriately decode the received frame.

FIG. 6 is a flowchart 600 of an exemplary method of operating an access point (AP) in accordance with an exemplary embodiment. Operation starts in step 602, in which the AP is powered on and initialized. Operation proceeds from start step 602 to step 604. In step 604, the AP is operated to request authorization to operate in a 6 GHz from an AFC system, e.g., the AP sends a request to operate in 6 GHz to an AFC system, said request including device geo-location information, device height information, etc. Operation proceeds from step 604 to step 606.

In step 606 the AP receives, e.g., from the AFC system, authorization to operate in a frequency range within the 6 GHz spectrum, with a specified power spectral density (PSD) per each portion, e.g., each 1 MHz, with the range. Operation proceeds from step 606 to step 608.

In step 608 the AP establishes a wideband BSS in the authorized range. Operation proceeds from step 608 to step 610. In step 610 the AP broadcasts or unicasts information identifying a set of RUs or 20 MHz channels that are subject to lower PSD (with regard to the rest of the established BSS range) or no transmission. Operation proceeds from step 610 to step 612.

In step 612 the AP is operated to detect/decode received frames. Step 612 includes steps 614 and 616. In step 614 the AP is operated to detect/decode a received frame that includes one or more of the RUs of the set of identified RUs (subject to lower PSD or no transmission) or one or more channels of the set of identified channels (subject to lower PSD or no transmission), said detect/decode operation assuming no data is being transmitted on the RUs of the set of identified RUs or 20 MHz channel(s) of the set of identified 20 MHz channels. In step 616 the AP is operated to detect/decode a received frame that does not include one or more of the RUs of the set of identified RUs (subject to lower PSD or no transmission) or one or more channels of the set of identified channels (subject to lower PSD or no transmission), said detect/decode operation being a normal detect/decode operation.

FIG. 7 is a flowchart 700 of an exemplary method of operating a station (STA) in accordance with an exemplary embodiment. Operation starts in step 702 in which the STA is powered on and initialized. Operation proceeds from start step 702 to step 704. In step 704 the STA is operated to associate with a Basic Service Set (BSS)/access point (AP). Operation proceeds from step 704 to step 706.

In step 706 the STA checks for RUs or 20 MHz sub-channels that are subject to lower power spectral density (PSD) or no transmission. Operation proceeds from step 706 to step 708.

In step 708 the STA is operated to receive information identifying RUs or 20 MHz sub-channels that are subject to lower PSD or no transmission. In some embodiments, the information identifying the RUs or 20 MHz sub-channels is communicated in broadcast beacon frames or unicasted to the STA in a probe response, an association response, a re-association response, etc. or other management message. Operation proceeds from step 708 to step 710 and step 712.

In step 710 the STA is operated to attempt to transmit frames. Step 710 includes steps 714, 716 and 718. For each frame to be transmitted the STA performs an iteration of step 714, in which the STA determines if the frame to be transmitted includes one or more of the identified RUs (that are subject to lower PSD or no transmission) or identified Sub-channels (that are subject to lower PSD or no transmission). If the determination of step 714 is that the frame to be transmitted includes one or more or the identified RUs or identified sub-channels, then operation proceeds from step 714 to step 716; otherwise operation proceeds from step 714 to step 718. In step 718 the STA is operated to encode the frame without allocating any data on the identified RUs or identified sub-channels. In step 718 the STA is operated to encode the frame as normal. Operation proceeds from step 716 or step 718 to step 720, in which the STA is operated to transmit the encoded frame.

In step 712 the STA is operated to attempt to receive frames from the AP. Step 712 includes steps 722, 724 and 726. For each frame to be received the STA performs an iteration of step 722, in which the STA determines if the frame to be received includes one or more of the identified RUs (that are subject to lower PSD or no transmission) or identified Sub-channels (that are subject to lower PSD or no transmission). If the determination of step 7222 is that the frame to be received includes one or more or the identified RUs or identified sub-channels, then operation proceeds from step 722 to step 724; otherwise, operation proceeds from step 722 to step 726. In step 724 the STA is operated to detect/decode the frame assuming no data ids transmitted on the identified RUs or identified sub-channels. In step 726 the STA is operated to detect/decode the frame as normal. In 802.11, the Quiet element (and Quiet Channel element) define an interval during which no transmission occurs in the current channel. The Quiet element is described in IEEE document doc.: IEEE 802.11-11/1388r0 dated October 2011 which is available at: https://mentor.ieee.org/802.11/dcn/11/11-11-1388-00-00ac-fair-quiet-for-dfs.ppt and which is hereby expressly incorporated by reference in its entirety.

Figure 8:
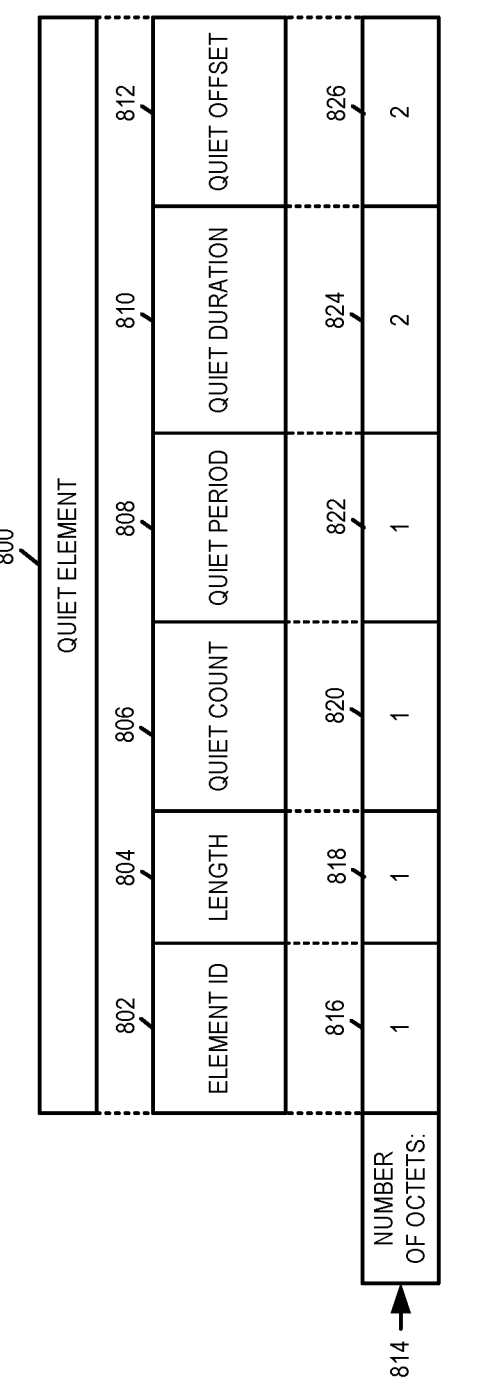
FIG. 8 is a drawing which shows a Quiet Element.

The Quiet interval can be used to assist in making channel measurements, etc. Quiet (Channel) Information Elements are used to indicate quiet interval for primary/secondary 80 MHz channel of a 160 MHz 802.11ac. Quiet element includes fields: ID, Length, Quiet Count, Quiet Period, Quiet Duration, Quiet Offset. FIG. 8 is a drawing which show Quiet element 800 including Element ID field 802, length field 804, quiet count field 806, quiet period field 808, quiet duration field 810 and quiet offset field 812. Row 814 indicates the number of octets for each of the fields (802, 804, 806, 808, 810, 812), which is (1, 1, 1, 1, 2, 2), respectively, as indicated by blocks (816, 818, 820, 822, 824, 826), respectively.

An AP may, and sometimes does, establish a new form of Quiet period for the portions of the BW that is subject to lower PSD (or subject to zero PSD, i.e. no transmission). In this exemplary embodiment, Quiet elements are used to announce Quiet Periods for a set of resource units (RUs).

An AP/RLAN receives authorization from an AFC system to operate in a frequency range, e.g. range (f1-f2) except for subsets of the range, e.g. (f3-f4), where the AP is not authorized to use it. The AP attempts to establish a BSS for said range, (f1-f2) and to establish a Quiet period for the subset (f3-f4).

In an exemplary embodiment, the Quiet elements include an additional new field: a Quiet RUs field. This Quiet RUs field includes a length field that indicates how many Quiet RUs are listed, and a list of indices indicated the RUs.

Inclusion of the Quiet RUs field disallows STAs from using said Quiet RUs for uplink transmission. However, the remaining portions of the operational bandwidth are not subject to being quiet. I.e. other than the identified quiet RUs, the remaining RUs (from the operational BW of the BSS) can be used during the quiet interval.

The Quiet Channel Information Element (IE), that identifies the list of RUs that are subject to no transmission or lower PSD transmission, is carried, e.g. in Beacon frames, Association Response frames, or other management frames.

Figure 9:
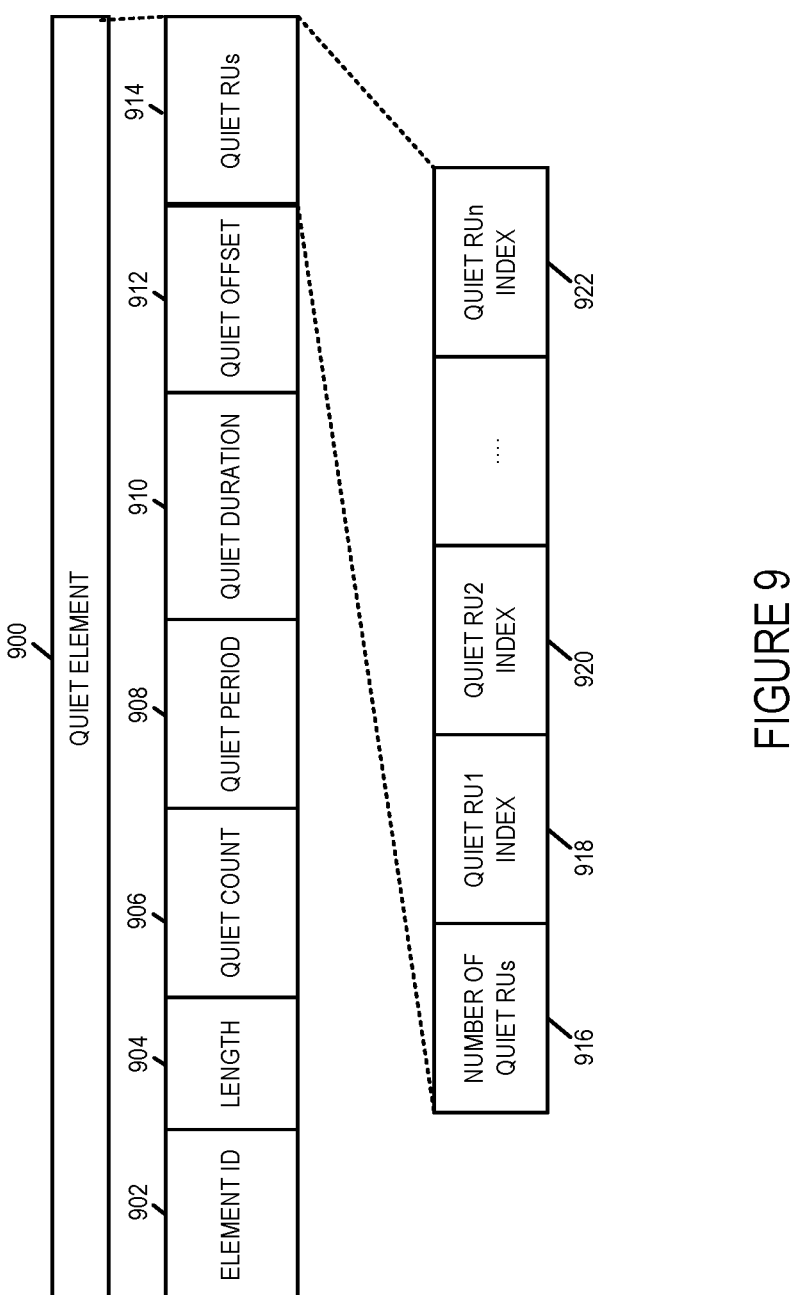
FIG. 9 is a drawing of an exemplary Quiet Element in accordance with an exemplary embodiment.

FIG. 9 is a drawing of an exemplary Quiet Element 900 in accordance with an exemplary embodiment. Quiet Element 900 includes an Element ID field 902, a Length field 904, a Quiet Count field 906, a Quiet Period field 908, a Quiet duration field 910, a Quiet Offset field 912, and a Quiet Resource Units (RUs) field 914. Quiet RUs field 914 includes a number of Quiet RUs field 916, and one or more Quiet RU index field (Quiet RU1 index field 918, Quiet RU2 index field 920, . . . , Quiet Run index field 922). If the number of Quiet RUs is X, where X is an integer value greater than or equal to 1, then there are X different Quiet RU indices.

Figure 10:
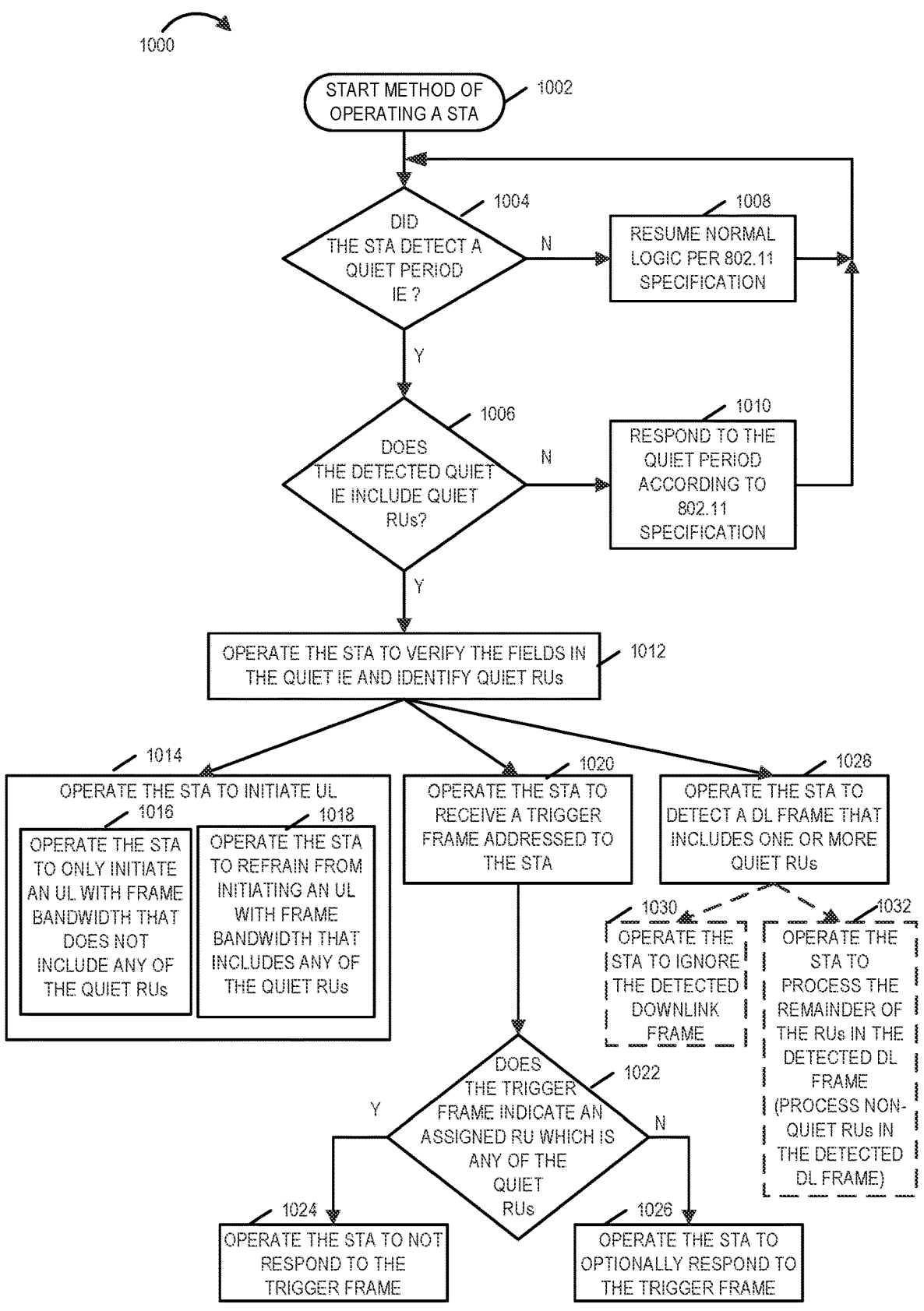
FIG. 10 is a flowchart of an exemplary method of operating a station (STA) in accordance with an exemplary embodiment.

FIG. 10 is a flowchart 1000 of an exemplary method of operating a station (STA) in accordance with an exemplary embodiment. Operation of the exemplary method starts in step 1002, in which the STA is powered on and initialized. Operation proceeds from start step 1002 to step 1004.

In step 1004 the STA determines if the STA detected a Quiet period IE. If the determination of step 1004 is that the STA did not detect a Quiet period IE, then operation proceeds from step 1004 to step 1008. However, if the determination of step 1004 is that the STA did detect a Quiet period IE, then operation proceeds from step 1004 to step 1006.

Returning to step 1008, in step 1008 the STA resumes normal logic per 802.11 specification. Operation proceeds from step 1008 to the input of step 1004.

Returning to step 1006, in step 1006 the STA determines if the detected Quiet IE includes Quiet RUs. If the determination of step 1006, is the detected Quiet IE does not include Quiet RUs, then operation proceeds from step 1006 to step 1010. However, if the determination of step 1006, is that the detected Quiet IE does include Quiet RUs, then operation proceeds from step 1006 to step 1012.

Returning to step 1010, in step 1010 the STA responds to the quiet period according to 802.11 specification. Operation proceeds from step 1010 to the input of step 1004.

Returning to step 1012, in step 1012 the STA verifies the fields in the Quiet IE and identifies the Quiet RUs, e.g., determining an RU index value corresponding to each of the Quiet RUs. Operation proceeds from step 1012 to steps 1014, 1020, and 1028.

In step 1014 the STA is operated to initiate uplink (UL). Step 1014 includes step 1016 and step 1018. In step 1016 the STA is operated to only initiate and UL with frame bandwidth that does not include any of the Quiet RUs. In step 1018 the STA is controlled to refrain from initiating an UL with frame bandwidth that includes any of the Quiet RUs.

In step 1020, the STA is operated to received a trigger frame addressed to the STA. Operation proceeds from step 1020 to step 1022. In step 1022 the STA determines id the trigger frame indicates an assigned RU which is any one of the Quiet RUs. If the determination of step 1022 is that the trigger frame indicates an assigned RU which is one of the Quiet RUs, then operation proceeds from step 1022 to step 1024, in which the STA is operated to not respond to the Trigger frame. However, if the determination of step 1022 is that the trigger frame does not indicate an assigned RU which is one of the Quiet RUs, then operation proceeds from step 1022 to step 1026, in which the STA is operated to optionally respond to the Trigger frame, e.g., based on the needs of the STA.

In step 1028 the STA is operated to detect a downlink (DL) frame that includes one or more Quiet RUs. Operation proceeds from step 1028 to step 1020 or step 1032, e.g., depending upon the implemented embodiment. In step 1030 the STA is operated to ignore the detected downlink frame. In step 1032 the STA is operated to process the remainder of the RUs in the detected downlink frame, e.g., process non-Quiet RUs in the detected DL frame.

Figure 11:
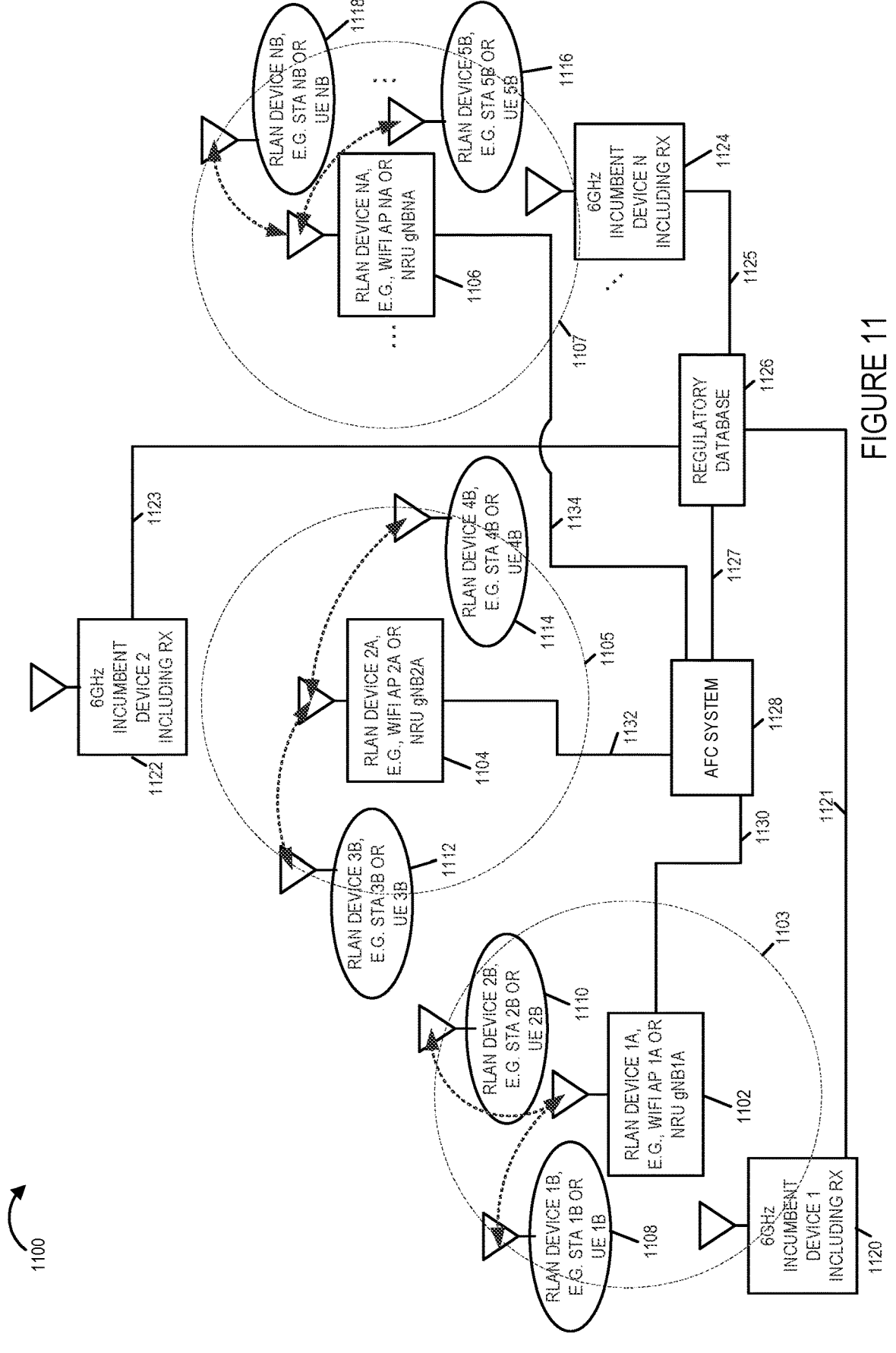
FIG. 11 is drawing of an exemplary communications system in accordance with an exemplary embodiment.

FIG. 11 is drawing of an exemplary communications system 1100 in accordance with an exemplary embodiment. Exemplary communications system 1100 includes a plurality of first type radio local area network (RLAN) devices (RLAN device 1A 1102, e.g., WiFi AP 1A or new radio unlicensed (NRU) gNB 1A, RLAN device 2A 1104, e.g., WiFi AP 2A or NRU gNB 2A, . . . , RLAN device NA 1106, e.g., WiFi AP NA or NR gNB NA), each with a corresponding wireless coverage area (1103, 1105, . . . , 1107), respectively. The exemplary communications system 1100 further includes a plurality of second type RLAN devices (RLAN device 1B 1108, e.g., station (STA) 1B or user equipment (UE) 1B, RLAN device 2B 1110, e.g., STA 2B or user UE 2B, RLAN device 3B 1112, e.g., STA 3B or UE 3B, RLAN device 4B 1114, e.g., STA 4B or UE 4B, RLAN device 5B 1116, e.g., STA 5B or UE 5B, . . . , RLAN device NB 1118, e.g., STA NB or UE NB).

The exemplary communications system 1100 further includes a plurality of 6 GHz incumbent device (6 GHz incumbent device 1 1120, 6 GHz incumbent device 2 1122, . . . , 6 GHz incumbent device N 1124) which are coupled to regulator database 1126, via communications links (1121, 1123, . . . , 1125), respectively. The exemplary communications system 1100 further includes an automatic frequency controller (AFC) system 1128, which is coupled to the regulator database 1126, via communications link 1128, and is coupled to the RLAN devices (1102, 1104, . . . , 1106), via communications links (1130, 1132, . . . , 1134), respectively.

Figure 12A:
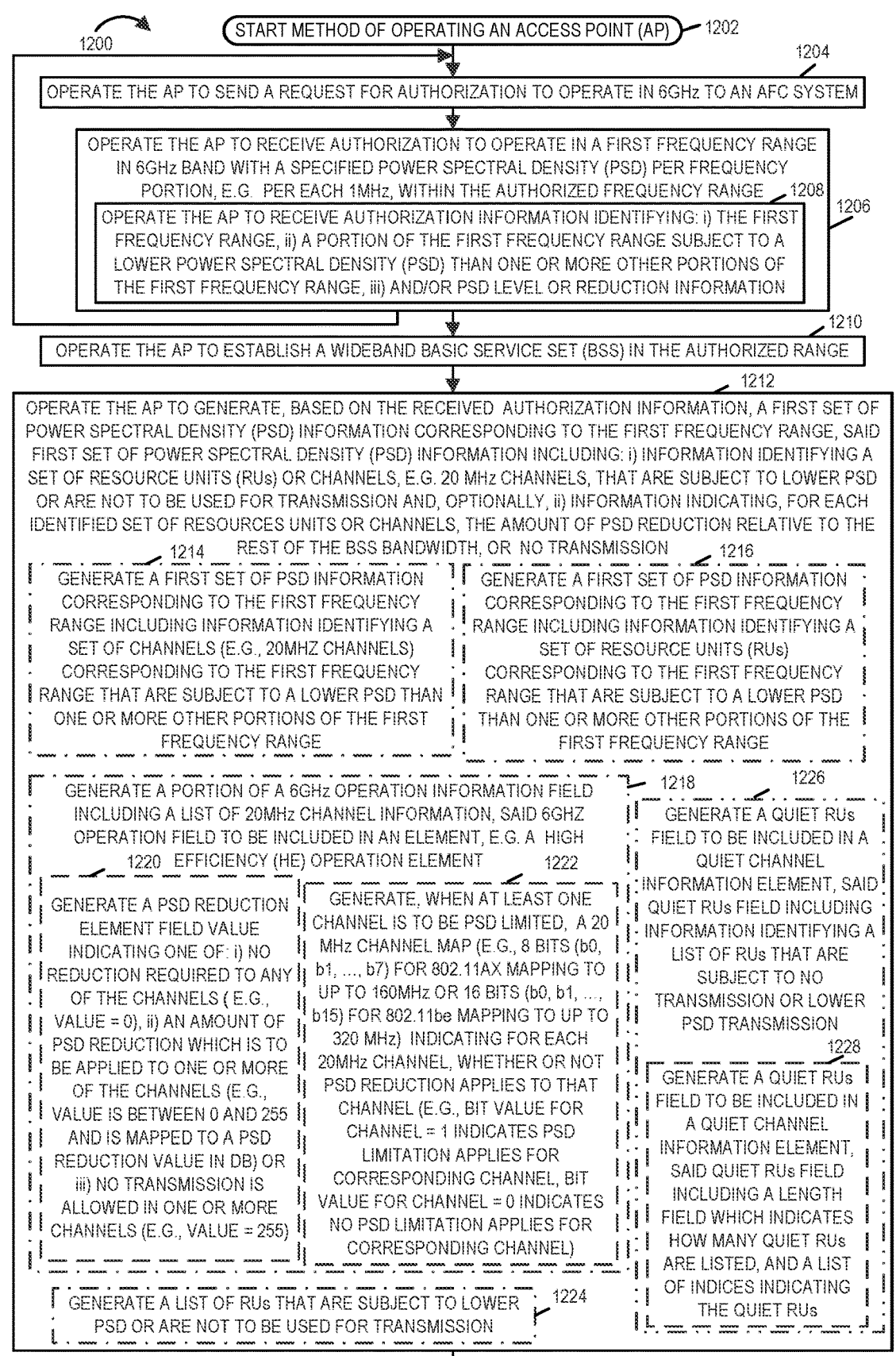
FIG. 12A is a first part of a flowchart of an exemplary method of operating an access point in accordance with an exemplary embodiment.
Figure 12B:
FIG. 12B is a second part of a flowchart of an exemplary method of operating an access point in accordance with an exemplary embodiment.
Figure 12C:
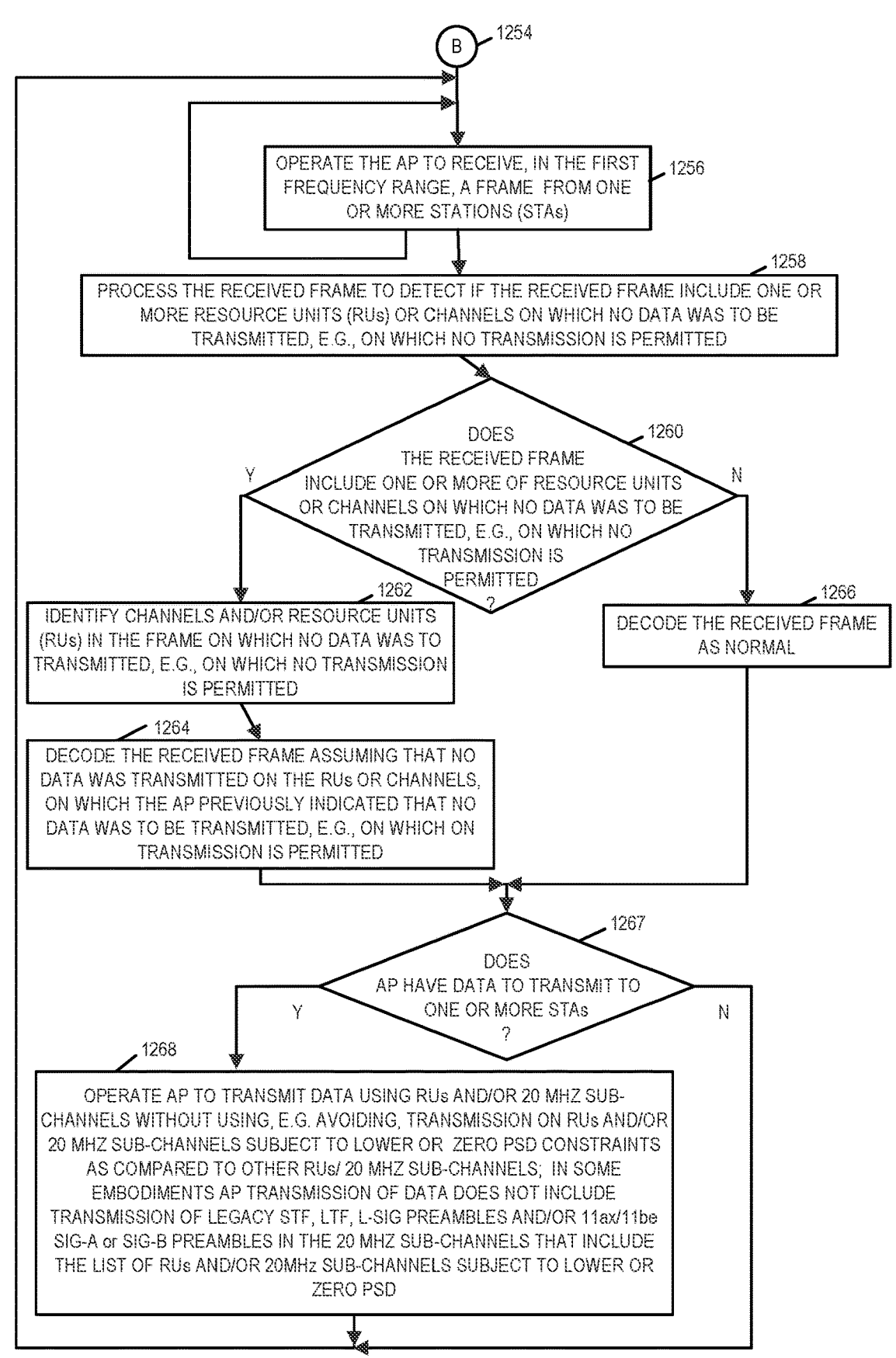
FIG. 12C is third part of a flowchart of an exemplary method of operating an access point in accordance with an exemplary embodiment.

FIG. 12, comprising the combination of FIG. 12A, FIG. 12B and FIG. 12C, is a flowchart 1200 of an exemplary method of operating an access point, e.g., a WiFi AP or NRU gNB, in accordance with an exemplary embodiment. The exemplary access point implementing the method of flowchart 1200 of FIG. 12 is, e.g., any of the first type RLAN devices (RLAN device 1A 1102, RLAN device 2A 1104, . . . , RLAN device NA 1106) of system 1100 of FIG. 11.

Operation of the exemplary method starts in step 1202, in which the AP is powered on and initialized. Operation proceeds from start step 1203 to step 1204. In step 1204, the AP sends a request for authorization to operate in 6 GHz to an AFC system, e.g., AFC system 1128 of system 1100 of FIG. 11. Operation proceeds from step 1204 to step 1206.

In step 1206 the AP receives from the AFC system authorization to operate in a first frequency range in 6 GHz band with a specified power spectral density (PSD) per frequency portion, e.g., per each 1 MHz, within the authorized first frequency range. Step 106 includes step 1208 in which the AP receives authorization information identifying: i) the first frequency range, ii) a portion of the first frequency range subject to a lower power spectral density (PSD) than one or more other portions of the first frequency range, and/or iii) PSD level or reduction information. Operation proceeds from step 1206 to step 1210.

In some embodiments, the granted authorization lasts for a specified time, for a predetermined amount of time, e.g. a day, or until revoked, and steps 1204 and 1206 are repeated, e.g. on a recurring basis.

Returning to step 1210, in step 1210 the AP establishes a wideband service set (BSS) in the authorized range, which is the first frequency range in the 6 GHz band. Operation proceeds from step 1210 to step 1212.

In step 1212 the AP generates, based on the received authorization information, a first set of power spectral density (PSD) information corresponding to the first frequency range, said first set of PSD information including: i) information identifying a set of resource units (RUs) or channels, e.g. 20 MHZ channels, that are subject to lower PSD or are not to be used for transmission, and optionally, ii) information indicating, for each of the identified set of RUs or channels, the amount of PSD reduction relative to rest or the BSS bandwidth, or no transmission.

Step 1212 includes one or more or all of steps 1214, 1216, 1218, 1224, and 1226, e.g., depending upon the particular embodiment. In step 1214 the AP generates a first set of PSD information corresponding to the first frequency range including information identifying channels, e.g., 20 MHz channels, corresponding to the first frequency range that are subject to a lower PSD than one or more other portions of the first frequency range. In step 1216 the AP generates AP generates a first set of PSD information corresponding to the first frequency range including information identifying a set of resource units (RUs) corresponding to the first frequency range that are subject to a lower PSD than one or more other portions of the first frequency range.

In step 1218 the AP generates a portion of a 6 GHz operation information field including a list of 20 MHZ channel information, said 6 GHz operation field to be included in an element, e.g., a high efficiency (HE) operation element. In some embodiments, step 1218 includes steps 1220 and 1222. In step 1220, the AP generates a PSD reduction element field value indicating one of: i) no reduction required to any of the channels (e.g., value=0), ii) an amount of PSD reduction which is to be applied to one or more of the channels (e.g., value is between 0 and 255 and is mapped to a PSD reduction value in dB), or iii) no transmission is allowed in one or more channels (e.g., value=255). In step 1222, the AP generates, when at least one channel is to be PSD limited, a 20 MHz channel map (e.g., 8 bits (b0, b1, . . . , b7) for 802.11ax mapping to up to 160 MHz or 16 bits (b0, b1, . . . , b15) for 802.11be mapping to up to 320 MHz) indicating for each 20 MHz channel, whether or not PSD reduction applies to that channel (e.g., bit value for channel=1 indicates PSD limitation applies for the corresponding channel; bit value for channel=0 indicates no PSD limitation applies for the corresponding channel).

In step 1224 the AP generates a list of RUs that are subject to lower PSD or are not to be used from transmission. In step

1226 the AP generates a Quiet RUs field to be included in a Quiet channel information element, said Quiet RUs field including information identifying a list of RUs that are subject to no transmission or lower PSD transmission. In some embodiments, step 1226 includes step 1228, in which the AP generates a Quiet RUs field to be included in a Quiet channel information element, said Quiet RUs field includes a length field which indicates how may Quiet RUs are listed, and a list of indices indicating the Quiet RUs.

Operation proceeds from step 1212, via connecting node A 1230 to step 1232. In step 1232 the AP is operated to broadcast or unicast information corresponding to the established wideband BSS in the authorized range (which is the first frequency range in the 6 GHz band), said information including said generated first set of PSD information. Step 1232 includes step 1234, in which the AP is operated to broadcast or unicast: i) information identifying a set of resource units (RUs) or channels, e.g., 20 MHz channels, that are subject to lower PSD or are not to be used for transmission and, optionally, ii) information indicating, for each identified set of resource units (RUs) of channels, the amount of PSD reduction relative to the rest of the BSS bandwidth, or no transmission. Step 1234 includes one or more of steps 1236, 1238, 1240, 1242, 1248 and/or 1250.

In step 1236 the AP transmits the information in broadcast beacon frames. In step 1238 the AP transmits the information in a unicast probe response to a STA. In step 1240 the AP transmits the information in a unicast association response to a STA.

In step 1242 the AP transmits a list of 20 MHz channels in a 6 GHz operation information field format, e.g., of a High Efficiency (HE) operation element. In some embodiments, step 1242 includes steps 1244 and 1246. In step 1244, the AP generates a PSD reduction element field value indicating one of: i) no reduction required to any of the channels (e.g., value=0), ii) an amount of PSD reduction which is to be applied to one or more of the channels (e.g., value is between 0 and 255 and is mapped to a PSD reduction value in dB), or iii) no transmission is allowed in one or more channels (e.g., value=255). In step 1246, the AP generates, when at least one channel is to be PSD limited, a 20 MHz channel map (e.g., 8 bits (b0, b1, . . . , b7) for 802,11ax mapping to up to 160 MHz or 16 bits (b0, b1, . . . , b15) for 802.11 be mapping to up to 320 MHz) indicating for each 20 MHz channel, whether or not PSD reduction applies to that channel (e.g., bit value for channel=1 indicates PSD limitation applies for the corresponding channel; bit value for channel=0 indicates no PSD limitation applies for the corresponding channel).

In step 1248 the AP generates a list of RUs that are subject to lower PSD or are not to be used from transmission. In step 1250 the AP generates a Quiet RUs field in a Quiet channel information element, said Quiet RUs field including information identifying a list of RUs that are subject to no transmission or lower PSD transmission. In some embodiments, step 1250 includes step 1252, in which the AP generates a Quiet RUs field in a Quiet channel information element, said Quiet RUs field includes a length field which indicates how may Quiet RUs are listed, and a list of indices indicating the Quiet RUs.

Step 1232 may be, and sometimes is, repeated, e.g., on a recurring basis. Operation proceeds from step 1232, via connecting node B 1254, to step 1256. In step 1256 the AP is operated to receive, in the first frequency range, a frame from one or more stations (STAs). Step 1256 is performed repetitively, e.g., on a recurring basis. Operation proceeds from step 1256 to step 1258. In step 1258 the AP processes the received frame to detect if the received frame includes one or more resource units (RUs) or channels on which no data was to be transmitted, e.g., on which no transmission is permitted. Operation proceeds from step 1258 to step 1260. If the received frame includes one or more resource units or channels on which no data was to be transmitted, e.g. on which no transmission is permitted, then operation proceeds from step 1260 to step 1262; otherwise operation proceeds from step 1260 to step 1266.

In step 1262 the AP identifies channels and/or resource units (RUs) in the received frame on which no data was to transmitted, e.g., on which no transmission is permitted. Operation proceeds from step 1262 to step 1264. In step 1264 the AP decodes the received frame assuming that no data was transmitted on the RUs or channels on which the AP previously indicated that no data was to be transmitted.

Returning to step 1266, in step 1266 the AP decides the received frame as normal.

Operation is shown proceeding from steps 1264 and 1266 to step 1267 in which a check is made as to whether the AP has data to transmit to one or more stations (STAs). This is included in the flow to show that the AP like the STAs may, and sometimes will, avoid use of resource units and/or sub-channels subject to lower (and in some cases zero) PSD constraints as compared to other unrestricted RUs or sub-channels.

In step 1267 if it is determined that the AP has data to transmit to one or more STAs, operation proceeds to transmit step 1268. In step 1268 when an AP transmits using a frame whose bandwidth includes one of quiet RUs or 20 MHz channels, e.g., subject to lower PSD constraints, the transmitting AP transmits the data while avoiding transmission on the list of RUs (or 20 MHz sub-channels) subject to lower (e.g., zero in some cases) PSD. In transmit step 1268 the AP does not transmit legacy preamble (STF, LTF, L-SIG) and 11ax/11be SIG-A or SIG-B preambles in the 20 MHz sub-channels that include the list of RUs (or 20 MHz sub-channels) with lower (or zero) PSD. Thus in step 1268 data transmissions to STAs will occur while the PSD constraints are still respected by the AP. Thus both the AP and STAs may, and sometimes are, subject to and/or or implement the same spectrum power constraints with regard to RU use and/or sub-channel use.

Operation is shown proceeding from step 1268 back to step 1256 in cases where data is transmitted by the AP. In the case where the AP is to operate in receive mode and/or does not have data to transmit operation proceeds directly from step 1267 back to step 1256. Thus it should be appreciated that an AP can switch back and forth the between receiving and transmitting data with transmissions by the AP and/or STAs being subject to reduced PSD in some cases with regard to particular RUs and/or 20 MHZ subchannels.

Figure 13A:
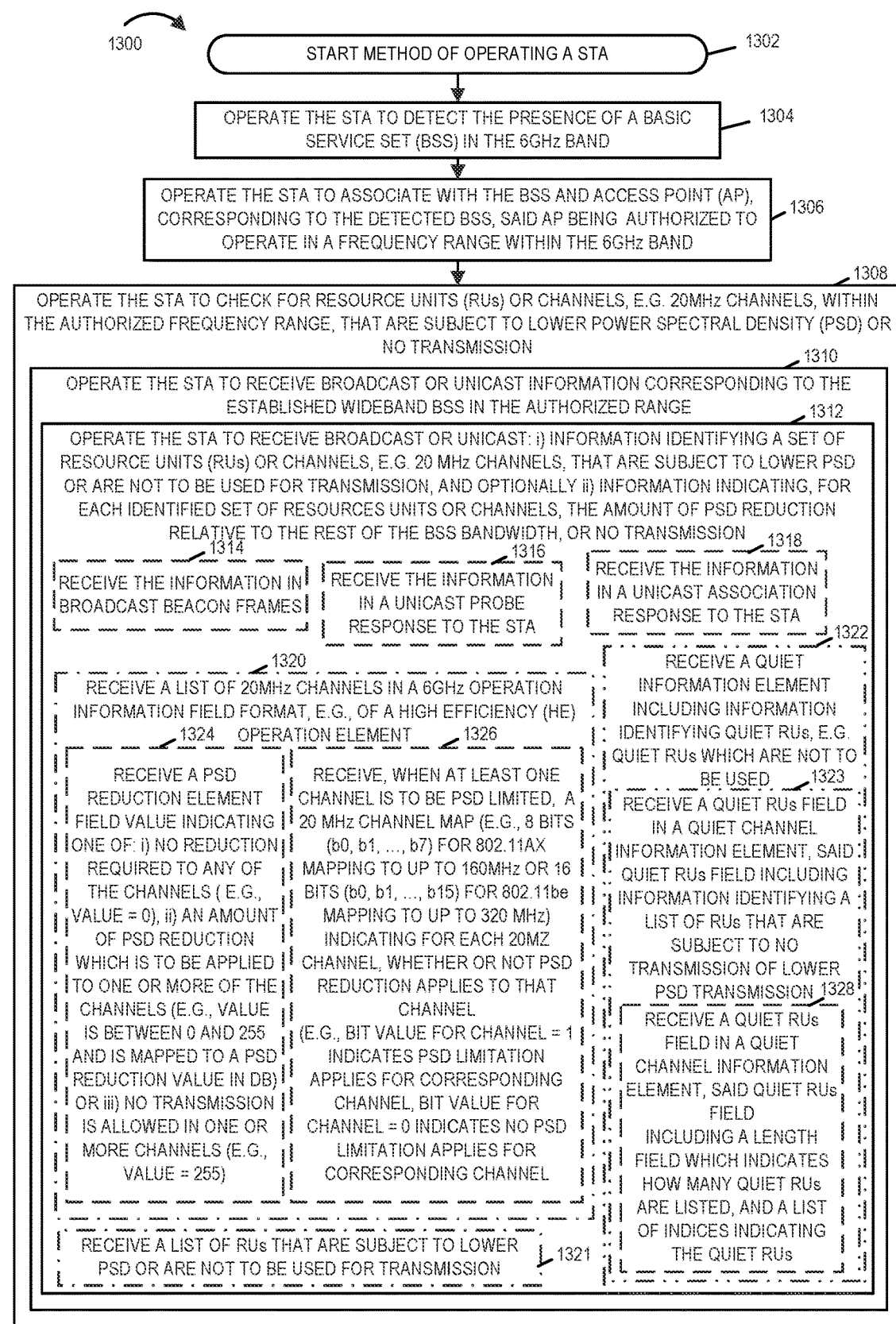
FIG. 13A is a first part of a flowchart of an exemplary method of operating a station (STA) in accordance with an exemplary embodiment.
Figure 13B:
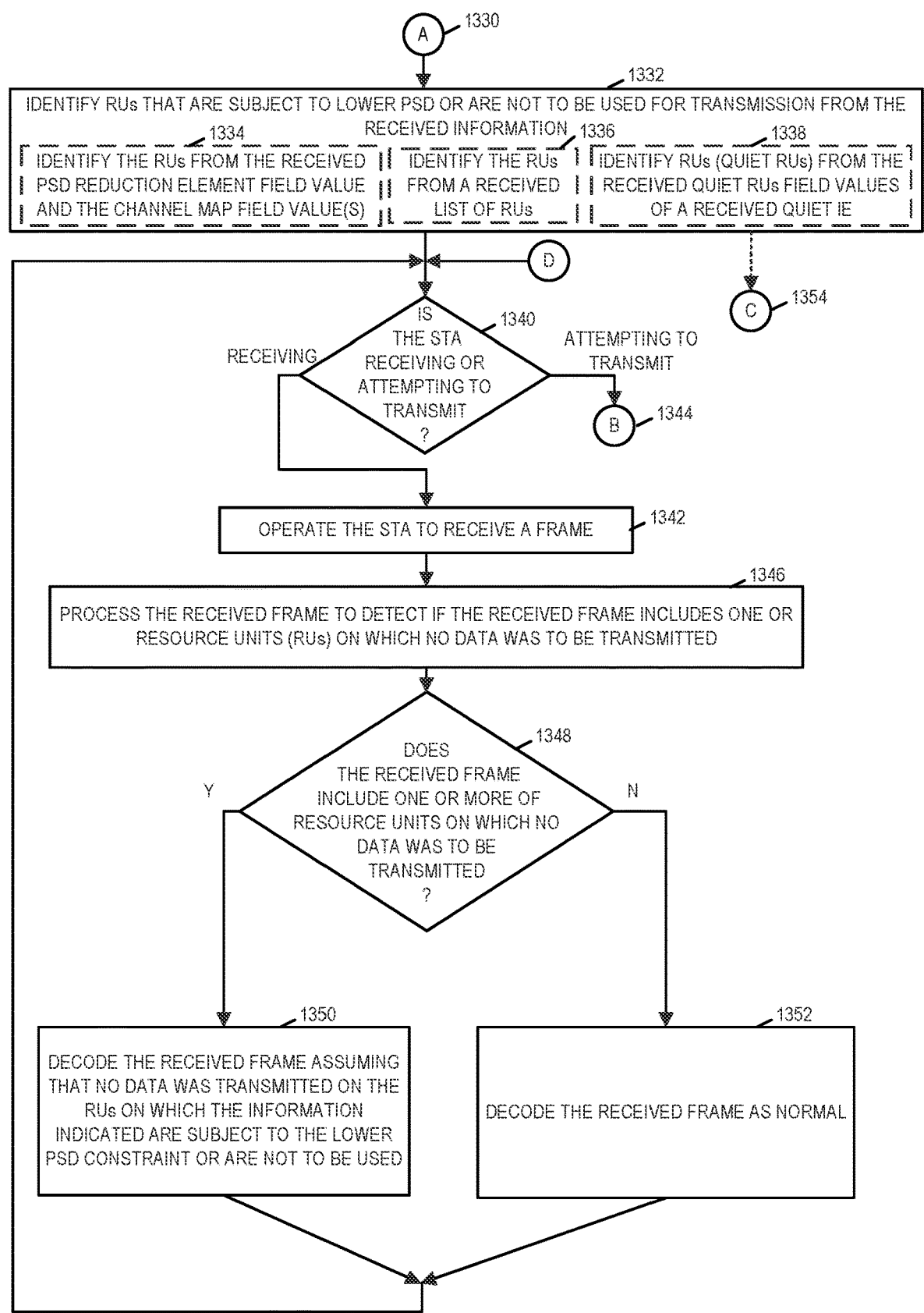
FIG. 13B is a second part of a flowchart of an exemplary method of operating a station (STA) in accordance with an exemplary embodiment.
Figure 13C:
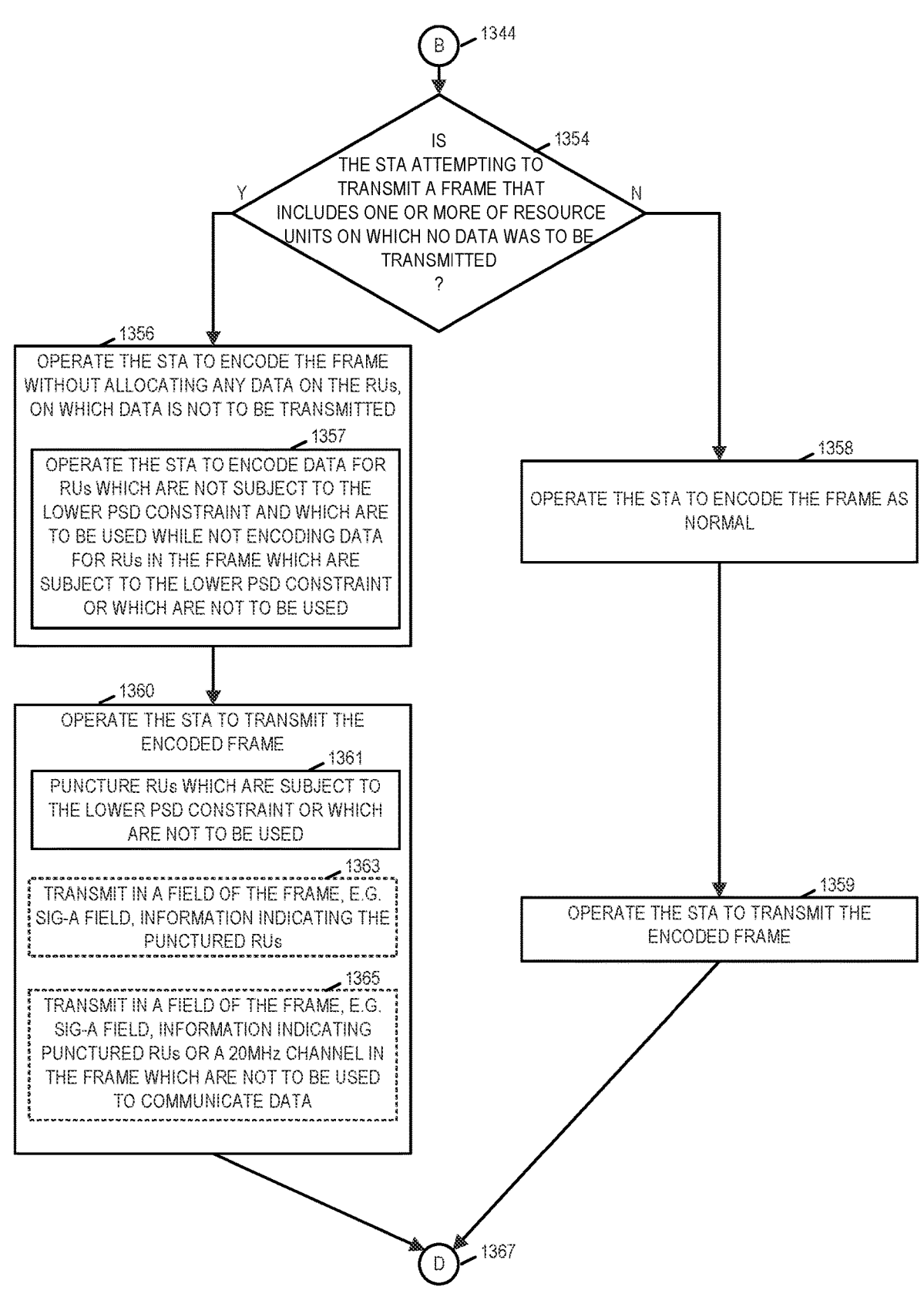
FIG. 13C is a third part of a flowchart of an exemplary method of operating a station (STA) in accordance with an exemplary embodiment.

FIG. 13, comprising the combination of FIG. 13A, FIG. 13B, FIG. 13C and FIG. 13D, is a flowchart 1300 of an exemplary method of operating a station (STA), e.g., a WiFi STA or a UE device supporting unlicensed 6 GHz communications, in accordance with an exemplary embodiment. Operation of the exemplary method starts in step 1302, in which the STA is powered on and initialized. Operation proceeds from start step 1302 to step 1304.

In step 1304 the STA detects the presence of a basic service set (BSS (in the 6 GHz band. Operation proceeds from step 1304 to step 1306. In step 1306 the STA is operated to associate with the BSS and access point (AP) corresponding to the detected BSS, said AP being authorized to operate in a frequency range, e.g. a first frequency range, within the 6 GHz band. Operation proceeds from step 1306 to step 1308.

In step 1308 the STA checks for resource units (RUs) or channels, e.g. 20 MHz channels, with the authorized frequency range (e.g., the first frequency range), that are subject to lower power spectral density (PSD) or no transmission. Step 1308 includes step 1310, in which the STA is operated to receive broadcast or unicast information corresponding established wideband BSS in the authorized frequency range. Step 1310 includes step 1312, in which the STA is operated to receive broadcast or unicast: i) information identifying a set or resource units (RUs) or channels, e.g. 20 MHz channels, that are subject to lower PSD or are not to be used for transmission, and optionally ii) information indicating, for teach identified set of resource units or channels, the amount of PSD reduction relative to the rest of the BSS bandwidth, or no transmission. Step 1312 includes one or more of steps 1314, 1316, 1318, 1320, 1321, and/or 1322.

In step 1314 the STA receives the information in broadcast beacon frames. In step 1316, the STA receives the information in a unicast probe response to the STA. In step 1318 the STA receives the information in a unicast association response to the STA.

In step 1320 the STA receives a list of 20 MHz channels in a 6 GHz Operation Field format, e.g., of a High Efficient (HE) operation element. In some embodiments, step 1320 includes steps 1324 and 1326. In step 1324 the STA receives a PSD reduction element field value indicating one of: i) no reduction required to any of the channels (e.g., value=0), ii) an amount of PSD reduction which is to be applied to one or more of the channels (e.g., value is between 0 and 255 and is mapped to a PSD reduction value in dB) or iii) no transmission is allowed in one or more channels (e.g., value=255). In step 1326, the STA receives, when at least one channel is to be PSD limited, a 20 MHz channel map (e.g., 8 bits (b0, b2, . . . , b7) for 802.11ax mapping to up to 160 MHz or 16 bits (b0, b1, . . . , b15) for 802.11be mapping to up to 320 MHz) indicating for each 20 MHz channel, whether or not PSD reduction applies to that channel. For example, a bit value for the channel=1 indicates PSD limitation applies for the corresponding channel; a bit value for channel=0 indicates no PSD limitation applies for the corresponding channel. In some embodiments, the STA determines a list of RUs that are subject to lower PSD or are not to be used for transmission, based on the received list of channels, e.g., received list of 20 MHz channels, that are subject to lower PSD or are not to be used for transmission and information mapping RUs, e.g., indexed RUs, to the channels, e.g., the 20 MHz channels.

In step 1321 the STA receives a list of RUs that are subject to lower PSD or are not to be used for transmission.

In step 1322 the STA receives a Quiet information element including information identifying Quiet resource units (RUs), e.g., quiet RUs which are not to be used. In some embodiments, step 1322 includes step 1323 in which the STA receives a Quiet RUs field in a Quiet channel information element, said Quiet RUs field including information identifying a list of RUs that are subject to no transmission or lower PSD transmission. In some embodiments, step 1323 includes step 1328 in which the STA receives a Quiet RUs field in a Quiet channel information element, said Quiet RUs field including a length field which indicates how many quiet RUs are listed and a list of indices indicating the Quiet RUs.

Operation proceeds from step 1308, via connecting node A 1330, to step 1332. In step 1332 the STA identifies RUs that are subject to lower PSD or are not to be used for transmission from the received information. In some embodiments, step 1332 includes one or more or steps 1334, 1336 and 1338. In step 114 the STA identifies the RUs for the received PSD reduction element field value and the channel map field value(s). In step 1336 the STA identifies the RUs from a received list of RUs. In step 1338 the STA identifies RUs (e.g., Quiet RUs) from the received Quiet RUs field values of a received Quiet Information Element (IE). In some embodiments, the STA identifies the RUs that are subject to PSD reduction or no transmission from a received channel list, e.g., 20 MHz channel, list of channels which are subject to lower PSD or no transmission, and information mapping a set of indexed RUs to a set of channels.

Operation proceeds from step 1332 to step 1340. In some embodiments, operation proceeds from step 1332, via connecting node C 1334 to one or more or all of steps 1364, 1372, and step 1380.

Returning to step 1340, in step 1340, the STA determines if the STA is receiving or attempting to transmit. If the STA is receiving, then operation proceeds from step 1340 to step 1342; however, if the STA is attempting to receive then operation proceeds from step 1340, via connecting node B 1344, to step 1354.

Returning to step 1340, in step 1342, in step 1340, the STA is operated to receive a frame. Operation proceeds from step 1342 to step 1346. In step 1346 the STA processes the received frame to detect if the received frame includes one or more resource units (RUs) on which no data was to be transmitted. Operation proceeds from step 1346 to step 1348. If the received frame includes one or more resources units on which no data was to be transmitted, then operation proceeds from step 1348 to step 1350; otherwise, operation proceeds from step 1348 to step 1352. In step 1350 the STA decodes the received frame assuming no data was transmitted on the RUs on which the information indicated are subject to the lower PSD constraint or are not to be used. In step 1350 the STA decodes the received frame as normal. Operation proceeds from step 1350 or step 1352 to the input of step 1340.

Returning to step 1354. In step 1354 the STA determines if the STA is attempting to transmit a frame that includes one or more resource units on which no data was to be transmitted. If the determination is that the STA is attempting to transmit a frame that includes one or more resource units on which no data was to be transmitted, then operation proceeds from step 1354 to step 1356; otherwise, operation proceeds from step 1354 to step 1358.

In step 1356 the STA encodes the frame without allocating any data on the RUs, on which data is not to be transmitted. Step 1356 includes step 1357, in which the STA is operated to encode data for RUs which are not subject to the lower PSD constraint and which are to be used while not encoding data for RUs in the frame which are subject to the lower PSD constraint or which are not to be used. Operation proceeds from step 1356 to step 1360. In step 1360 the STA transmits the encoded frame.

In some, but not necessarily all, embodiments in step 1360 the STA does not transmit a legacy preamble of (STF, LTF, and/or L-SIG) type and does not transmit 11ax/11be SIG-A or SIG-B preambles in the 20 MHz sub-channels that include the of RUs (or 20 MHz sub-channels) with lower (or zero) PSD.

In some embodiments, step 1360 includes step 1361. In step 1361 the STA punctures RUs which are subject to the lower PSD constraint or which are not to be used. In some embodiments, step 1360 includes step 1363 or step 1365. In step 1363 the STA transmits in a field of the frame, e.g., a SIG-A field, information indicating the punctured RUs. In step 1365 the STA transmits in a field of the frame, information indicating punctured RUs or a 20 MHz channel which are not to be used to communicate data.

Returning to step 1358, in step 1358 the STA encodes the frame as normal. Operation proceeds from step 1358 to step 1359. In step 1359 the STA transmits the encoded frame. Operation proceeds from step 160 or step 159, via connecting node D 1367, to step 1340.

Returning to step 1364, in step 1364 the STA is operated to initiate uplink (UL). In some embodiments, step 1364 includes steps 1366 and 1370. In step 1370 the STA is operated to only initiate an UL with frame bandwidth that does not include any of the quiet RUs. In step 1370 the STA is operated to refrain from initiating an UL with frame bandwidth than includes any of the quiet RUs.

Returning to step 1372, in step 1372 the STA is operated to receive a trigger frame addressed to the STA. Operation proceeds from step 1372 to step 1373. In step 1373 the STA determines what action to take in response to the received trigger frame based on whether the received trigger frame assigned a RU that the received information indicates is a Quiet RU. Step 1373 includes step 1374, 1376 and 1380. In step 1374, the STA determines if the received trigger frame indicates an assigned RU which is any of the Quiet RUs. If the determination is that the received trigger frame indicates an assigned RU which is one of the quiet RUs, then operation proceeds from step 1374 to step 1376; otherwise, operation proceeds from step 1374 to step 1378. In step 1376 the STA is operated to not respond to the trigger frame. In step 1378, the STA is allowed to respond to the trigger frame, and the STA optionally responds to the trigger frame, e.g., based upon its current needs.

Returning to step 1380, in step 1380, the STA is operated to detect a downlink (DL) frame that includes one or more Quiet RUs. Operation proceeds from step 1380 to step 1382 or step 1384, e.g., depending upon the particular implemented embodiment. In step 1382 the STA ignores the detected downlink frame. In step 1384 the STA processes the remainder of the RUs in the detected DL frame, e.g., processes non-Quiet RUs in the detected DL frame.

Figure 14:
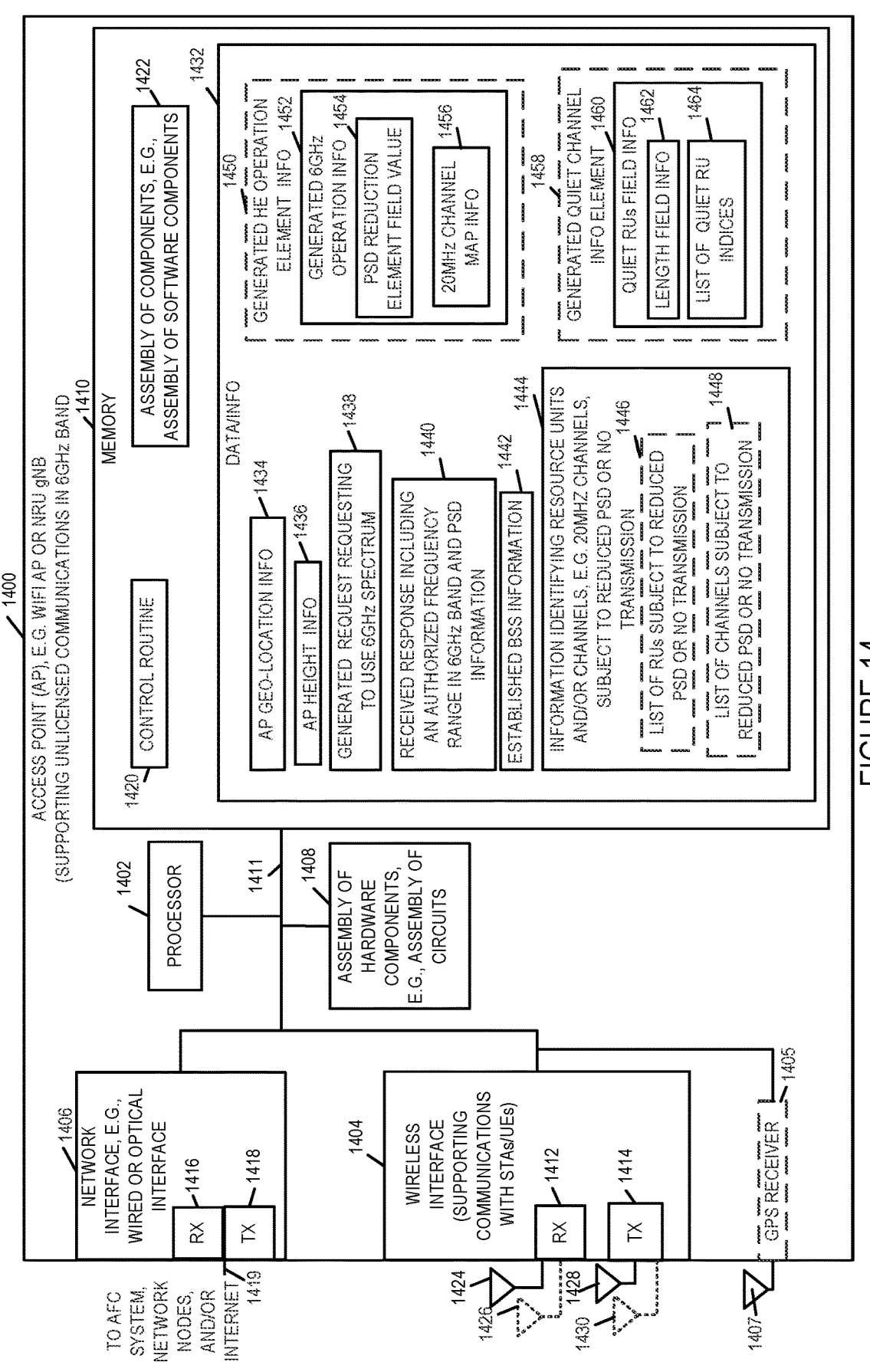
FIG. 14 is a drawing of an exemplary access point (AP), e.g., a WiFi AP or New Radio Unlicensed (NRU) gNB base station, supporting unlicensed communications in 6 GHz band, in accordance with an exemplary embodiment.

FIG. 14 is a drawing of an exemplary access point (AP) 1400, e.g., a WiFi AP or New Radio Unlicensed (NRU) gNB base station, supporting unlicensed communications in 6 GHz band, in accordance with an exemplary embodiment. Exemplary AP 1400 includes a processor 1402, e.g., a CPU, a wireless interface 1404, supporting wireless communication with STAs/UEs in 6 GHz band, a network interface 1406, e.g., a wired or optical interface, an assembly of hardware components 1408, e.g., an assembly of circuits, and memory 1410 coupled together via a bus 1411 over which the various elements may interchange data and information. In some embodiments, the AP 1400 further includes a GPS receiver 1405 coupled to GPS antenna 1407, via which the GPS receiver 1405 receives GPS signals from satellites. The GPS receiver 1405 is coupled to bus 1411. In some embodiments, the GPS receiver 1405 determines the AP's geo-location and height. In other embodiments, the AP's geo-location and height are determined during installation and installed in the memory 1410 of the AP 1400.

Network interface 1406 includes a receiver 1416 and a transmitter 1418. The receiver 1416 and transmitter 1418 are coupled via output interface connector 1419 and a backhaul to an AFC system, other network nodes, and/or the Internet. An exemplary signal sent via transmitter 1418 is a request to use 6 GHz bandwidth send to an AFC system, said request including geo-location and height information corresponding to the AP. An exemplary signal received via receiver 1416 is a response message from the AFC system, said response message identifying a frequency range in the 6 GHz band that may be used by the AP 1400 and corresponding power spectral density (PSD) information. The response message may, and sometimes does, indicate that one or more portion of the identified frequency range are subject to lower PSD than the rest of the identified frequency range or are not to be used for transmission, e.g., due to detected incumbent devices in the vicinity of the AP 1400.

Wireless interface 1404 includes a wireless receiver 1412 coupled to one or more receive antennas or antenna elements (1424, . . . , 1426) and a wireless transmitter 1414 coupled to one or more transmit antennas or antenna elements (1428, . . . , 1430). Exemplary signals transmitted by TX 1414 include broadcast and/or unicast signals intended for STAs communicating: BSS information, information identifying an authorized frequency range of operation in 6 GHz, and/or information identifying channels, e.g., 20 MHz channels and/or resource units (RUs) subject to reduced PSD or no transmission, and downlink frames including downlink encoded frames including identified RUs on which no data is being transmitted. Exemplary signals received by AP 1400 include uplink signals from STAs including frames in which no data is communicated on some identified RUs.

Memory 1410 includes a control routine 1420, e.g., for control basic functions of the AP 1400, e.g., memory read/write, etc. initialization, etc., an assembly of components 1422, e.g., an assembly of software components 1422, and data/information 1432. Data/information 1432 includes AP geo-location information 1434, AP height information 1436, a generated request to use 6 GHz spectrum 1438 as an unlicensed RLAN, and a received response 1440 including an authorized frequency range in 6 GHz band and corresponding PSD information, e.g., information identifying portions of the frequency range subject to reduced PSD and the amount of reduction, and/or information identifying portion(s) of the frequency range subject to no transmission. Data/information 1432 further includes established BSS information 1442. The AP 1400 establishes a basis server set (BSS) based on the authorized frequency range and broadcasts BSS information. Data/information 1432 further includes information 1444 identifying resource units (RUs) and/or channels, e.g., 20 MHz channels, subject to reduced PSD relative to the rest of the BSS band in the authorized frequency range or subject to no transmission. In some embodiments, information 1444 includes one or both of: a list of RUs subject to reduced PSD or nor transmission 1446 and a list of channels subject to reduced PSD or no transmission 1448.

In some embodiments, data/information 1450 includes a generated high efficiency (HE) operation element 1450 including generated 6 GHz operation information 1452 including a PSD reduction element field value 1454 and a 20 MHz channel map 1456.

In various embodiments, the data/information 1458 includes a generated Quiet channel information element 1458 including a Quiet RUs field 1460 including a length field 1462 and a list of Quiet RU indices 1464.

Figure 15:
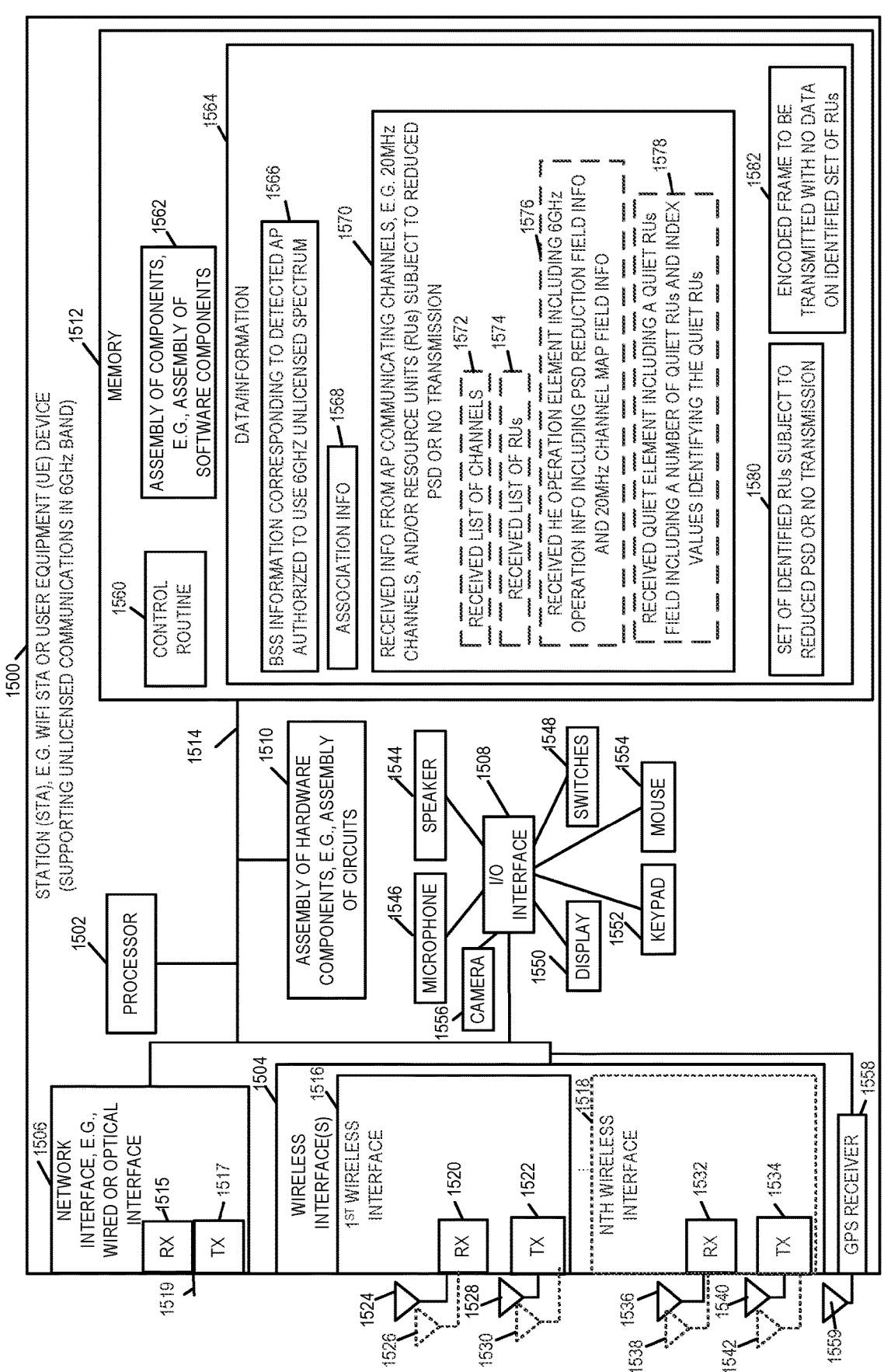
FIG. 15 is a drawing of an exemplary station (STA), e.g., a WiFi STA or a user equipment (UE) device, supporting unlicensed communications in 6 GHz band, in accordance with an exemplary embodiment.

FIG. 15 is a drawing of an exemplary station (STA) 1500, e.g., a WiFi STA or a user equipment (UE) device, supporting unlicensed communications in 6 GHz band, in accordance with an exemplary embodiment. Exemplary STA 1500 includes a processor 1502, e.g., a CPU, wireless interface(s) 1504, a network interface 1506, a GPS receiver 1558, an I/O interface 1508, an assembly of hardware components 1510, e.g., an assembly of circuits, and memory 1512, coupled together via a bus 1514 over which the various elements may interchange data and information.

Wireless interface(s) 1504 includes one or more wireless interfaces (1st wireless interface 1516, . . . , Nth wireless interface 1518). At least one of the wireless interfaces (1516, . . . , 1518) supports wireless communications in unlicensed 6 GHz. 1st wireless interface 1516, e.g., a wireless interface for communicating with a WiFi AP using 802.11ax/be based protocols or similar protocols, includes wireless receiver 1520 and wireless transmitter 1522. Wireless receiver 1520 is coupled to one or more receive antennas or antenna elements (1524, . . . , 1526) via which the STA 1500 can receive downlink signals, e.g., from a WiFi AP. Wireless transmitter 1522 is coupled to one or more transmit antennas or antenna elements (1528, . . . , 1530) via which the STA 1500 can transmit uplink signals, e.g., to a WiFi AP. Nth wireless interface 1518, e.g., a wireless interface for communicating with a NRU gNB, includes wireless receiver 1530 and wireless transmitter 1534. Wireless receiver 1530 is coupled to one or more receive antennas or antenna elements (1536, . . . , 1538) via which the STA 1500 can receive downlink signals, e.g., from a NRU gNB. Wireless transmitter 1534 is coupled to one or more transmit antennas or antenna elements (1540, . . . , 1542) via which the STA 1500 can transmit uplink signals, e.g., to a NRU gNB.

Network interface 1506, e.g., a wired or optical interface, includes a receiver 1515 and a transmitter 1517. The receiver 1515 and transmitter 1517 are coupled to connector 1519 via which the network interface 1506 can be coupled to a wired or optical link to a local network and/or the Internet, e.g., when the STA is at a site where such a link is available.

STA 1500 further includes a plurality of I/O devices (speaker 1544, microphone 1546, switches 1548, display 1550, e.g., a touchscreen display, keypad 1552, mouse 1554 and camera 1556) coupled to I/O interface 1508, which couples each of the I/O devices to bus 1514 and to other elements in STA 1500.

Memory 1512 includes a control routine 1560 for performing basic control operations, e.g., read/write operation, controlling I/O devices, etc., an assembly of components 1562, e.g., an assembly of software components, and data/information 1564.

Data/information 1564 includes BSS information 1566 corresponding to a detected AP authorized to use 6 GHz unlicensed spectrum, association information 1568 corresponding to the STAs association with an AP which is authorized to use unlicensed 6 GHz, and received information 1570 from an AP communicating information identifying channels, e.g., 20 MHz channels, and/or resource units (RUs) subject to reduced PSD or no transmission.

In some embodiments, information 1570 includes one or more or all of: i) a received list of channels 1572 subject to reduced PSD or no transmission, ii) a received list of RUs 1574 subject to reduced PSD or no transmission, iii) a received HE operation element 1576 including 6 GHz operation information including PSD reduction field information, e.g. a value indicating one of: no reduction to any of the channels, a level of PSD reduction for one or more of the channels, or no transmission allowed on one or more of the channels, and optionally 20 MHz channel map field information, e.g. information identifying a set of one or more channels which are subject to the PSD reduction or no transmission, and iv) a received quiet element 1578 including a Quiet RUs field including a number of Quiet RUs and index values identifying the Quiet RUs.

Data/information 1570 further includes a set of identified RUs 1580 subject to reduced PSD or no transmission, and an encoded frame 1582 to be transmitted with no data on the identified set of RUs.

Figure 16:
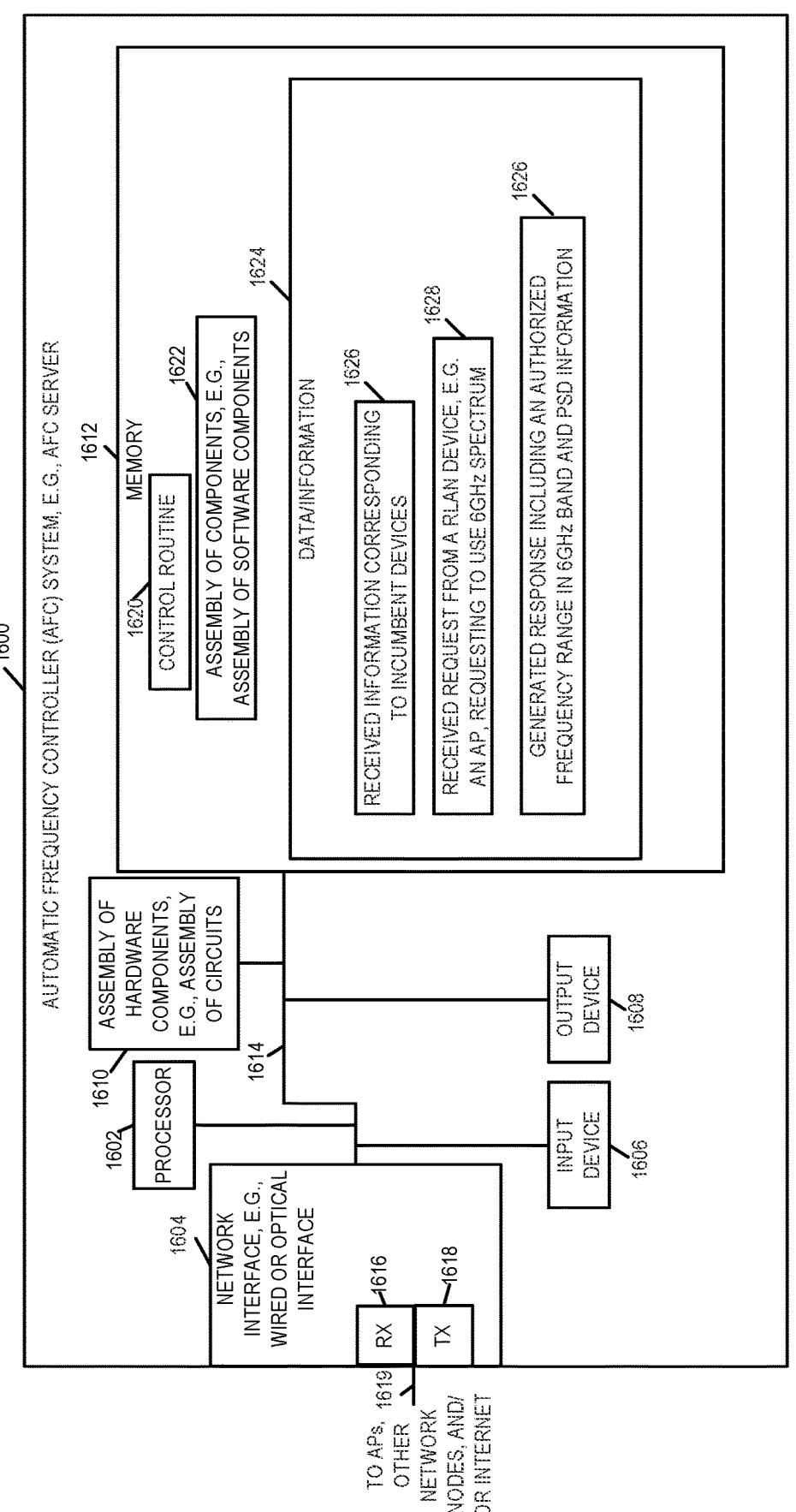
FIG. 16 is a drawing of an exemplary automatic frequency controller (AFC) system, e.g., an AFC server, in accordance with an exemplary embodiment.

FIG. 16 is a drawing of an exemplary automatic frequency controller (AFC) system 1600, e.g., an AFC server, in accordance with an exemplary embodiment. AFC system 1600 includes a processor 1602, e.g., a CPU, a network interface 1604, an input device 1606, e.g., a keyboard, an output device, e.g., a display, an assembly of hardware components 1610, e.g., an assembly of circuits, and memory 1612 coupled together via a bus 1614 over which the various elements may interchange data and information.

Network interface 1604, e.g., a wired or optical interface, includes a receiver 1616 and a transmitter coupled via connector 1619 and a backhaul link to APs, other network nodes, e.g., a regulatory database, and/or the Internet. Exemplary signals received via receiver 1616 includes information corresponding to incumbent devices including receivers which are operating in 6 GHz, said information being communicated from a regulatory database and a request from a RLAN device, e.g., an AP, requesting to use the 6 GHz spectrum. Exemplary signals transmitted via transmitter 1618 include a response to an AP indicating a authorized frequency range in the 6 GHz band that the AP is allowed to use and corresponding PSD information, e.g. information indicating portion(s) of the authorized frequency range subject to reduced PSD or no transmission, e.g. due to an incumbent user in the vicinity of the AP.

Memory 1612 includes a control routine 1620, an assembly of components 1622, e.g., an assembly of software components, and data/information 1624. Data/information 1624 includes received information corresponding to incumbent devices 1626, a received request from a RLAN device, e.g., an AP, requesting to used 6 GHz spectrum, and a generated response 1626 including an authorized frequency range in 6 GHz band and PSD information.

Figure 17A:
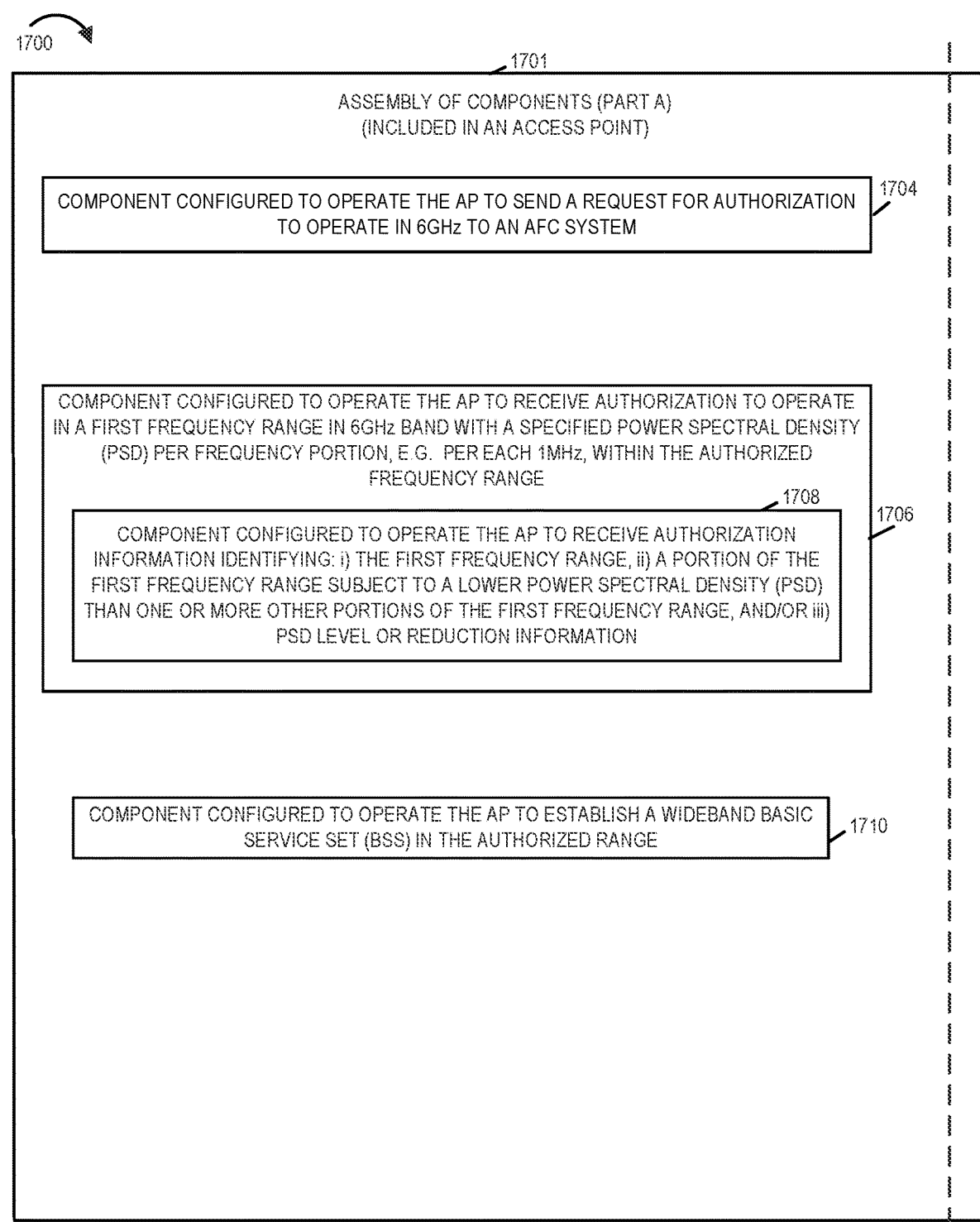
FIG. 17A is a first part of an assembly of components which may be included in an access point, e.g., a WiFi AP or a NRU gNB base station, supporting communications in 6 GHz band, in accordance with an exemplary embodiment.

FIG. 17 comprising the combination of FIG. 17A, FIG. 17B, FIG. 17C and FIG. 17D, is a drawing of an assembly of components 1700, comprising the combination of Part A 1701, Part B 1703, Part C 1705 and Part D 1707, which may be included in an exemplary access point (AP), e.g., AP 1400 of FIG. 14, RLAN device 1102 of FIG. 11, RLAN device 1104 of FIG. 11, RLAN device 1106 of FIG. 11, and/or an AP implementing a method in accordance with flowchart 600 of FIG. 6 and/or flowchart 1200 of FIG. 12, in accordance with an exemplary embodiment.

The components in the assembly of components 1700 can, and in some embodiments are, implemented fully in hardware within a processor, e.g., processor 1402, e.g., as individual circuits. The components in the assembly of components 1700 can, and in some embodiments are, implemented fully in hardware within the assembly of hardware components 1408, e.g., as individual circuits corresponding to the different components. In other embodiments some of the components are implemented, e.g., as circuits, within processor 1702 with other components being implemented, e.g., as circuits within assembly of components 1408, external to and coupled to the processor 1402. As should be appreciated the level of integration of components on the processor and/or with some components being external to the processor may be one of design choice. Alternatively, rather than being implemented as circuits, all or some of the components may be implemented in software and stored in the memory 1410 of the access point 1400, with the components controlling operation of access point 1400 to implement the functions corresponding to the components when the components are executed by a processor e.g., processor 1402. In some such embodiments, the assembly of components 1700 is included in the memory 1410 as part of an assembly of software components 1422. In still other embodiments, various components in assembly of components 1700 are implemented as a combination of hardware and software, e.g., with another circuit external to the processor providing input to the processor which then under software control operates to perform a portion of a component's function.

When implemented in software the components include code, which when executed by a processor, e.g., processor 1402, configure the processor to implement the function corresponding to the component. In embodiments where the assembly of components 1700 is stored in the memory 1410, the memory 1410 is a computer program product comprising a computer readable medium comprising code, e.g., individual code for each component, for causing at least one computer, e.g., processor 1402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 17 control and/or configure the access point 1400 or elements therein such as the processor 1402, to perform the functions of corresponding steps illustrated and/or described in the method of one or more of the flowcharts, signaling diagrams and/or described with respect to any of the Figures. Thus, the assembly of components 1700 includes various components that perform functions of corresponding one or more described and/or illustrated steps of an exemplary method, e.g., steps of the method of flowchart 600 of FIG. 6 and/or steps of the method of flowchart 1200 of FIG. 12.

Assembly of components 1700 includes a component 1704 configured to operate the AP to send a request for authorization to operate in 6 GHz to an AFC system, a component 1706 configured to operate the AP to receive authorization to operate in a first frequency range in 6 GHz band with a specified power spectral density (PSD) per frequency ports, e.g., per each 1 MHz, within the authorized frequency range. Component 1706 includes a component 1708 configured to operate the AP to receive authorization information identifying: i) the first frequency range, ii) a portion of the first frequency range subject to a lower power spectral density (PSD) than one or more other portions of the first frequency range and/or iii) PSD level or reduction information. Assembly of components 1700 further includes a components configured to operate the AP to establish a wideband basis service set (BSS) in the authorized range.

Assembly of components 1700 further includes a component 1712 configured to generate, based on the received authorization information, a first set of power spectral density (PSD) information corresponding to the first frequency range, said first set of power spectral density (PSD) information including: i) information identifying a set of resource units (RUs) or channels, e.g., 20 MHz channels, that are subject to lower PSD or are to not be used for transmission and, optionally, ii) information indicating for each of the identified set of resource units or channels, the amount of PSD reduction relative to the rest of the BSS bandwidth, or no transmission. Component 1712 includes a component 1714 configured to generate a first set of PSD information corresponding to the first frequency range including information identifying a set of channels, e.g. 20 MHz channels, corresponding to the first frequency range that are subject to a lower PSD than one or more portions of the first frequency range, a component 1716 configured to generate a first set of PSD information corresponding to the first frequency range including information identifying a set of resource units (RUs), corresponding to the first frequency range that are subject to a lower PSD than one or more portions of the first frequency range, a component 1718 configured to generate a portion of a 6 GHz operation information field including a list of 20 MHz channel information, said 6 GHz operation field to be included in an element, e.g. a high efficiency (HE) operation element. Component 1718 includes a component 1720 configured to generate a PSD reduction element field value indicating one of: i) no reduction to any of the channels (e.g. value=0), ii) an amount of PSD reduction which is to be applied to one or more of the channels (e.g., value is between 0 and 255 and is mapped to a PSD reduction value in dB), or iii) no transmission is allowed in one or more channels (e.g., value=255), and a component 1722 configured to generate, when at least one channel is to be PSD limited, a 20 MHz channel map (e.g., 8 bits (b0, b1, . . . , b7) for 802.11ax mapping to up to 160 MHz or 16 bits (b0, b2, . . . , b15) for 802.11 be mapping to up to 320 MHz) indicating for each 20 MHz channel whether or not PSD reduction applies to that channel (e.g., bit value for channel=1 indicates PSD limitation applies for corresponding channel; bit value for channel=0 indicates no PSD limitation applies for corresponding channel). Component 1712 further includes a component 1724 configured to generate a list of RUs that are subject to lower PSD or are not to be used for transmission. Component 1712 further includes a component 1726 configured to generate a Quiet resource units (RUs) field to be including a Quiet channel information element, said Quiet RUs field including information identifying a list of RUs that are subject to no transmission or lower PSD transmission. Component 1726 includes a component 1728 configured to generate a Quiet RUs field to be included in a Quiet channel information element, said Quiet RUs field including a length field which indicates how many Quiet RUs are listed, and a list of indices indicating the Quiet RUs.

Assembly of components 1700 further includes a component 1732 configured to operate the AP to broadcast or unicast information corresponding to the established wideband BSS in the authorized range, said information include said generated first set of PSD information. Component 1732 includes a component 1734 configured to operate the AP to broadcast or unicast: i) information identifying a set of resource units (RUs) or channels, e.g., 20 MHz channels, that are subject to lower PSD or are to not be used for transmission and, optionally, ii) information indicating for each of the identified set of resource units or channels, the amount of PSD reduction relative to the rest of the BSS bandwidth, or no transmission. Component 1734 includes a component 1736 configured to operate the AP to transmit the information in broadcast beacon frames, a component 1738 configured to operate the AP to transmit the information in a unicast probe response to a STA, and a component 1740 configured to operate the AP to transmit the information in a unicast association response to a STA.

Component 1734 further includes a component 1742 configured to operate the AP to transmit a list of 20 MHz channels in a 6 GHz operation information field format, e.g., of a high efficiency (HE) operation element. Component 1742 includes a component 1744 configured to operate the AP to transmit a PSD reduction element field value indicating one of: i) no reduction to any of the channels (e.g. value=0), ii) an amount of PSD reduction which is to be applied to one or more of the channels (e.g., value is between 0 and 255 and is mapped to a PSD reduction value in dB), or iii) no transmission is allowed in one or more channels (e.g., value=255), and a component 1746 configured to operate the AP to transmit, when at least one channel is to be PSD limited, a 20 MHz channel map (e.g., 8 bits (b0, b1, . . . , b7) for 802.11ax mapping to up to 160 MHz or 16 bits (b0, b2, . . . , b15) for 802.11 be mapping to up to 320 MHz) indicating for each 20 MHz channel whether or not PSD reduction applies to that channel (e.g., bit value for channel=1 indicates PSD limitation applies for corresponding channel; bit value for channel=0 indicates no PSD limitation applies for corresponding channel).

Component 1734 further includes a component 1748 configured to operate the AP to transmit a list of RUs that are subject to lower PSD or are not to be used for transmission. Component 1734 further includes a component 1750 configured to operate the AP to transmit a Quiet resource units (RUs) field in a Quiet channel information element, said Quiet RUs field including information identifying a list of RUs that are subject to no transmission or lower PSD transmission. Component 1750 includes a component 1752 configured to operate the AP to transmit a Quiet RUs field in a Quiet channel information element, said Quiet RUs field including a length field which indicates how many Quiet RUs are listed, and a list of indices indicating the Quiet RUs.

Assembly of components 1700 further includes a component 1756 configured to operate the AP to receive, in the first frequency range, a frame from one or more stations, a component 1758 configured to process the received frame to detect of the received frame includes one or more resource units (RUs) or channels on which no data was to be transmitted, e.g., on which no transmission is permitted, a component 1760 configured to determine if the received frame includes one or more of the resource units or channels on which no data was to be transmitted, e.g., on which no transmission is permitted and to control operation as a function of the determination, a component 1762 configured to identify channels and/or resource units (RUs) in the frame on which no data was to be transmitted, e.g., on which no transmission is permitted, in response to a determination that the received frame includes one or more resource units or channels on which no data was to be transmitted, a component 1764 configured to decode the received frame assuming that no data was transmitted on the RUs or channels on which the AP preciously indicated that no data was to be transmitted, and a component 1766 configured to decode the received frame as normal, in response to determination that the received frame does not include any of the resource units or channels on which no data was to be transmitted.

Assembly of components 1700 further includes a component 1767 configured to operate the access point to determine if the AP has data to transmit to one or more stations (STAs) and to control operation as a function of the determination, and a component 1768 configured to operate the AP to transmit using RUs or 20 MHz sub-channels without using, e.g. avoiding transmission on RUs and/or 20 MHz sub-channels subject to lower or zero PSD constraints as compared to other RUs and/or 20 MHz sub-channels, in some embodiments, AP transmission of data does not include transmission of legacy STF, LTF, L-SIG preambles and/or 11ax/11be SIG-A or SIG-B preambles in the 20 MHZ sub-channels that includes the list of RUs and/or 20 MHz sub-channels subject to lower or zero PSD.

Figure 18A:
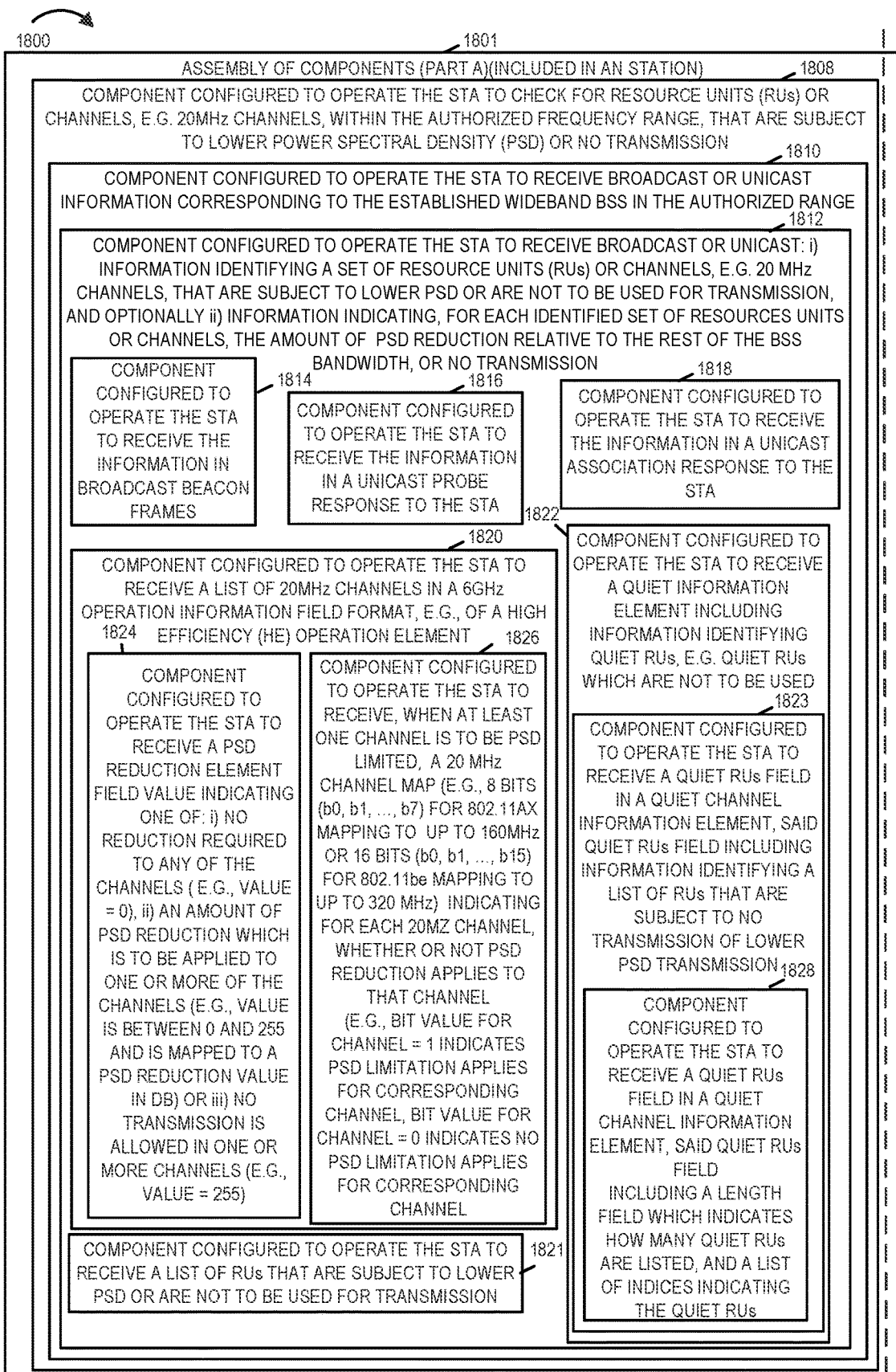
FIG. 18A is a first part of an assembly of components which may be included in a station (STA), e.g. a WiFi STA or a NRU user equipment (UE) device, supporting communications in 6 GHz band, in accordance with an exemplary embodiment.
Figure 18B:
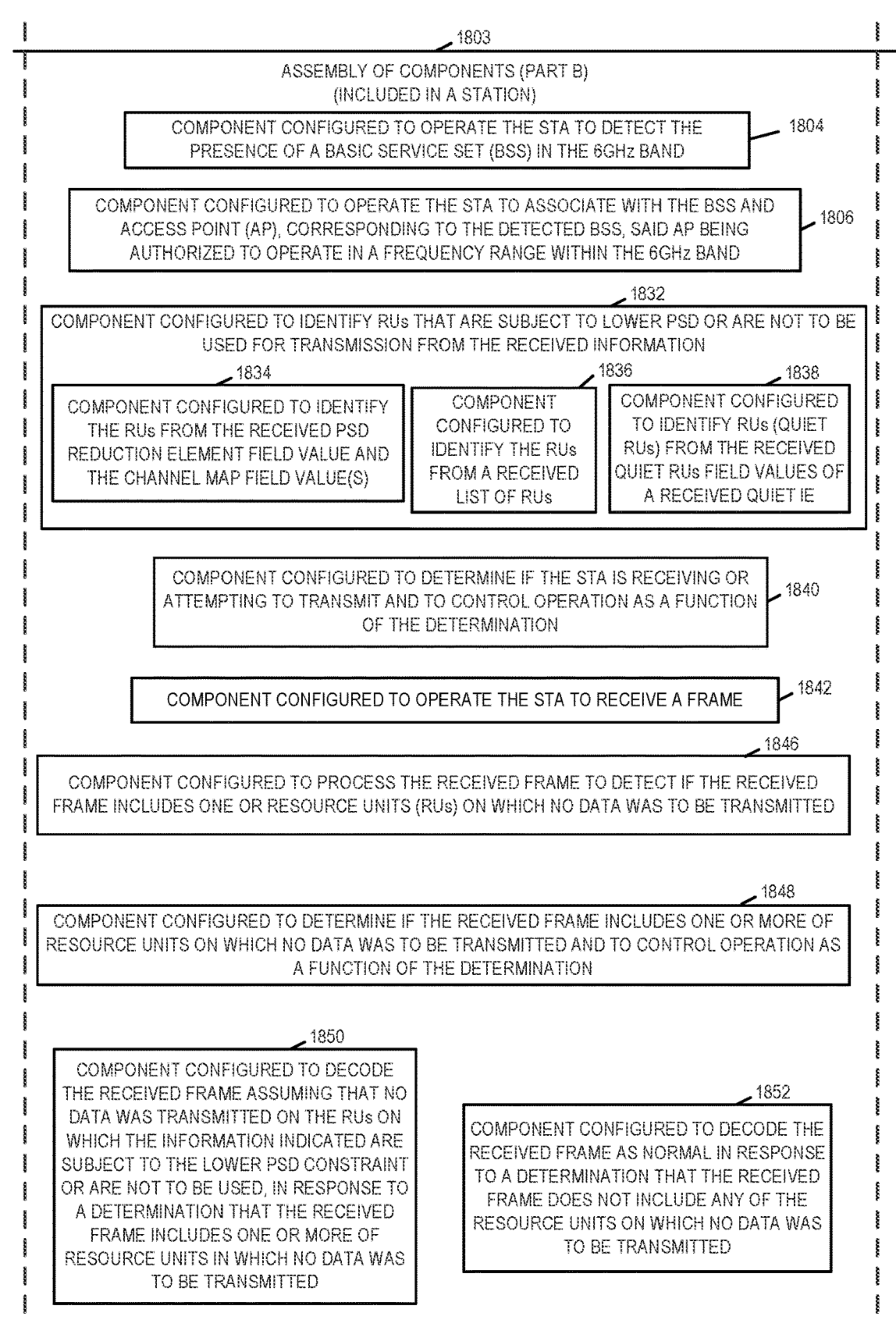
FIG. 18B is a second part of an assembly of components which may be included in a station (STA), e.g. a WiFi STA or a NRU user equipment (UE) device, supporting communications in 6 GHz band, in accordance with an exemplary embodiment.
Figures 18, 18D:
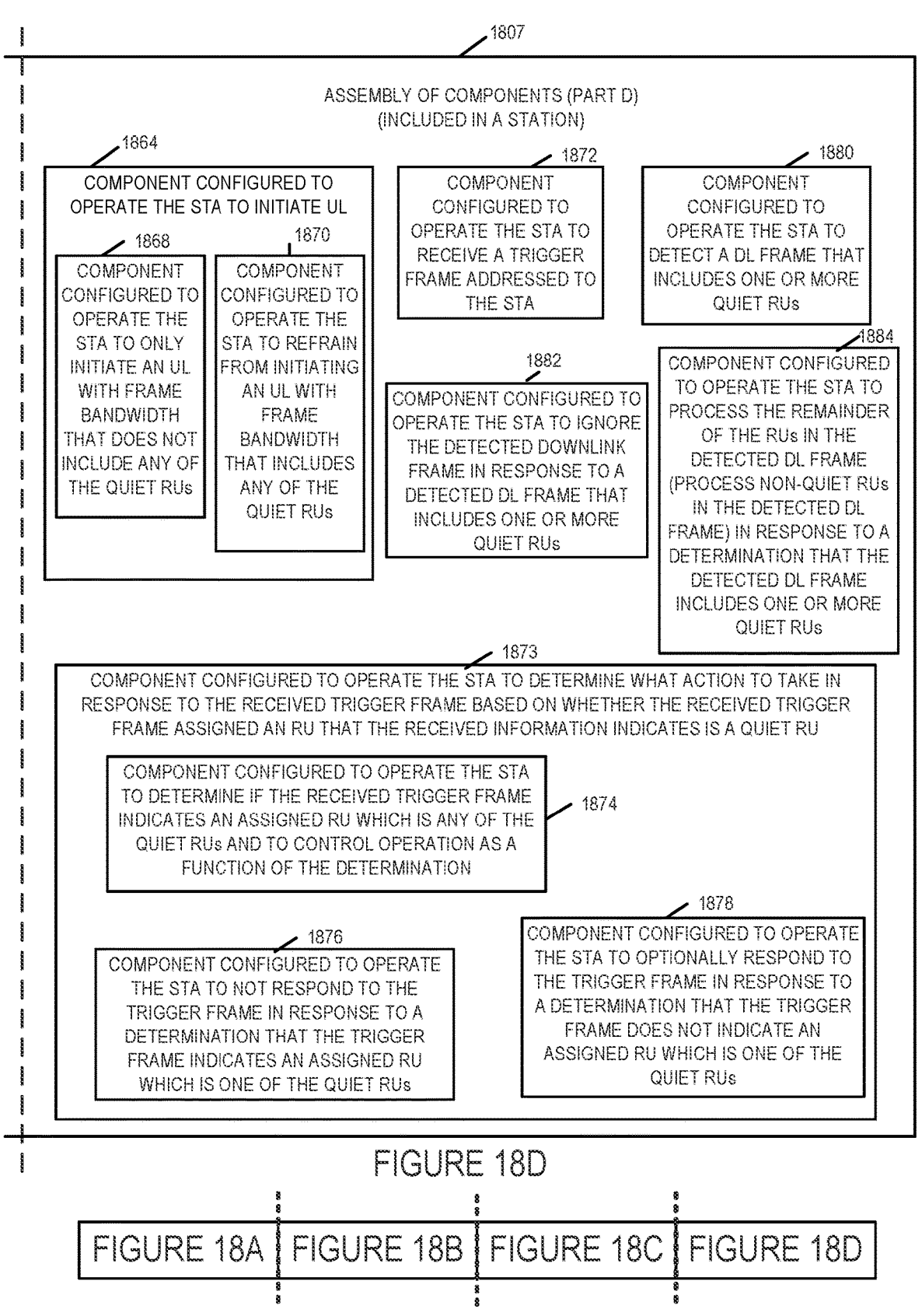
FIG. 18D is a fourth part of an assembly of components which may be included in a station (STA), e.g. a WiFi STA or a NRU user equipment (UE) device, supporting communications in 6 GHz band, in accordance with an exemplary embodiment.
FIG. 18 comprises the combination of FIG. 18A, FIG. 18B, FIG. 18C and FIG. 18D.

FIG. 18 comprising the combination of FIG. 18A, FIG. 18B, FIG. 18C and FIG. 18D, is a drawing of an assembly of components 1800, comprising the combination of Part A 1801, Part B 1803, Part C 1805 and Part D 1807, which may be included in an exemplary station (STA), e.g., STA 1500 of FIG. 15, RLAN device 1108 of FIG. 11, RLAN device 1110 of FIG. 11, RLAN device 1112 of FIG. 11, RLAN device 1114 of FIG. 11, RLAN device 1116 of FIG. 11, RLAN device 1118 of FIG. 11 and/or an STA implementing a method in accordance with flowchart 700 of FIG. 7 and/or flowchart 1000 of FIG. 10 and/or flowchart 1300 of FIG. 13, in accordance with an exemplary embodiment.

The components in the assembly of components 1800 can, and in some embodiments are, implemented fully in hardware within a processor, e.g., processor 1502, e.g., as individual circuits. The components in the assembly of components 1800 can, and in some embodiments are, implemented fully in hardware within the assembly of hardware components 1510, e.g., as individual circuits corresponding to the different components. In other embodiments some of the components are implemented, e.g., as circuits, within processor 1502 with other components being implemented, e.g., as circuits within assembly of components 1510, external to and coupled to the processor 1502. As should be appreciated the level of integration of components on the processor and/or with some components being external to the processor may be one of design choice. Alternatively, rather than being implemented as circuits, all or some of the components may be implemented in software and stored in the memory 1512 of the station 1500, with the components controlling operation of STA 1500 to implement the functions corresponding to the components when the components are executed by a processor e.g., processor 1502. In some such embodiments, the assembly of components 1800 is included in the memory 1512 as part of an assembly of software components 1562. In still other embodiments, various components in assembly of components 1800 are implemented as a combination of hardware and software, e.g., with another circuit external to the processor providing input to the processor which then under software control operates to perform a portion of a component's function.

When implemented in software the components include code, which when executed by a processor, e.g., processor 1502, configure the processor to implement the function corresponding to the component. In embodiments where the assembly of components 1800 is stored in the memory 1512, the memory 1512 is a computer program product comprising a computer readable medium comprising code, e.g., individual code for each component, for causing at least one computer, e.g., processor 1502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 18 control and/or configure the station (STA) 1500 or elements therein such as the processor 1502, to perform the functions of corresponding steps illustrated and/or described in the method of one or more of the flowcharts, signaling diagrams and/or described with respect to any of the Figures. Thus, the assembly of components 1800 includes various components that perform functions of corresponding one or more described and/or illustrated steps of an exemplary method, e.g., steps of the method of flowchart 700 of FIG. 7 and/or steps of the method of flowchart 1000 of FIG. 10 and/or steps of the method of flowchart 1300 of FIG. 13.

Assembly of components 1800 includes a component 1804 configured to operate the STA to detect the presence of a basic service set (BSS) in the 6 GHz band, a component 1806 configured to operate the STA to associate with the BSS and AP, corresponding to the detected BSS, said AP being authorized to operate in a frequency range with 6 GHz band.

Assembly of component 1800 further includes a component 1808 configured to operate the STA to check for resource units (RUs) or channel, e.g., 20 MHz channels, within the authorized frequency range, that are subject to lower power spectral density (PSD) or no transmission. Component 1808 includes a component 1810 configured to operate the STA to receive broadcast or unicast information corresponding to the established wideband BSS in the authorized range. Component 1810 includes a component 1812 configured to operate the STA to received broadcast or unicast: i) information identifying a set of resource units (RUs) or channels, e.g. 20 MHz channels, that are subject to lower PSD or are not to be used for transmission, and optionally ii) information indicating, for each set of identified resource units or channels, the amount of PSD reduction relative to the rest of the BSS bandwidth, or no transmission.

Component 1812 includes a component 1814 configured to operate the STA to receive the information in broadcast beacon frames, a component 1816 configured to operate the STA to receive the information in a unicast probe response to a STA, and a component 1818 configured to operate the STA to receive the information in a unicast association response to a STA.

Component 1812 further includes a component 1820 configured to operate the STA to receive a list of 20 MHz channels in a 6 GHz operation information field format, e.g., of a high efficiency (HE) operation element. Component 1820 includes a component 1824 configured to operate the STA to receive a PSD reduction element field value indicating one of: i) no reduction to any of the channels (e.g. value=0), ii) an amount of PSD reduction which is to be applied to one or more of the channels (e.g., value is between 0 and 255 and is mapped to a PSD reduction value in dB), or iii) no transmission is allowed in one or more channels (e.g., value=255), and a component 1826 configured to operate the STA to receive, when at least one channel is to be PSD limited, a 20 MHz channel map (e.g., 8 bits (b0, b1, . . . , b7) for 802.11ax mapping to up to 160 MHz or 16 bits (b0, b2, . . . , b15) for 802.11 be mapping to up to 320 MHz) indicating for each 20 MHz channel whether or not PSD reduction applies to that channel (e.g., bit value for channel=1 indicates PSD limitation applies for corresponding channel; bit value for channel=0 indicates no PSD limitation applies for corresponding channel).

Component 1812 further includes a component 1721 configured to operate the STA to receive a list of RUs that are subject to lower PSD or are not to be used for transmission. Component 1812 further includes a component 1822 configured to operate the STA to receive a Quiet information element including information identifying Quiet RUs, e.g., Quiet RUs which are not to be used. Component 1822 includes a component 1823 configured to operate the STA to receive a Quiet resource units (RUs) field in a Quiet channel information element, said Quiet RUs field including information identifying a list of RUs that are subject to no transmission or lower PSD transmission. Component 1823 includes a component 1828 configured to operate the STA to receive a Quiet RUs field in a Quiet channel information element, said Quiet RUs field including a length field which indicates how many Quiet RUs are listed, and a list of indices indicating the Quiet RUs.

Assembly of components 1800 further includes a component 1832 to identify RUs that are subject to lower PSD or are not to be used for transmission from the received information. Component 1832 includes a component 1834 configured to identify the RUs from the received PSD reduction element field value and the channel map field value(s), a component 1836 configured to identify the RUs from a received list of RUs, a component 1838 configured to identify RUs (Quiet RUs) from the received Quiet RUs field values of a received Quiet IE.

Assembly of components 1800 further includes a component 1840 configured to determine if the STA is receiving or attempting to transmit and to control operation as a function of the determination, a component 1842 configured to operate the STA to receive a frame, a component 1846 configured to process the received frame to detect if the received frame includes one or more resource units (RUs) on which no data was to be transmitted, a component 1848 configured to determine of the received frame includes one or more resource units on which no data was to be transmitted and to control operation as a function of the determination, a component 1850 configured to decode the received frame assuming that no data was transmitted on the RUs, on which the information indicated are subject to the lower PSD constraint or are not to be used, in response to a determination that the received frame includes one or more of resource units in which no data was to be transmitted, and a component 1852 configured to decode the received frame as normal in response to a determination that the received frame does not include any of the resource units on which no data was to be transmitted.

Assembly of components 1800 further includes a component 1854 configured to determine if the STA is attempting to transmit a frame that includes one or more of resource units on which no data was to be transmitted and to control operation as a function of the determination, a component 1856 configured to operate the STA to encode the frame without allocating any data on the RUs, on which no data is to be transmitted. Component 1856 includes a component 1857 configured to operate the STA to encode data for RUs, which are not subject to the lower PSD constraint and which are to be used, while not encoding data for RUs in the frame, which are subject to the lower PSD constraint or which are not to be used. Assembly of components 1800 further includes a component 1860 configured to operate the STA to transmit the encoded frame. In some, but not necessarily all embodiments, component 1860 prevents the STA from transmitting a legacy preamble of (STF, LTF, and/or L-SIG) type and prevents the transmission of 11ax/11be SIG-A or SIG-B preambles in the 20 MHz sub-channels that include the of RUs (or 20 MHz sub-channels) with lower (or zero) PSD. Component 1860 includes a component 1861 configured to puncture RUs which are subject to the lower PSD constraint or which are not to be used, a component 1863 configured to operate the STA to transmit in a field, e.g. GIG-A field, information indicating the punctured RUs, and a component 1865 configured to operate the STA to transmit in a field of the frame, e.g. a SIG-A field, information indicating punctured RUs or a 20 MHz channel in the frame which are not to be used to communicate data. Assembly of components 1800 further includes a component 1856 configured to operate the STA as normal, e.g., in response to a determination that the frame does not include one or more of the resource units on which no data was to be transmitted.

Assembly of components 1800 further includes a component 1864 configured to operate the STA to initiate uplink (UL). Component 1864 includes a component 1868 configured to operate the STA to only initiate an UL with frame bandwidth that does not include any of the Quiet RUs and a component 1870 configured to operate the STA to refrain from initiating an UL with frame bandwidth that includes any of the Quiet RUs.

Assembly of components 1800 further includes a component 1872 configured to operate the STA to receive a trigger frame addressed to the STA, and a component 1873 configured to operate the STA to determine what action to take in response to the received trigger frame based on whether the trigger frame indicates an assigned RU that the received information indicates is a Quiet RU. Component 1873 includes a component 1874 configured to operate the STA to determine if the received trigger frame indicates an assigned RU which is any of the Quiet RUs and to control operation as a function of the determination, a component 1876 configured to operate the STA to not respond to the trigger frame in response to a determination that the trigger frame indicates an assigned RU which is one of the Quiet RUs, and a component 1878 configured to operate the STA to optionally respond to the trigger frame in response to a determination that the trigger frame does not indicate an assigned RU which is one of the Quiet RUs.

Assembly of components 1800 further includes a component 1880 configured to operate the STA to detect a downlink (DL) frame that includes one or more Quiet RUs, a component 1882 configured to operate the STA to ignore the detected DL frame in response to a detected DL frame that includes one or more Quiet RUs, and a component 1884 configured to operate the STA to process the remainder of the RUs in the detected DL frame (process non-Quiet RUs in the detected DL frame) in response to a determination that the detected DL frame indicates one or more Quiet RUs.

First Numbered List of Exemplary Method Embodiments

Method Embodiment 1. A method of operating an access point (AP), comprising: receiving (1206) authorization to operate in a first frequency range including at least one portion subject to a lower power spectral density (PSD) than one or more other portions of the first frequency range; generating (1212), based on the received authorization information, a first set of transmit power information corresponding to the first frequency range, said first set of transmit power information including information identifying one or more of: i) a set of resource units corresponding to the first frequency range that are subject to a lower transmit power than said one or more other portions of the first frequency range or ii) channels corresponding to the first frequency range that are subject to a lower transmit power than said one or more other portions of the first frequency range; and transmitting (1232) the first set of transmit power information.

Method Embodiment 1AA. The method of Method Embodiment 1, wherein the first set of transmit power information is a first set of transmit power spectral density (PSD) information.

Method Embodiment 1A. The method of Method Embodiment 1AA, wherein the access point is a WiFi Access Point supporting unlicensed operation in 6 GHz spectrum (e.g., based on IEEE 802.11ax and/or IEEE 802.11 be specification or other IEEE 802.11 specifications).

Method Embodiment 1B. The method of Method Embodiment 1AA, wherein the access point is a new radio unlicensed (NRU) gNB base station supporting unlicensed operation in 6 GHz spectrum.

Method Embodiment 1C. The method of Method Embodiment 1AA, wherein the access point is a base station.

Method Embodiment 1D. The method of Method Embodiment 1AA, wherein transmitting (1232) the first set of PSD information includes transmitting the first set of PSD information in one or more of: i) broadcast beacon frames (1236), ii) a unicast probe response to a station (STA) (1238), or iii) a unicast association response to a STA (1240).

Method Embodiment 1D. The method of Method Embodiment ID, wherein said station (STA) is a WiFi station.

Method Embodiment 1D2. The method of Method Embodiment 1D, wherein said station (STA) is a user equipment (UE) device.

Method Embodiment 1E. The method of Method Embodiment 1D, wherein transmitting (1232) the first set of PSD information includes transmitting (1242) the first set of PSD information in a 6 GHz Operation Information field (e.g., of a High Efficiency (HE) Operation Element or another Operation Element.)

Method Embodiment 1F. The method of Method Embodiment 1E, wherein the first set of PSD information is included in the combination of: i) a PSD Reduction Field of the 6 GHz Operation Information (1244) and ii) a 20 MHz Channel Map Field of the 6 GHz Operation Information (1246).

Method Embodiment 1G. The method of Method Embodiment 1D, wherein transmitting (1232) the first set of PSD information includes transmitting (1250) the first set of PSD information in a Quiet RUs field of a Quiet channel information element.

Method Embodiment 1H. The method of Method Embodiment 1G, wherein the Quiet RUs field includes: i) a length field that indicates how many Quiet RUs are listed, and ii) a list of indices indicating the RUs (1252).

Method Embodiment 1I. The method of Method Embodiment 1H, wherein the number of tones corresponding to an indicated RU is one of: 26, 52, 106 or 242.

Method Embodiment 2. The method of Method Embodiment 1AA, wherein generating (1212), based on the received authorization information, the first set of PSD information includes generating (1222) a list of channels (e.g., 20 MHZ channels in a 6 GHZ frequency range) subject to said lower spectral power density, said list of channels including at least a first channel; and wherein transmitting (1232) the first set of (PSD) information includes transmitting (1246) said list of channels.

Method Embodiment 3. The method of Method Embodiment 2, wherein generating (1212) the first set of power spectral density (PSD) information further includes: including (1220) in said set of PSD information a PSD reduction element field value indicating an amount of PSD reduction to be applied to the first channel in said list of channels; and wherein transmitting (1232) the first set of (PSD) information includes transmitting (1244) said PSD reduction element field value.

Method Embodiment 4. The method of Method Embodiment 3, wherein generating, (1212) based on the received authorization information, the first set of spectral power density (PSD) information includes generating (1226) a quiet channel information element including information indicating a list of resource units (RUs) that are subject to no transmission or are subject to lower PSD transmission than other RUs.

Method Embodiment 5. The method of Method Embodiment 3, wherein generating (1226) the quiet channel information element includes generating (1228) a length field indicating how many quiet RUs are listed and a list of indices indicating the quiet RUs.

Method Embodiment 6. The method of Method Embodiment 5, wherein transmitting (1232) the first set of (PSD) information includes transmitting (1250) said quiet channel information element.

Method Embodiment 7. The method of Method Embodiment 1AA, further comprising: receiving (1256), in the first frequency range, a frame from one or more stations; identifying (1262): i) one or more channels or ii) one or more resource units on which no data was to be transmitted (e.g., channels or resource units on which no data was to be transmitted due to PSD constraints); and decoding (1264) the received frame assuming that no data was transmitted on the RUs or channels on which no data was to be transmitted (e.g., those which the AP previously indicated were subject to lower PSD constrains which may include a no transmission constraint) (this decoding may, and in some embodiments does, include disregarding and/or ignoring channels and/or RUs subject to PSD constrains such as a no transmission constraint).

Second Numbered List of Exemplary Method Embodiments

Method Embodiment 1. A method of operating a station, the method comprising: receiving (1312), at the station, information corresponding to a first frequency range being used by the station, said information identifying a set of resource units (e.g., by identifying specific RUs or by identifying one or more channels) in the first frequency range that are subject to a lower power spectral density (PSD) constraint than other resource units or channels in the first frequency range or which are not to be used; and performing one or more of: i) transmitting data (1360) in a first frame which uses the first frequency range but which leaves at least some RUs which are subject to the lower PSD constraint or which are not to be used, unused by the first frame or ii) decoding (1350) a received frame assuming that no data was transmitted on RUs which said information indicated are subject to the lower PSD constraint or are not to be used.

Method Embodiment 1A. The method of Method Embodiment 1, wherein said method includes transmitting data (1360) in a first frame which uses the first frequency range but which leaves at least some RUs which are subject to the lower PSD constraint or which are not to be used, unused by the first frame and wherein as part of said transmitting the STA does not transmit a legacy preamble or type STF, LTF, L-SIG and does not transmit an 11ax/11be SIG-A or SIG-B preamble in any 20 MHz sub-channels that include at least one of the RUs corresponding to the lower PSD constraint.

Method Embodiment 1AB. The method of Method Embodiment 1A, where said lower PSD constraint is a zero PSD constraint.

Method Embodiment 2. The method of Method Embodiment 1, wherein said information corresponding to the first frequency range identifies RUs which are not to be used by identifying one or more channels (in some cases the channels are 20 MHz sub-channels) in the first frequency range which are not to be used.

Method Embodiment 3. The method of Method Embodiment 2, further comprising: encoding data (1356) to be transmitted in the first frame, said encoding (1356) including encoding (1357) data for RUs which are not subject to the lower PSD constraint and which are to be used while not encoding data (e.g., avoiding encoding data for power constrained or RUs restricted from use) for RUs in the frame which are subject to the lower PSD constraint or which are not to be used Method Embodiment 3A. The method of claim 1, wherein said method includes said step of transmitting data (1360 or 1368) in the first frame, said step of transmitting (1360) including not transmitting legacy preamble (STF, LTF, L-SIG) and 11ax/11be SIG-A or SIG-B preambles in the 20 MHz sub-channels that include at least one of the RUs (or 20 MHz sub-channels) corresponding to lower (or zero) PSD.

Method Embodiment 4. The method of Method Embodiment 1, wherein said method includes said step of transmitting data (1360 or 1368) in the first frame, said step of transmitting (1360) including puncturing (1361) RUs (e.g., not placing data and thus no energy on RUs) which are subject to the lower PSD constraint, or which are not to be used.

Method Embodiment 5. The method of Method Embodiment 4, wherein transmitting (1360) includes transmitting (1363) in a field of the frame (e.g., a SIG-A field) information identifying punctured RUs.

Method Embodiment 6. The method of Method Embodiment 2, wherein transmitting (1360) includes transmitting (1365) in a field of the frame (e.g., a SIG-A field) information identifying punctured RUs or a 20 MHz channel in the frame which are not used to communicate data.

Method Embodiment 7. The method of Method Embodiment 1, wherein said method includes said step of decoding (1350) a received frame assuming that no data was transmitted on RUs which said information indicated are subject to the lower PSD constraint or are not to be used.

Method Embodiment 8. The method of Method Embodiment 7, further comprising: prior to performing said decoding (1350), receiving (1342) a frame transmitted in said first frequency range.

Method Embodiment 9. The method of Method Embodiment 1 wherein receiving (1312), said information identifying a set of resource units includes receiving (1322) a quiet information element identifying quiet RUs which are not to be used.

Method Embodiment 10. The method of Method Embodiment 9, further comprising: receiving (1372) a trigger frame (e.g., a trigger frame addressed to the station); and determining (1373) what action to take in response to the received trigger frame based on whether the received trigger frame assigned an RU that the received information indicates is a quiet RU.

Method Embodiment 11. The method of Method Embodiment 10, wherein determining (1373) what action to take in response to the received trigger frame based on whether the received trigger frame assigned an RU that the received information indicates is a quiet RU includes: controlling (1376) the station not to respond to the trigger frame in response to determining that the trigger frame assigns an RU that is indicated to be a quiet RU.

First Number List of Exemplary Apparatus
Embodiments

Apparatus Embodiment 1. An access point (AP) (1400) comprising: a first receiver (1416); a wireless transmitter (1414); and a processor (1402) configured to: operate the first receiver (1416) to receive (1206) authorization to operate in a first frequency range including at least one portion subject to a lower power spectral density (PSD) than one or more other portions of the first frequency range; generate (1212), based on the received authorization information, a first set of transmit power information corresponding to the first frequency range, said first set of transmit power information including information identifying one or more of: i) a set of resource units corresponding to the first frequency range that are subject to a lower transmit power than said one or more other portions of the first frequency range or ii) channels corresponding to the first frequency range that are subject to a lower transmit power than said one or more other portions of the first frequency range; and operate the wireless transmitter (1414) to transmit (1232) the first set of transmit power information.

Apparatus Embodiment 1AA. The access point (1400) of Apparatus Embodiment 1, wherein the first set of transmit power information is a first set of transmit power spectral density (PSD) information.

Apparatus Embodiment 1A. The access point (1400) of Apparatus Embodiment 1AA, wherein the access point is a WiFi Access Point supporting unlicensed operation in 6 GHz spectrum (e.g., based on IEEE 802.11ax and/or IEEE 802.11be specification or other IEEE 802.11 specifications).

Apparatus Embodiment 1B. The access point (1400) of Apparatus Embodiment 1AA, wherein the access point is a new radio unlicensed (NRU) gNB base station supporting unlicensed operation in 6 GHz spectrum.

Apparatus Embodiment 1C. The access point (1400) of Apparatus Embodiment 1AA, wherein the access point is a base station.

Apparatus Embodiment 1D. The access point (1400) of Apparatus Embodiment 1AA, wherein said processor (1402) is configured to: operate the wireless transmitter (1414) to transmit the first set of PSD information in one or more of: i) broadcast beacon frames (1236), ii) a unicast probe response to a station (STA) (1238), or iii) a unicast association response to a STA (1240), as part of being configured to operate the wireless transmitter to transmit (1232) the first set of PSD information.

Apparatus Embodiment 1D1. The access point (1400) of Apparatus Embodiment 1D, wherein said station (STA) is a WiFi station.

Apparatus Embodiment 1D2. The access point (1400) of Apparatus Embodiment 1D, wherein said station (STA) is a user equipment (UE) device.

Apparatus Embodiment 1E. The access point (1400) of Apparatus Embodiment ID, wherein said processor (1402) is configured to: operate the wireless transmitter (1414) to transmit (1242) the first set of PSD information in a 6 GHz Operation Information field (e.g., of a High Efficiency (HE) Operation Element or another Operation Element), as part of being configured to operate the wireless transmitter to transmit (1232) the first set of PSD information.

Apparatus Embodiment 1F. The access point (1400) of Apparatus Embodiment 1E, wherein the first set of PSD information is included in the combination of: i) a PSD Reduction Field of the 6 GHz Operation Information (1244) and ii) a 20 MHz Channel Map Field of the 6 GHz Operation Information (1246).

Apparatus Embodiment 1G. The access point (1400) of Apparatus Embodiment ID, wherein said processor (1402) is configured to: operate the wireless transmitter (1414) to transmit (1250) the first set of PSD information in a Quiet RUs field of a Quiet channel information element, as part of being configured to operate the wireless transmitter to transmit (1232) the first set of PSD information.

Apparatus Embodiment 1H. The access point (1400) of Apparatus Embodiment 1G, wherein the Quiet RUs field includes: i) a length field that indicates how many Quiet RUs are listed, and ii) a list of indices indicating the RUs (1252).

Apparatus Embodiment 1I. The access point (1400) of Apparatus Embodiment 1H, wherein the number of tones corresponding to an indicated RU is one of: 26, 52, 106 or 242.

Apparatus Embodiment 2. The access point (1400) of Apparatus Embodiment 1AA, wherein said processor (1402) is configured to: generate (1222) a list of channels (e.g., 20 MHZ channels in a 6 GHZ frequency range) subject to said lower spectral power density, as part of being configured to generate (1212), based on the received authorization information, the first set of PSD information, and wherein said list of channels includes at least a first channel; and operate the wireless transmitter (1414) to transmit (1246) said list of channels, as part of being configured to operate the wireless transmitter to transmitting (1232) the first set of (PSD).

Apparatus Embodiment 3. The access point (1400) of Apparatus Embodiment 2, wherein said processor (1402) is configured to: include (1220) in said set of PSD information a PSD reduction element field value indicating an amount of PSD reduction to be applied to the first channel in said list of channels, as part of being configured to generate (1212) the first set of power spectral density (PSD); and operate the wireless transmitter (1414) to transmit (1244) said PSD reduction element field value, as part of being configured to transmit (1232) the first set of (PSD) information.

Apparatus Embodiment 4. The access point (1400) of Apparatus Embodiment 3, wherein said processor (1402) is configured to: generate (1226) a quiet channel information element including information indicating a list of resource units (RUs) that are subject to no transmission or are subject to lower PSD transmission than other RUs, as part of being configured to generate, (1212) based on the received authorization information, the first set of spectral power density (PSD) information.

Apparatus Embodiment 5. The access point (1400) of Apparatus Embodiment 3, wherein said processor (1402) is configured to generate (1228) a length field indicating how many quiet RUs are listed and a list of indices indicating the quiet RUs, as part of being configured to generate (1226) the quiet channel information element.

Apparatus Embodiment 6. The access point (1400) of Apparatus Embodiment 5, wherein said processor (1402) is configured to: operate the wireless transmitter (1414) to transmit (1250) said quiet channel information element, as part of being configured to operate the wireless transmitter to transmit (1232) the first set of (PSD) information.

Apparatus Embodiment 7. The access point (1400) of Apparatus Embodiment 1AA, further comprising: a wireless receiver (1412); and wherein said processor (1402) is further configured to: operate the wireless receiver (1412) to receive (1256), in the first frequency range, a frame from one or more stations; identify (1262) i) one or more channels or ii) one or more resource units on which no data was to be transmitted (e.g., channels or resource units on which no data was to be transmitted due to PSD constraints); and decode (1264) the received frame assuming that no data was transmitted on the RUs or channels on which no data was to be transmitted (e.g., those which the AP previously indicated were subject to lower PSD constrains which may include a no transmission constraint) (this decoding may, and in some embodiments does, include disregarding and/or ignoring channels and/or RUs subject to PSD constrains such as a no transmission constraint).

Second Numbered List of Exemplary Apparatus Embodiments

Apparatus Embodiment 1. A station (STA) (1500) comprising: a wireless receiver (1520 or 1532); a wireless transmitter (1522 or 1534); and a processor (1502) configured to: operate the wireless receiver (1520 or 1532) to receive (1312) information corresponding to a first frequency range being used by the station, said information identifying a set of resource units (e.g., by identifying specific RUs or by identifying one or more channels) in the first frequency range that are subject to a lower power spectral density (PSD) constraint than other resource units or channels in the first frequency range or which are not to be used; and operate the STA (1500) to perform one or more of: i) transmitting data (1360) (via wireless transmitter (1522 or 1534)) in a first frame which uses the first frequency range but which leaves at least some RUs which are subject to the lower PSD constraint or which are not to be used, unused by the first frame or ii) decoding (1350) a received frame assuming that no data was transmitted on RUs which said information indicated are subject to the lower PSD constraint or are not to be used.

Apparatus Embodiment 2. The station (1500) of Apparatus Embodiment 1, wherein said information corresponding to the first frequency range identifies RUs which are not to be used by identifying one or more channels (in some cases the channels are 20 MHz sub-channels) in the first frequency range which are not to be used.

Apparatus Embodiment 3. The station (1500) of Apparatus Embodiment 2, wherein said processor (1502) is further configured to: encode data (1356) to be transmitted in the first frame, said encoding (1356) including encoding (1357) data for RUs which are not subject to the lower PSD constraint and which are to be used while not encoding data (e.g., avoiding encoding data for power constrained or RUs restricted from use) for RUs in the frame which are subject to the lower PSD constraint or which are not to be used.

Apparatus Embodiment 4. The station (1500) of Apparatus Embodiment 1, wherein said processor is configured to: puncture (1361) RUs (e.g., not placing data and thus no energy on RUs) which are subject to the lower PSD constraint, or which are not to be used, as part of being configured to operate the STA (1500) to transmit data (1360 or 1368) in the first frame.

Apparatus Embodiment 5. The STA (1500) of Apparatus Embodiment 4, wherein said processor (1500) is configured operate the wireless transmitter to transmit (1363) in a field of the frame (e.g., a SIG-A field) information identifying punctured RUs, as part of being configured to operate the STA (1500) to transmit (1360) data in the first frame.

Apparatus Embodiment 6. The STA (1500) of Apparatus Embodiment 2, wherein said processor (1502) is configured to operate the wireless transmitter to transmit (1365) in a field of the frame (e.g., a SIG-A field) information identifying punctured RUs or a 20 MHz channel in the frame which are not used to communicate data, as part of being configured to operate the STA to transmit data in the first frame.

Apparatus Embodiment 7. The STA (1500) of Apparatus Embodiment 1, wherein said processor (1502) is configured to: decode (1350) a received frame assuming that no data was transmitted on RUs which said information indicated are subject to the lower PSD constraint or are not to be used.

Apparatus Embodiment 8. The STA of Apparatus Embodiment 7, wherein said processor (1502) is configured to operate the wireless receiver (1520 or 1532) to receive (1342) a frame transmitted in said first frequency range, said receiving being prior to performing said decoding (1350).

Apparatus Embodiment 9. The STA (1500) of Apparatus Embodiment 1, wherein receiving (1312), said information identifying a set of resource units includes receiving (1322) a quiet information element identifying quiet RUs which are not to be used.

Apparatus Embodiment 10. The STA (1500) of Apparatus Embodiment 9, wherein said processor (1502) is further configured to: operate the wireless receiver (1520 or 1532) to receive (1372) a trigger frame (e.g., a trigger frame addressed to the station); and determine (1373) what action to take in response to the received trigger frame based on whether the received trigger frame assigned an RU that the received information indicates is a quiet RU.

Apparatus Embodiment 11. The STA (1500) of Apparatus Embodiment 10, wherein said processor (1502) is configured to: control (1376) the station (1500) not to respond to the trigger frame in response to determining that the trigger frame assigns an RU that is indicated to be a quiet RU.

Numbered List of Exemplary Non-Transitory Computer Readable Medium Embodiments Non-transitory Computer Readable Medium Embodiment 1. A non-transitory computer readable medium (1410) including machine executable instructions which when executed by a processor (1402) of an access point (AP) (1400) control the AP (1400) to perform the steps of: receiving (1206) authorization to operate in a first frequency range including at least one portion subject to a lower power spectral density (PSD) than one or more other portions of the first frequency range; generating (1212), based on the received authorization information, a first set of transmit power information corresponding to the first frequency range, said first set of transmit power information including information identifying one or more of: i) a set of resource units corresponding to the first frequency range that are subject to a lower transmit power than said one or more other portions of the first frequency range or ii) channels corresponding to the first frequency range that are subject to a lower transmit power than said one or more other portions of the first frequency range; and transmitting (1232) the first set of transmit power information.

Non-transitory Computer Readable Medium Embodiment 2. A non-transitory computer readable medium (1512) including machine executable instructions which when executed by a processor (1502) of a station (STA) (1500) control the STA (1500) to perform the steps of: receiving (1312), at the station, information corresponding to a first frequency range being used by the station, said information identifying a set of resource units (e.g., by identifying specific RUs or by identifying one or more channels) in the first frequency range that are subject to a lower power spectral density (PSD) constraint than other resource units or channels in the first frequency range or which are not to be used; and performing one or more of: i) transmitting data (1360) in a first frame which uses the first frequency range but which leaves at least some RUs which are subject to the lower PSD constraint or which are not to be used, unused by the first frame or ii) decoding (1350) a received frame assuming that no data was transmitted on RUs which said information indicated are subject to the lower PSD constraint or are not to be used.

Various embodiments are directed to apparatus, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating an access point (AP), comprising:

generating, when at least one channel is to be power spectral density (PSD) limited, a set of transmit power information for a set of channels used by said access point, said set of channels including multiple channels, at least one channel of said multiple channels being subject to PSD reduction, said set of transmit power information including multiple PSD indicator values, each PSD indicator value in said multiple PSD indicator values corresponding to a channel in said set of channels, each PSD indicator value in said multiple PSD indicator values indicating whether PSD reduction is to be applied to the corresponding channel; and transmitting the set of transmit power information.

2. The method of claim 1, wherein said set of transmit power information is in the form of a channel map, said channel map including one PSD indicator bit per channel, a value of the PSD indicator bit corresponding to a channel being said PSD indicator value corresponding to the channel, the value of the PSD indicator bit corresponding to the channel indicating whether or not the corresponding channel is subject to a PSD constraint.

3. The method of claim 2, further comprising:

transmitting information indicating the amount of PSD reduction to be applied to channels which are subject to a PSD constraint.

4. The method of claim 3, wherein the access point is a WiFi Access Point supporting unlicensed operation in 6 GHz spectrum.

5. The method of claim 3, wherein the access point is a new radio unlicensed (NRU) gNB base station supporting unlicensed operation in 6 GHz spectrum.

6. The method of claim 2, wherein generating the set of transmit power information further includes:

including in said set of transmit power information a PSD reduction element field value indicating an amount of PSD reduction to be applied to a channel in said set of channels; and wherein transmitting the set of transmit power information includes transmitting said PSD reduction element field value.

7. The method of claim 6, wherein generating the first set of transmit power information includes generating a quiet channel information element including information indicating a list of resource units (RUs) that are subject to no transmission or are subject to lower PSD transmission than other RUs.

8. The method of claim 7, wherein generating the quiet channel information element includes generating a length field indicating how many quiet RUs are listed and a list of indices indicating the quiet RUs.

9. The method of claim 8, wherein transmitting the set of transmit power information includes transmitting said quiet channel information element.

10. The method of claim 2, further comprising:

receiving, in a first frequency range, a frame from one or more stations;

identifying: i) one or more channels or ii) one or more RUs on which no data was to be transmitted; and decoding the received frame assuming that no data was transmitted on the RUs or channels on which no data was to be transmitted.

11. A method of operating an access point (AP), comprising:

generating, when at least one channel is to be power spectral density (PSD) limited, a set of transmit power information for a set of channels used by said access point, said set of channels including multiple channels, at least one channel of said multiple channels being subject to PSD reduction, said set of transmit power information indicating for each channel in said set of channels whether PSD reduction is to be applied; and transmitting the first set of transmit power information, said transmitting the first set of transmit power information including transmitting the first set of transmit power information in one or more of: i) a unicast probe response to a station (STA) or ii) a unicast association response to a STA.

12. An access point, comprising:

a first receiver;

a wireless transmitter; and a processor configured to control the access point to:

generate, when at least one channel is to be power spectral density (PSD) limited, a set of transmit power information for a set of channels used by said access point, said set of channels including multiple channels, at least one channel of said multiple channels being subject to PSD reduction, said set of transmit power information including multiple PSD indicator values, each PSD indicator value in said multiple PSD indictor values corresponding to a channel in said set of channels, each PSD indicator value in said multiple PSD indicator values indicating whether PSD reduction is to be applied to the corresponding channel; and transmit the set of transmit power information.

13. The access point of claim 12, wherein said set of transmit power information is in the form of a channel map, said channel map including one PSD indicator bit per channel, a value of the PSD indicator bit corresponding to a channel being said PSD indicator value corresponding to the channel, the value of the PSD indicator bit value corresponding to the channel indicating whether or not the corresponding channel is subject to a PSD constraint.

14. The access point of claim 13, wherein the processor is further configured to control the access point to:

transmit information indicating the amount of PSD reduction to be applied to channels which are subject to a PSD constraint.

15. The access point of claim 13, wherein the processor is further configured to control the access point to:

receive, in a first frequency range, a frame from one or more stations;

identify: i) one or more channels or ii) one or more RUs on which no data was to be transmitted; and decode the received frame assuming that no data was transmitted on the RUs or channels on which no data was to be transmitted.

16. The access point of claim 13, wherein the access point is a WiFi Access Point supporting unlicensed operation in 6 GHz spectrum.

17. The access point of claim 12, wherein said processor is configured to control the access point to:

include in said set of transmit power information a PSD reduction element field value indicating an amount of PSD reduction to be applied to a channel in said set of channels, as part of being configured to generate the set of transmit power information.

18. The access point of claim 17, wherein the processor is configured to control the access point to:

generate a quiet channel information element including information indicating a list of resource units (RUs) that are subject to no transmission or are subject to lower PSD transmission than other RUs as part of generating the set of transmit power information.

19. The access point of claim 18, wherein the processor is configured to control the access point to:

generate a length field indicating how many quiet RUs are listed and a list of indices indicating the quiet RUs as part of generating the quiet channel information element.

20. An access point, comprising:

a first receiver;

a wireless transmitter; and a processor configured to control the access point to:

generate, when at least one channel is to be power spectral density (PSD) limited, a set of transmit power information for a set of channels used by said access point, said set of channels including multiple channels, at least one of said multiple channels being subject to PSD reduction, said set of transmit power information indicating for each channel in said set of channels whether PSD reduction is to be applied; and transmit the set of transmit power information; and wherein the processor is further configured to control the access point to transmit the set of transmit power information in one or more of: i) a unicast probe response to a station (STA) or ii) a unicast association response to a STA, as part of being configured to control the access point to transmit the first set of transmit power information.

* * * * *